United States Patent
Chittenden et al.

(10) Patent No.: US 10,318,194 B2
(45) Date of Patent: Jun. 11, 2019

(54) METHOD AND AN APPARATUS, AND RELATED COMPUTER-PROGRAM PRODUCTS, FOR MANAGING ACCESS REQUEST IN MULTI-TENANCY ENVIRONMENTS

(71) Applicant: HITACHI DATA SYSTEMS ENGINEERING UK LIMITED, Bracknell, Berkshire (GB)

(72) Inventors: Andrew Stephen Chittenden, Reading (GB); Jonathan Mark Smith, Bracknell (GB); Antonio Robert Carlini, Abingdon (GB); Ashwin Payyanadan, Godalming (GB); Robert Ian Williams, Reading (GB)

(73) Assignee: Hitachi Vantara Corporation, Santa Clara, CA (US)

( * ) Notice: Subject to any disclaimer, the term of this patent is extended or adjusted under 35 U.S.C. 154(b) by 15 days.

(21) Appl. No.: 15/504,337

(22) PCT Filed: Oct. 2, 2014

(86) PCT No.: PCT/EP2014/071215
§ 371 (c)(1),
(2) Date: Feb. 16, 2017

(87) PCT Pub. No.: WO2016/050315
PCT Pub. Date: Apr. 7, 2016

(65) Prior Publication Data
US 2017/0235509 A1    Aug. 17, 2017

(51) Int. Cl.
*G06F 3/06* (2006.01)
*G06F 12/14* (2006.01)
(Continued)

(52) U.S. Cl.
CPC ............ *G06F 3/0622* (2013.01); *G06F 3/067* (2013.01); *G06F 3/0637* (2013.01);
(Continued)

(58) Field of Classification Search
CPC ............... G06F 3/00; G06F 3/06–0622; G06F 3/0623–0637; G06F 3/0638–0643;
(Continued)

(56) References Cited

U.S. PATENT DOCUMENTS

| | | | | |
|---|---|---|---|---|
| 5,765,200 A | * | 6/1998 | McIlvain | G06F 3/0622 703/24 |
| 5,892,955 A | * | 4/1999 | Ofer | G06F 3/062 710/200 |

(Continued)

FOREIGN PATENT DOCUMENTS

| | | |
|---|---|---|
| EP | 1528746 A2 | 5/2005 |
| WO | 2001/20470 A1 | 3/2001 |

(Continued)

OTHER PUBLICATIONS

Context-aware Automatic Access Policy Specification for IoT Environments; Alkhresheh et al.; 14th International Wireless Communications & Mobile Computing Conference, pp. 793-799; Jun. 25-29, 2018 (Year: 2018).*

(Continued)

*Primary Examiner* — Daniel C. Chappell
(74) *Attorney, Agent, or Firm* — Mattingly & Malur, PC

(57) ABSTRACT

The apparatus comprises a plurality of interfaces, each interface having an associated interface ID; and a hardware-side processing device including at least one programmable hardware-implemented chip configured to process request packets, which are received from host computers and relate to access requests to one or more file system managed by the apparatus, and to generate response packets for the pro-
(Continued)

cessed request packets; wherein, for a request packet which is received from a first host computer, at least one programmable hardware-implemented chip is configured to: determine the client ID being associated with the first host computer, determine the interface ID being associated with the first interface, determine whether the determined client ID and interface ID represent a permitted ID set or a prohibited ID set, and refrain from processing the received request packet if the determined client ID and interface ID represent a prohibited ID set.

13 Claims, 47 Drawing Sheets

(51) Int. Cl.
*G06F 16/00* (2019.01)
*G06F 21/62* (2013.01)
*G06F 16/182* (2019.01)

(52) U.S. Cl.
CPC ........ *G06F 3/0643* (2013.01); *G06F 12/1458* (2013.01); *G06F 16/00* (2019.01); *G06F 16/183* (2019.01); *G06F 21/6218* (2013.01); *G06F 2212/1052* (2013.01)

(58) Field of Classification Search
CPC .......... G06F 3/0644–067; G06F 3/0671–0689; G06F 9/00–548; G06F 12/00–1458; G06F 12/1466–16; G06F 13/00–4295; G06F 17/30–30997; G06F 21/00–8; G06F 2003/0691–0698; G06F 2206/00–20; G06F 2209/00–549; G06F 2211/00–902; G06F 2212/00–7211; G06F 2213/00–4004; G06F 2216/00–17; G06F 2221/00–2153; H04L 29/06823; H04L 29/08549; H04L 67/00; H04L 67/10–1097
See application file for complete search history.

(56) References Cited

U.S. PATENT DOCUMENTS

| 7,194,538 | B1 * | 3/2007 | Rabe ..................... | G06F 3/0605 709/220 |
|---|---|---|---|---|
| 7,287,116 | B2 * | 10/2007 | Iwami .................. | G06F 3/0607 711/114 |
| 8,185,639 | B2 * | 5/2012 | Krishnan ............. | H04L 29/1232 709/206 |
| 2003/0009444 | A1 * | 1/2003 | Eidler ................. | G06F 21/6227 |
| 2003/0131261 | A1 * | 7/2003 | Hashimoto ............. | G06F 21/80 726/4 |
| 2003/0200399 | A1 * | 10/2003 | Dawkins ............... | G06F 3/0601 711/152 |
| 2003/0229689 | A1 * | 12/2003 | Raghavan ............... | H04L 29/06 709/223 |
| 2005/0097324 | A1 * | 5/2005 | Mizuno ................. | G06F 3/0622 713/169 |
| 2006/0168394 | A1 * | 7/2006 | Nakatsuka ............. | H04L 67/16 711/112 |
| 2006/0174000 | A1 * | 8/2006 | Graves .................... | H04L 63/10 709/225 |
| 2007/0067591 | A1 * | 3/2007 | Shiraki ............... | G06F 21/6227 711/163 |
| 2007/0168316 | A1 * | 7/2007 | Gupta ............... | G06F 17/30575 |
| 2009/0300308 | A1 * | 12/2009 | Bakke .................. | G06F 3/0622 711/163 |
| 2010/0198972 | A1 * | 8/2010 | Umbehocker ........ | G06F 3/0604 709/226 |
| 2011/0022812 | A1 * | 1/2011 | van der Linden .... | G06F 9/5077 711/163 |
| 2013/0191491 | A1 * | 7/2013 | Kotha ................... | H04L 12/413 709/213 |
| 2014/0032958 | A1 * | 1/2014 | Beck ....................... | H04L 63/12 714/4.1 |
| 2014/0365622 | A1 * | 12/2014 | Iyengar ............... | H04L 67/1097 709/220 |

FOREIGN PATENT DOCUMENTS

| WO | 2003/005209 A2 | 1/2003 |
|---|---|---|
| WO | 2014/046650 | 3/2014 |

OTHER PUBLICATIONS

A Trusted Data Storage Infrastructure for Grid-Based Medical Applications; Noordende et al.; Eighth IEEE International Symposium on Cluster Computing and the Grid, pp. 627-632; May 19-22, 2008 (Year: 2008).*

International Search Report of PCT/EP2014/071215 dated Jun. 5, 2015.

* cited by examiner

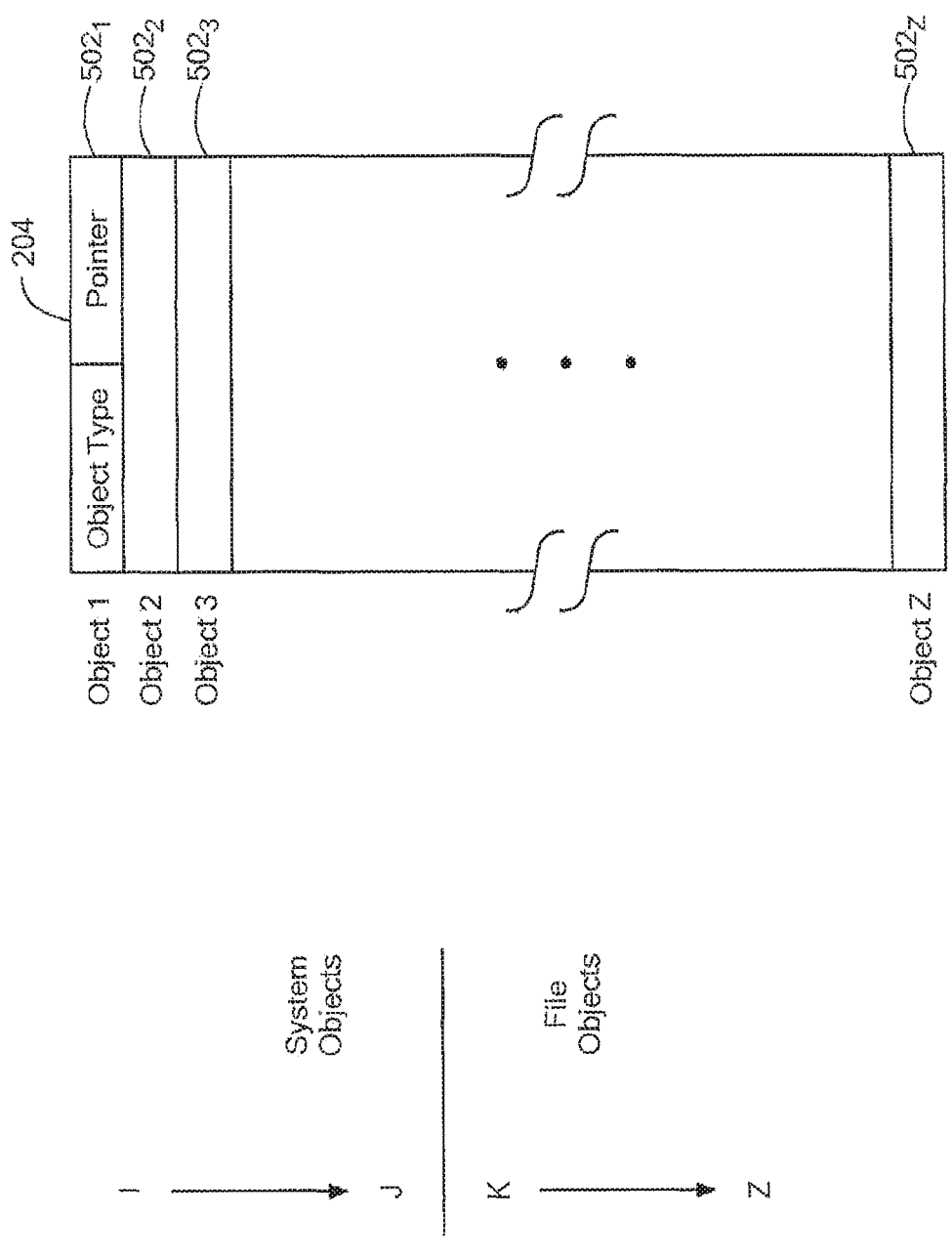

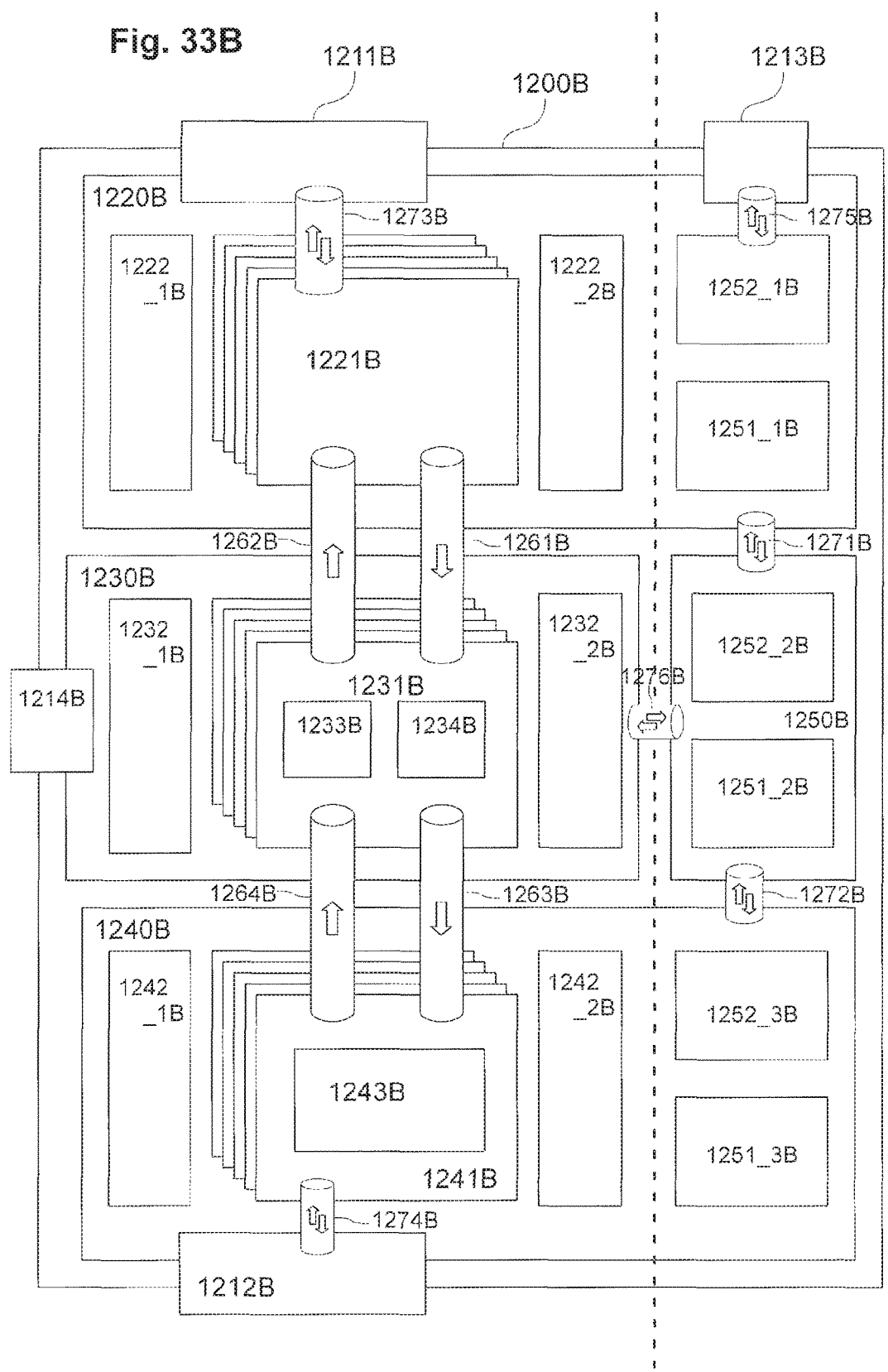

Fig. 35A MDT1

| Interface ID | Network ID | Client ID |
|---|---|---|
| . | . | . |
| . | . | . |
| . | . | . |

Fig. 35B MDT2

| Interface ID | Network ID | Virtual Server ID |
|---|---|---|
| . | . | . |
| . | . | . |
| . | . | . |

Fig. 35C MDT3

| Network ID | Virtual Server ID | File System ID |
|---|---|---|
| . | . | . |
| . | . | . |
| . | . | . |

Fig. 35D MDT4

| Connection ID | Client ID | Network ID | Virtual Server ID |
|---|---|---|---|
| . | . | . | . |
| . | . | . | . |
| . | . | . | . |

HARDWARE-SIDE
(Network Interface)

HARDWARE-SIDE
(Network Interface)

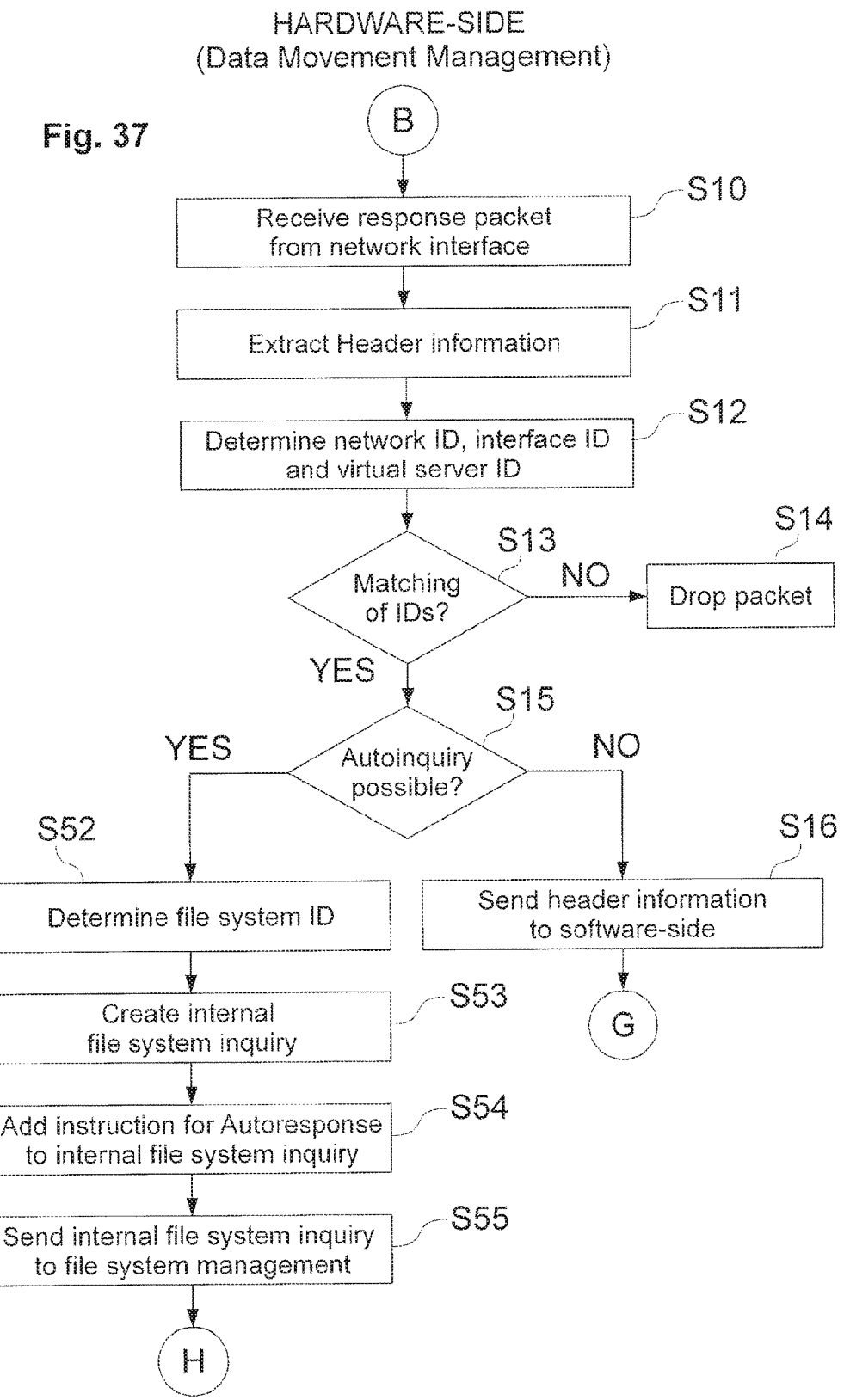

SOFTWARE-SIDE

SOFTWARE-SIDE

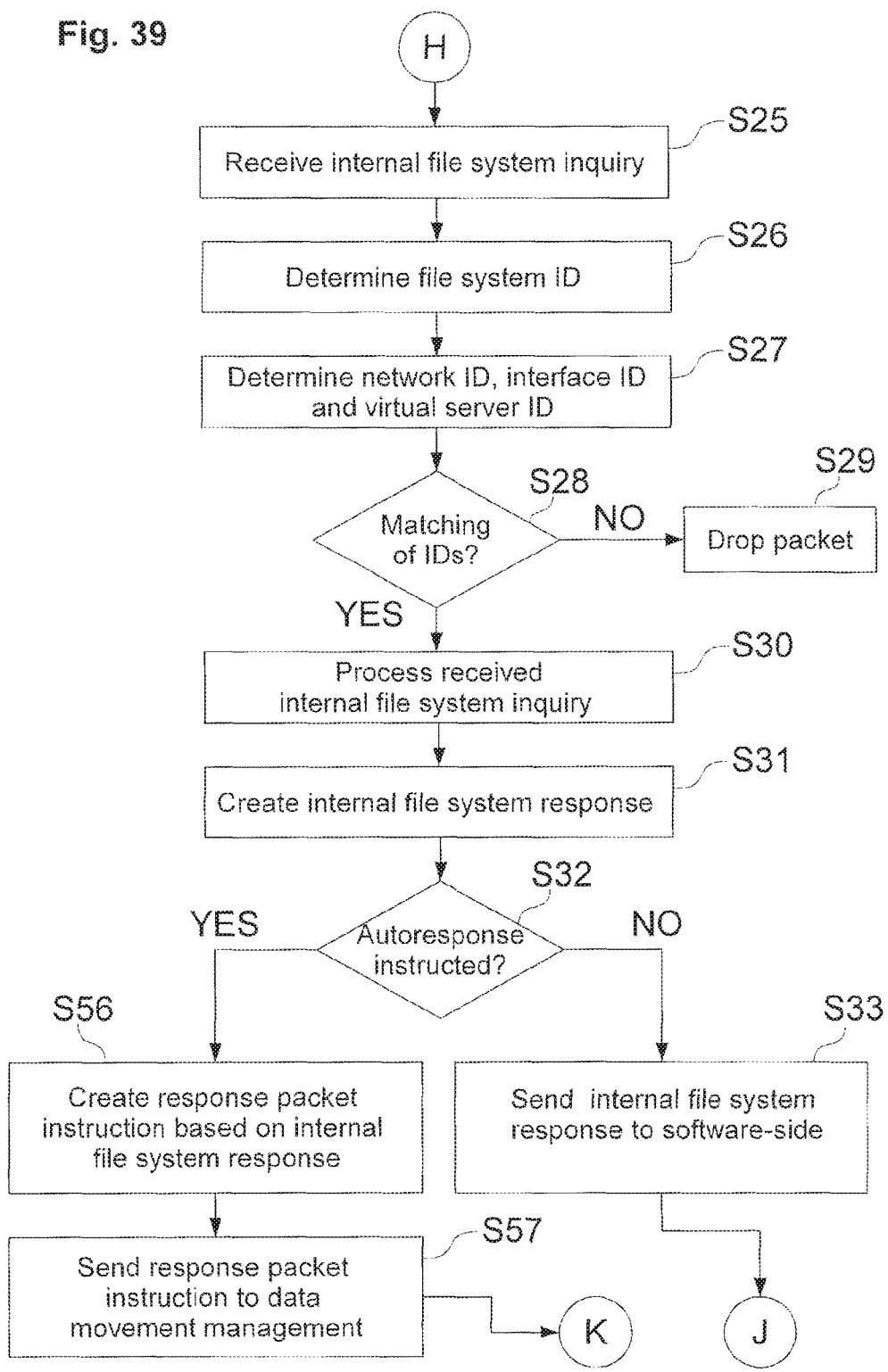

HARDWARE-SIDE
(Data Movement Management)

HARDWARE-SIDE
(Data Movement Management)

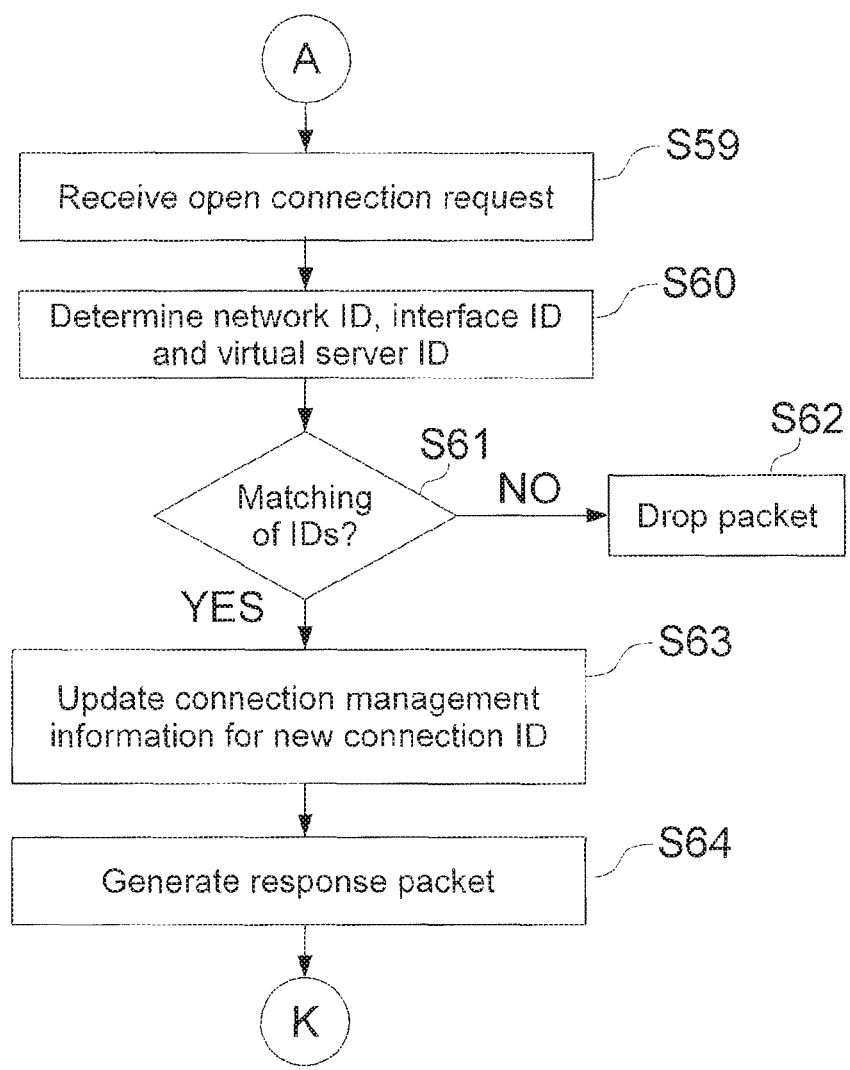

SOFTWARE-SIDE

OR

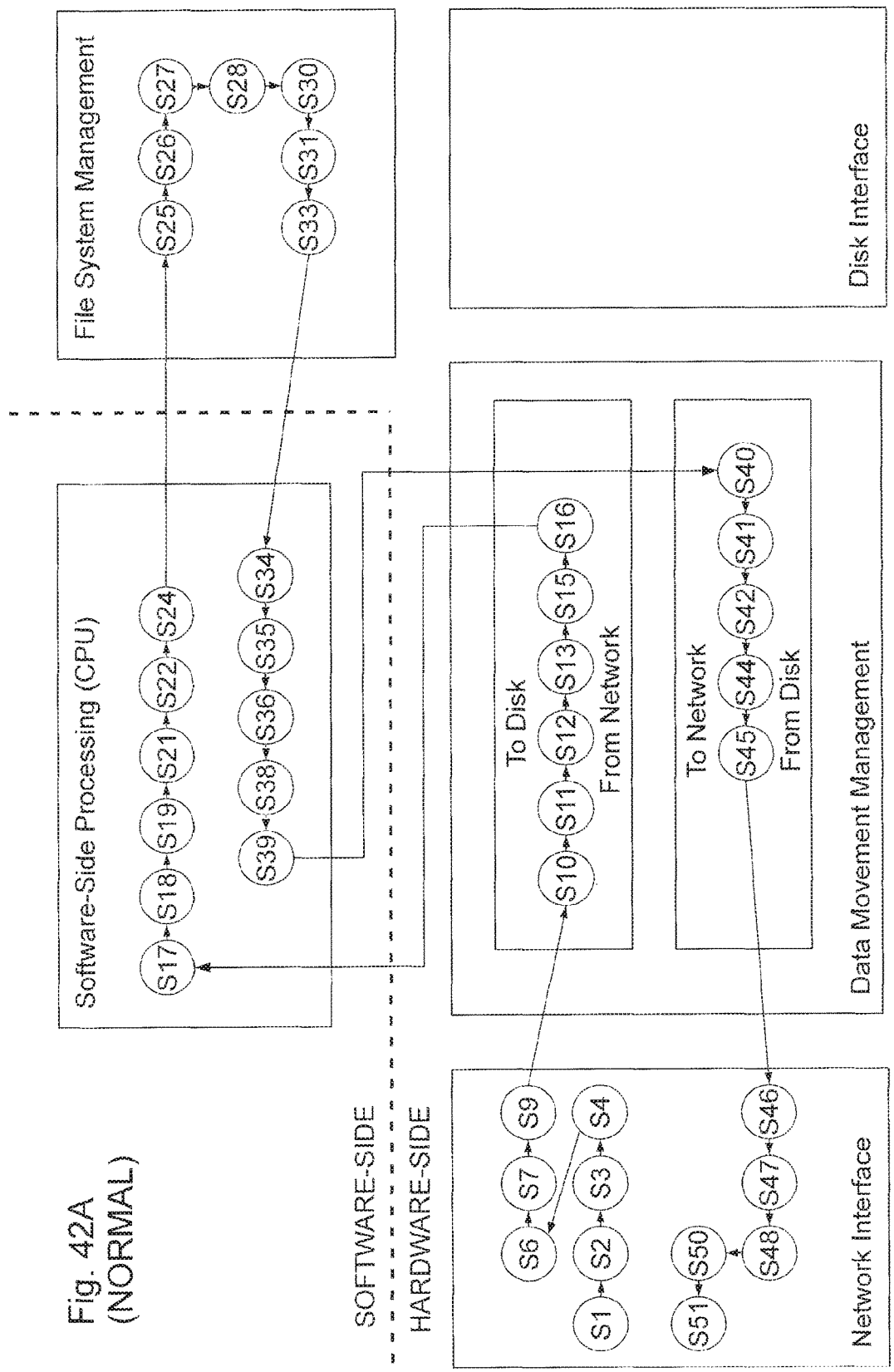

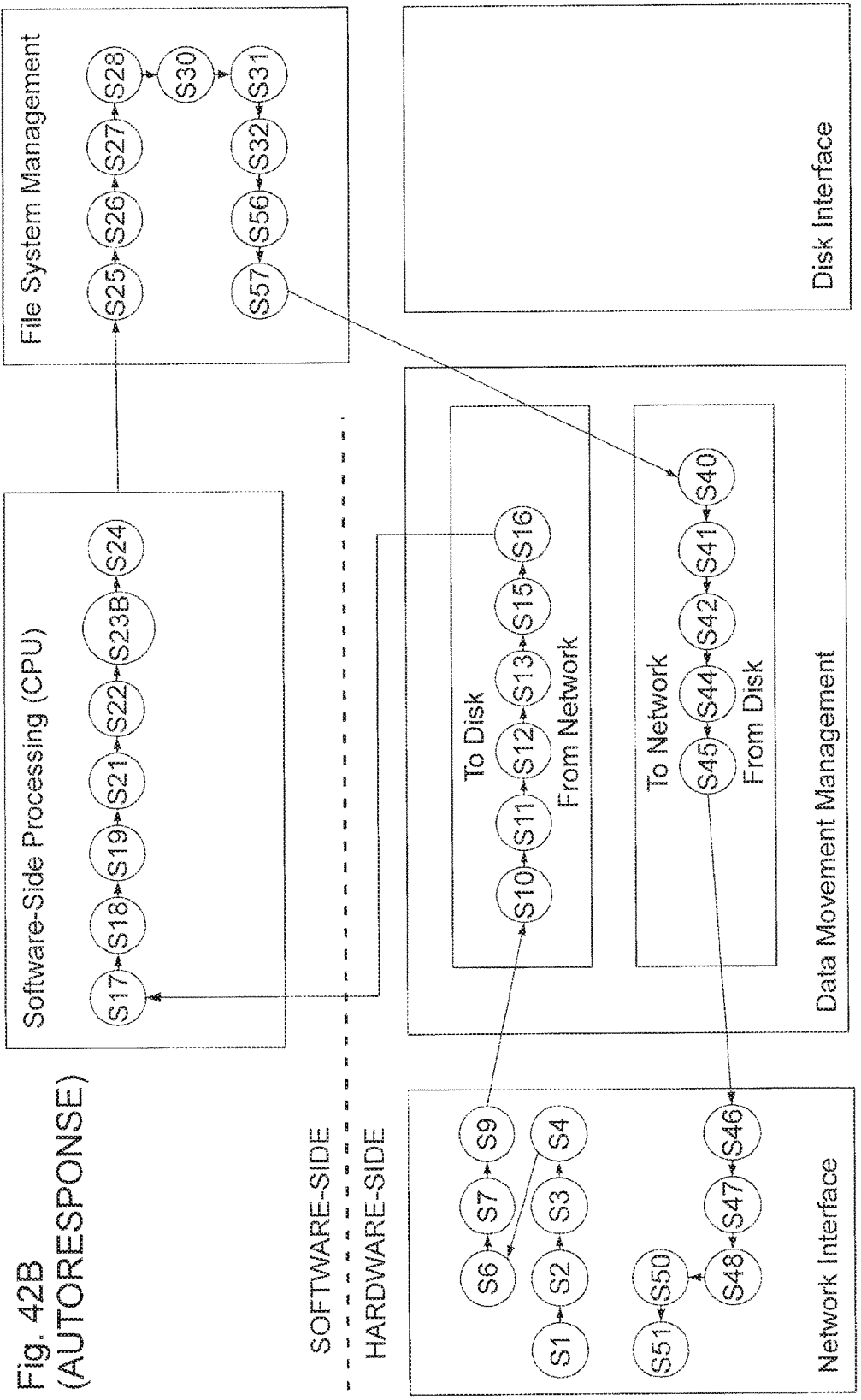
Fig. 42B (AUTORESPONSE)

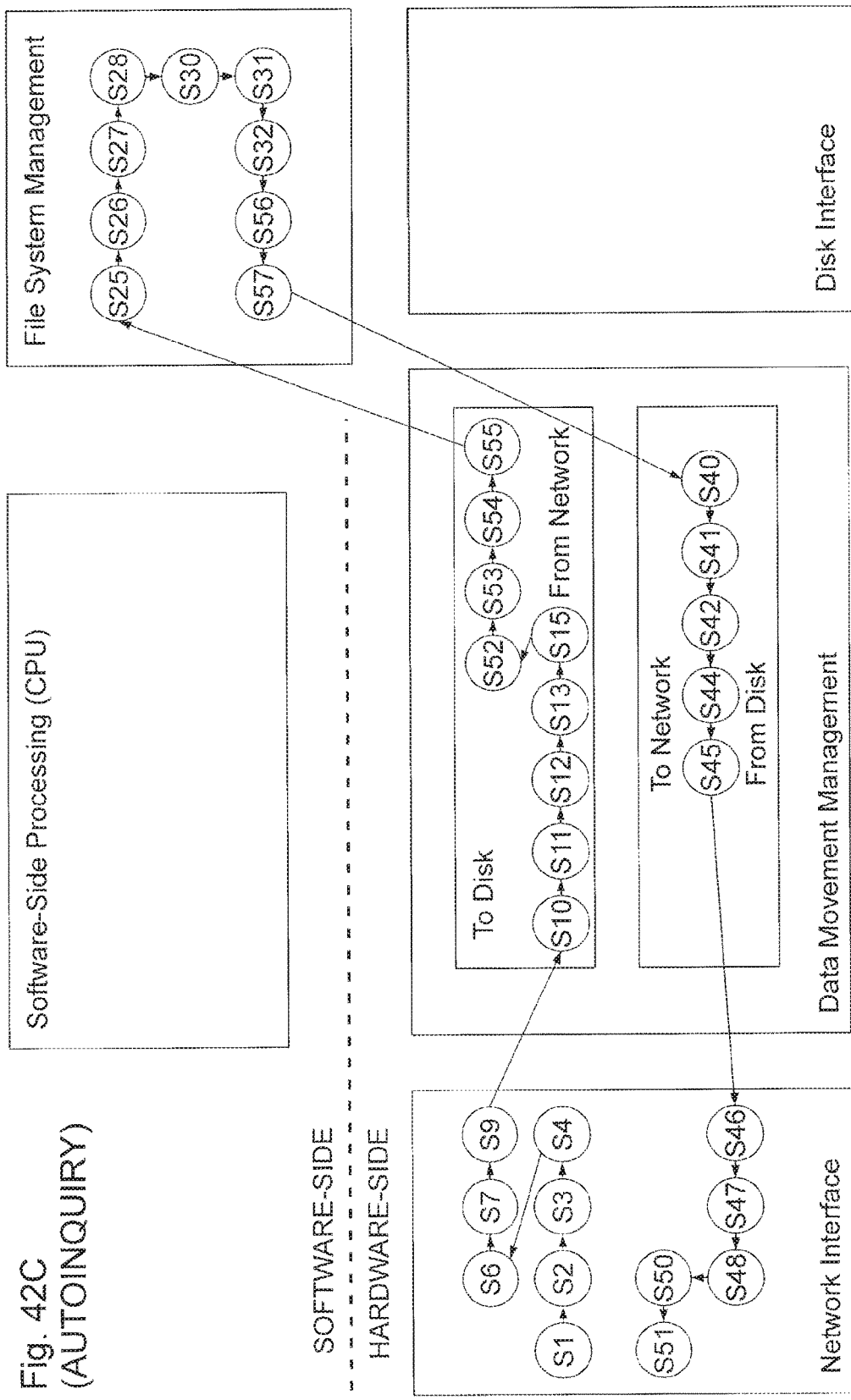
Fig. 42C (AUTOINQUIRY)

METHOD AND AN APPARATUS, AND RELATED COMPUTER-PROGRAM PRODUCTS, FOR MANAGING ACCESS REQUEST IN MULTI-TENANCY ENVIRONMENTS

The invention relates to a method and an apparatus such as, in particular a file system server, and one or more related computer-program products, for managing access requests to one or more file systems. Exemplary embodiments of the present invention relate to processing access requests in a data storage system in a multi-tenancy environment.

BACKGROUND

In today's information age, data storage systems often are configured to manage file systems that include huge amounts of storage space. It is common for file systems to include many terabytes of storage space spread over multiple storage devices. In such file system managing data storage systems, clients/host computers issue request packets relating to one or more access requests to objects (such as e.g. files and/or directories) of the managed file system according to one or more network protocols.

It is an object of the present invention to provide a method and an apparatus, and related computer-program products, for managing access request to one or more file systems by efficiently handling the processing of request packets issued from different clients associated with multiple tenants and potentially overlapping client IDs.

SUMMARY

Embodiments of the present invention show multiple functions and mechanisms and combination of functions and mechanisms that allow to increase request processing efficiency of a file system server and IOPS performance thereof by multiple aspects that can be combined in multiple ways to further increase request processing efficiency of the file system server and IOPS performance thereof. Such aspects include, for example, autoinquiry, autoresponse and/or one or more aspects of request processing of request packets issued from different clients associated with multiple tenants and potentially overlapping client IDs performed at a first side (e.g. hardware-side) of the file system server, e.g. with and/or without involvement by a second-side (e.g. software-side) and its CPU(s) of the file system server.

In view of the above object, according to some embodiments there may be provided an apparatus for managing one or more file systems, in particular a file system server, and/or a method for managing one or more file systems in a data storage system. For example, the apparatus may be connectable to one or more storage apparatuses and to one or more host computers, in particular the apparatus being preferably adapted for use in a data storage system comprising the one or more storage apparatuses and the apparatus connected to the one or more storage apparatuses and to the one or more host computers.

According to some embodiments, there may be provided an apparatus for managing one or more file systems, the apparatus being connectable to a storage apparatus and to a plurality of host computers, each host computer being associated with a client ID.

According to some embodiments, the apparatus may comprise a plurality of interfaces, each interface having an associated interface ID; and/or a first-type (e.g. hardware-side) processing device including at least one programmable hardware-implemented chip configured to process request packets, which are received from host computers and may relate to access requests to one or more file system managed by the apparatus, and/or to generate response packets for the processed request packets.

According to some embodiments, for a request packet which is received from a first host computer via a first interface of the apparatus, at least one programmable hardware-implemented chip of the first-type processing device may be configured to: determine the client ID being associated with the first host computer, determine the interface ID being associated with the first interface, and/or determine whether the determined client ID and interface ID represent a permitted ID set (e.g. as a complete allowed ID set consisting of two IDS, or as an ID subset of plural IDs of an allowed ID set) or a prohibited ID set.

According to some embodiments, the at least one programmable hardware-implemented chip of the first-type processing device may be configured to refrain from processing the received request packet if the determined client ID and interface ID are determined to represent a prohibited ID set.

According to some embodiments, the first-type processing device may include a memory for storing management information data indicative of a plurality ID sets including at least one of a plurality of prohibited ID sets or a plurality of permitted ID sets.

According to some embodiments, the at least one programmable hardware-implemented chip of the first-type processing device may be configured to determine whether the determined client ID and interface ID represent a permitted ID set or a prohibited ID set based on the for stored management information data.

According to some embodiments, the at least one programmable hardware-implemented chip of the first-type processing device may be configured to process the received request packet and/or sent a corresponding response packet to the first host computer through the first interface if the determined client ID and interface ID are determined to represent a permitted ID set.

According to some embodiments, the at least one programmable hardware-implemented chip of the first-type processing device may include at least one programmable hardware-implemented chip of a network interface portion of the apparatus; and the at least one programmable hardware-implemented chip of a network interface portion may be configured to determine whether the determined client ID and interface ID represent a permitted ID set or a prohibited ID set on the basis of the request packet upon receipt of the request packet; and/or the at least one programmable hardware-implemented chip of a network interface portion may be configured to determine whether the determined client ID and interface ID represent a permitted ID set or a prohibited ID set based on the corresponding response packet for preparation of sending the corresponding response packet to the first host computer.

According to some embodiments, each host computer may be further associated with a communication network having an associated network ID, wherein, for the request packet which is received from the first host computer via the first interface of the apparatus, the at least one programmable hardware-implemented chip of the first-type processing device may be configured to: determine the network ID being associated with the first host computer, and/or determine whether the determined client ID, network ID and interface ID represent a permitted ID set or a prohibited ID set.

According to some embodiments, the at least one programmable hardware-implemented chip of the first-type processing device may be further configured to determine a virtual server ID being associated with the ID set comprising the determined client ID, network ID and interface ID.

According to some embodiments, the at least one programmable hardware-implemented chip of the first-type processing device may be further configured to map the determined virtual server ID to a file system ID indicating a file system portion of the one or more file systems allowed to be accessed by the first host computer.

According to some embodiments, the at least one programmable hardware-implemented chip of the first-type processing device may be configured to create an internal file system inquiry based on the file system ID.

According to some embodiments, the at least one programmable hardware-implemented chip of the first-type processing device may be configured to determine the network ID and/or the client ID being associated with the first host computer based on header information of the received request packet.

According to some embodiments, when the determined client ID and interface ID are determined to represent a prohibited ID set, the apparatus may be configured to send a failure response to the host computer, to generate an alert notification and/or to create a log entry in log data.

According to some exemplary embodiments, the apparatus may further comprise a second-type (e.g. software-side) processing device including a CPU configured to execute decoding of requests packets sent from host computers based on a computer program stored in a memory of the software-side processing device.

According to some embodiments, the second-type processing device may be configured to determine whether a determined ID set including a client ID, a network ID, an interface ID and a virtual server ID represents a permitted ID set or a prohibited ID set, and/or to refrain from processing a respective request packet an ID set associated with the request packet is determined to represent a prohibited ID set.

According to some embodiments, the first-type processing device may be configured to process a request packet of a first-type according to a normal processing lunation and/or to process a request packet of a second type according to an autoinquiry processing function, wherein processing the request packet of the first-type according to the normal processing function may include decoding the request packet at a second-type (e.g. software-side) processing device, and/or processing the request packet of a second-type according to the autoinquiry processing function does not require decoding the request packet at the second-type processing device, and, for the processing of the request packet of the first-type according to the normal processing function, the at least one programmable hardware-implemented chip of the first-type processing device may be configured to transmit at least part of the request packet to the second-type processing device for decoding of the request packet.

According to some embodiments according to another aspect, there may be provided a computer program product comprising computer-readable program instructions which, when running on or loaded into an apparatus, causing the apparatus to execute steps of a method for managing one or more file systems, the apparatus being connectable to a storage apparatus and to a plurality of host computers, each host computer being associated with a client ID.

The program product may comprise computer-readable program instructions loadable to the at least one programmable hardware-implemented chip of the first-type processing device which cause the programmable hardware-implemented chip of the first-type processing device to execute: determining the client ID being associated with the first host computer, determining the interface ID being associated with the first interface, determining whether the determined client ID and interface ID represent a permitted ID set or a prohibited ID set, and/or refraining from processing the received request packet if the determined client ID and interface ID are determined to represent a prohibited ID set, e.g. according to one or more of the above exemplary embodiments.

BRIEF DESCRIPTION OF DRAWINGS

FIG. 15 shows an exemplary representation of object number assignments for an exemplary embodiment of the present invention;

FIG. 16 is an exemplary schematic block diagram showing the general format of the indirection object in accordance with an exemplary embodiment of the present invention;

FIG. 33B is another exemplary schematic diagram showing an architecture of a file system server according to an exemplary embodiment of the present invention;

FIGS. 35A to 35D exemplarily illustrate metadata tables according to some exemplary embodiments;

FIG. 37 exemplarily shows a request processing process performed at a data movement management portion at the hardware-side of the file system server according to an exemplary embodiment of the present invention;

FIG. 39 exemplarily shows a request processing process performed at a file system management portion of the hardware-side of the file system server according to an exemplary embodiment of the present invention;

FIGS. 41A to 41C exemplarily show examples of open connection processes performed at the software-side of the file system server according to some exemplary embodiments of the present invention;

FIG. 42A exemplarily shows a configuration of the file system server and the steps of the normal processing of a request packet according to an exemplary embodiment of the present invention;

FIG. 42B exemplarily shows a configuration of the file system server and the steps of the autoresponse processing of a request packet according to an exemplary embodiment of the present invention;

FIG. 42O exemplarily shows a configuration of the file system server and the steps of the autoinquiry processing of a request packet according to an exemplary embodiment of the present invention.

DETAILED DESCRIPTION OF DRAWINGS AND OF PREFERRED EMBODIMENTS

Figure 1:
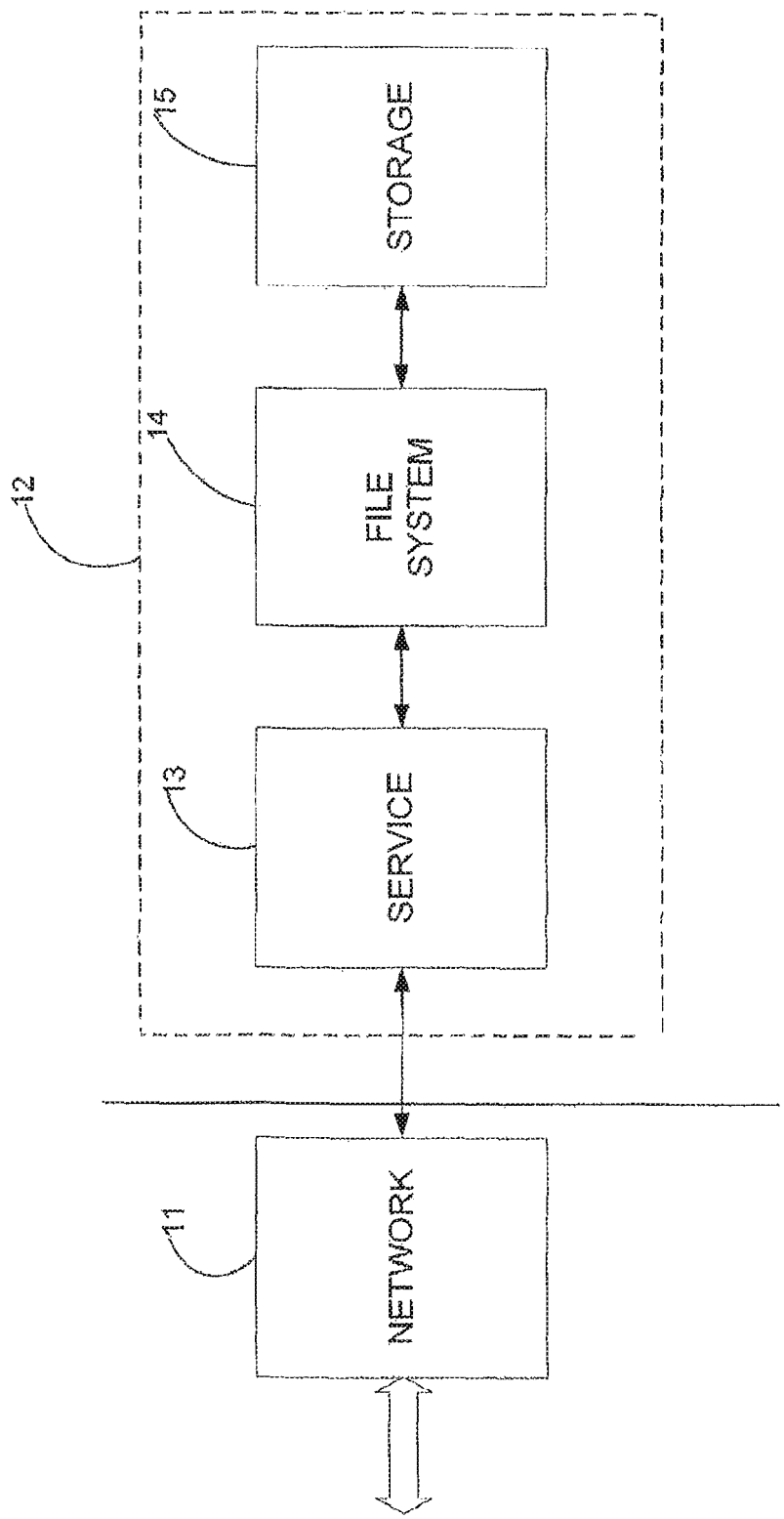
FIG. 1 is an exemplary logical block diagram of an embodiment of a file server to which various aspects of the present invention are applicable.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

A "range" is composed of either a primary SD on its own or a primary/secondary SD pair that are supposed to contain identical data and therefore offer the same storage capacity as a single SD.

A "stripeset" is composed of one or more ranges.

A "span" is composed of one or more stripesets. Thus, a span is ultimately composed of one or more SDs (typically four to fifty SDs). A span can be divided into one or more file systems, with each file system having a separate name and identifier and potentially different characteristics (e.g., one file system may be formatted with 32 KB blocks and another with 4 KB blocks, one file system may be Worm and another not, etc.). Each file system on the span is formatted, mounted, and unmounted separately. File systems may be created and deleted in any order and at any time. File systems typically can be configured to expand automatically (or alternatively to prevent or restrict auto-expansion) or can be expanded manually.

A "block" or "storage block" is a unit of storage in the file system that corresponds to portion of physical storage in which user data and/or system data is stored. A file system object (discussed below) generally includes one or more blocks. A "data block" is a unit of data (user data or metadata) to be written to one storage block.

FIG. 1 is a logical block diagram of an embodiment of a file server to which various aspects of the present invention are applicable. A file server of this type is described in U.S. Pat. No. 7,457,822, entitled "Apparatus and Method for Hardware-based File System" which is incorporated herein by reference and PCT application publication number WO 01/28179 A2, published Apr. 19, 2001, entitled "Apparatus and Method for Hardware Implementation or Acceleration of Operating System Functions" which is incorporated herein by reference. A file server 12 of FIG. 1 herein has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a sector cache for file content data that is being read from and written to storage. Further, each of the various modules may be hardware implemented or hardware accelerated.

Figure 2:
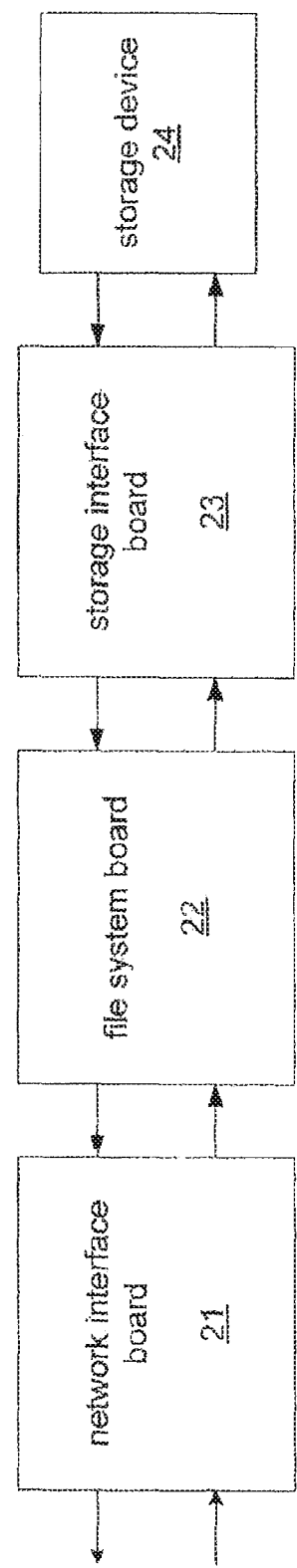
FIG. 2 is an exemplary logical block diagram of an implementation of the embodiment of FIG. 1.

FIG. 2 is a logical block diagram of an implementation of the embodiment of FIG. 1. In this implementation, the service module 13, file system module 14, and storage module 15 of FIG. 1 are implemented by network interface board 21, file system board 22, and storage interface board 23 respectively. The storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions", which is incorporated herein by reference. However, in an alternative implementation, the service module 13, file system module 14, and storage module 15 of FIG. 1 can be implemented integrally on a singular board such as a board having a single field programmable array chip (FPGA). In yet another alternative implementation, the network interface board 21 can be configured on a first board which is separate from the file system board 22 and storage interface board 23 which are configured together on a second board. It should be noted that the present invention is in no way limited to these specific board configurations or any particular number of boards.

Figure 3:
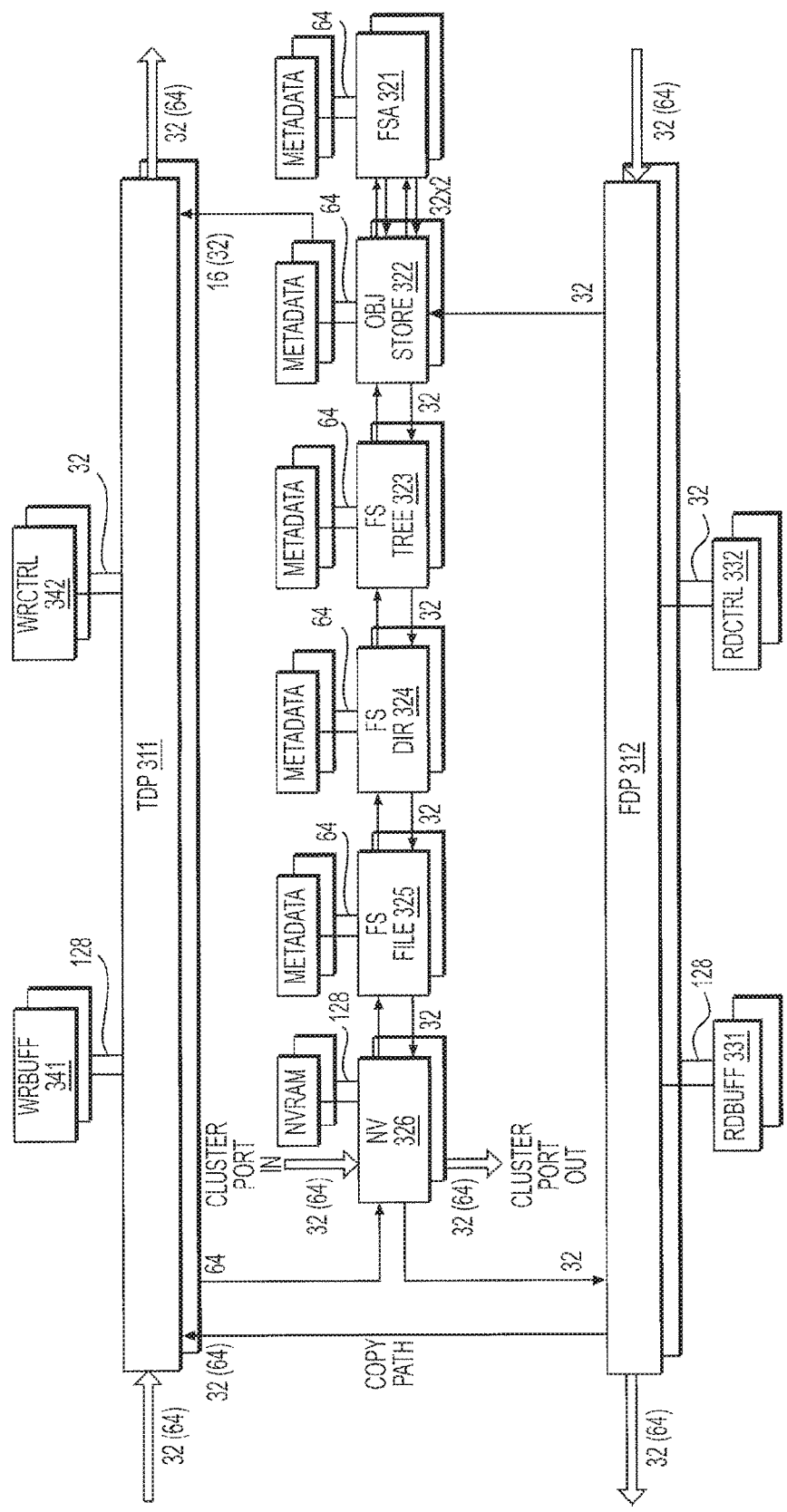
FIG. 3 is an exemplary block diagram of a file system module in accordance with an embodiment of the present invention.

FIG. 3 is a block diagram of an embodiment of a file system module in accordance with the present invention. The file system module embodiment may be used in systems of the type described in FIGS. 1 and 2. Exemplary bus widths for various interfaces are shown, although it should be noted that the present invention is in no way limited to these bus widths or to any particular bus widths.

The data flow in this embodiment is shown by upper bus 311, which is labeled TDP, for To Disk Protocol, and by lower bus 312, which is labeled FDP, for From Disk Protocol, such Protocols referring generally to communication with the storage module 15 of FIG. 1 as may be implemented, for example, by storage interface board 23 of FIG. 2. The file system module always uses a control path that is distinct from the data buses 311 and 312, and in this control path uses pointers to data that is transported over the buses 311 and 312. The buses 311 and 312 are provided with a write buffer WRBUFF and read buffer RDBUFF respectively. For back up purposes, such as onto magnetic tape, there is provided a direct data path, identified in the left portion of the drawing as COPY PATH, from bus 312 to bus 311, between the two buffers.

Figure 4:
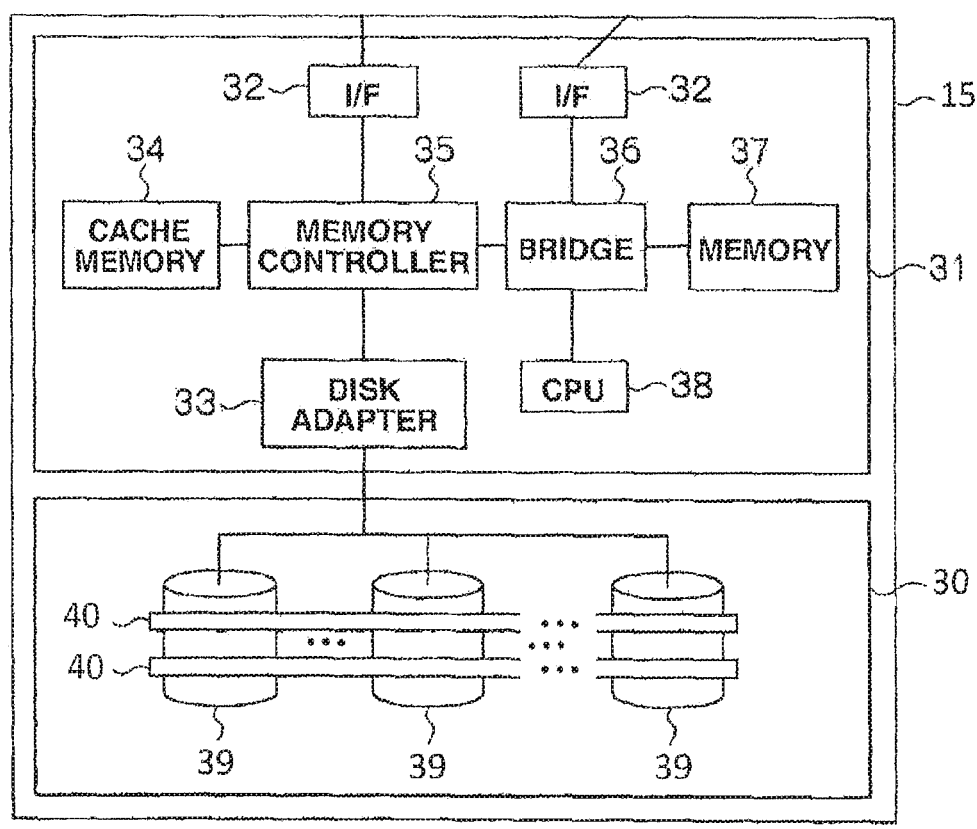
FIG. 4 is an exemplary physical block diagram showing the configuration of a storage system according to an embodiment of the present invention.

FIG. 4 shows a detailed physical block diagram of a storage module 15 according to an exemplary embodiment of the present invention. The storage module 15 is configured by a storage part 30 configured from a plurality of hard disk drives 39, and a control unit 31 for controlling the hard disk drives (otherwise referred to as a disk) 39 of the storage part 30.

The hard disk drive 39, for instance, is configured from an expensive disk drive such as an FC (Fibre Channel) disk, or an inexpensive disk such as a SATA (Serial AT Attachment) disk drive or an optical disk drive or the like. One or more logical volumes are defined in the storage areas (hereinafter referred to as "RAID groups") 40 provided by one or more of the hard disk drives 39. Data from the host system 2 is accessed (read from and written into) the logical volumes 26 in block units of a prescribed size.

A unique identifier (Logical Unit Number: LUN) is allocated to each logical volume 26. In the case of this embodiment, the input and output of data are performed by setting the combination of the foregoing identifier and a unique number (LBA: Logical Block Address) that is allocated to the respective logical blocks as the address, and designating this address.

The control unit 31 comprises a plurality of interfaces (I/F) 32, a disk adapter 33, a cache memory 34, a memory controller 35, a bridge 36, a memory 37, and a CPU 38.

The interface 32 is an external interface used for sending and receiving write data, read data and various commands to and from the storage system 15. The disk adapter 33 is an interface to the storage part 21, and, for example, is used for sending and receiving write data, read data or various commands to and from the storage part 30 according to a fibre channel protocol.

The cache memory 34, for instance, is configured from a nonvolatile semiconductor memory, and is used for temporarily storing commands and data to be read from and written into the storage part 30. The memory controller 35 controls the data transfer between the cache memory 34 and the memory 37, and the data transfer between the cache memory 34 and the disk adapter 33. The bridge 36 is used for sending and receiving read commands and write commands and performing filing processing and the like between the memory controller 36 and the CPU 38, or between the memory controller 36 and the memory 37.

In addition to being used for retaining various control programs and various types of control information, the memory 37 is also used as a work memory of the CPU 38. The CPU 38 is a processor for controlling the input and output of data to and from the storage part 30 in response to the read command or write command, and controls the interface 34, the disk adapter 33, the memory controller 35 and the like based on various control programs and various types of control information stored in the memory 37.

Returning to FIG. 3, a series of separate sub-modules of the file system module handle the tasks associated with file system management. Each of these sub-modules typically has its own cache memory for storing metadata pertinent to the tasks of the sub-module. (Metadata refers to file overhead information as opposed to actual file content data; the file content data is handled along the buses 311 and 312 discussed previously.) These sub-modules are Free Space Allocation 321, Object Store 322, File System Tree 323, File System Directory 324, File System File 325, and Non-Volatile Storage Processing 326.

The sub-modules operate under general supervision of a processor, but are organized to handle their specialized tasks in a manner dictated by the nature of file system requests being processed. In particular, the sub-modules are hierarchically arranged, so that successively more senior sub-modules are located successively farther to the left. Each sub-module receives requests from the left, and has the job of fulfilling each request and issuing a response to the left, and, if it does not fulfill the request directly, it can in turn issue a request and send it to the right and receive a response on the right from a subordinate sub-module. A given sub-module may store a response, provided by a subordinate sub-module, locally in its associated cache to avoid resending a request for the same data. In one embodiment, these sub-modules are implemented in hardware, using suitably configured field-programmable gate arrays. Each sub-module may be implemented using a separate field-programmable gate array, or multiple sub-modules may be combined into a single field-programmable gate array (for example, the File System Tree 323 and File System Directory 324 sub-modules may be combined into a single field-programmable gate array). Alternatively, each sub-module (or combination of sub-modules) may be implemented, for example, using integrated circuitry or a dedicated processor that has been programmed for the purpose.

Although the storage system, with respect to which the file system embodiment herein is being used, is referred to as the "disk," it will be understood that the storage system may be any suitable large data storage arrangement, including but not limited to an array of one or more magnetic or magneto-optical or optical disk drives, solid state storage devices, and magnetic tapes.

The Free Space Allocation sub-module 321 manages data necessary for operation of the Object Store sub-module 322, and tracks the overall allocation of space on the disk as affected by the Object Store sub-module 322. On receipt of a request from the Object Store sub-module 322, the Free Space Allocation sub-module 321 provides available block numbers to the Object Store sub-module. To track free space allocation, the Free Space Allocation sub-module establishes a bit map of the disk, with a single bit indicating the free/not-free status of each block of data on the disk. This bit map is itself stored on the disk as a special object handled by the Object Store sub-module. There are two two-way paths between the Object Store and Free Space Allocation sub-modules since, on the one hand, the Object Store sub-module has two-way communication with the Free Space Allocation sub-module for purposes of management and assignment of free space on the disk, and since, on the other hand, the Free Space Allocation sub-module has two-way communication with the Object Store sub-module for purposes of retrieving and updating data for the disk free-space bit ma p.

The File System File sub-module 325 manages the data structure associated with file attributes, such as the file's time stamp, who owns the file, how many links there are to the file (i.e., how many names the file has), read-only status, etc. Among other things, this sub-module handles requests to create a file, create a directory, insert a file name in a parent directory, and update a parent directory. This sub-module in turn interacts with other sub-modules described below.

The File System Directory sub-module 324 handles directory management. The directory is managed as a listing of files that are associated with the directory, together with associated object numbers of such files, File System Directory sub-module 324 manages the following operations of directories: create, delete, insert a file into the directory, remove an entry, look up an entry, and list contents of directory.

The File System Directory sub-module 324 works in concert with the File System Tree sub-module 323 to handle efficient directory lookups. Although a conventional tree structure is created for the directory, the branching on the tree is handled in a non-alphabetical fashion by using a pseudo-random value, such as a CRC (cyclic redundancy check sum), that is generated from a file name, rather than using the file name itself. Because the CRC tends to be random and usually unique for each file name this approach typically forces the tree to be balanced, even if all file names happen to be similar. For this reason, when updating a directory listing with a new file name, the File System Directory sub-module 324 generates the CRC of a file name, and asks the File System Tree sub-module 323 to utilize that CRC in its index. The File System Tree sub-module associates the CRC of a file name with an index into the directory table. Thus, the sub-module performs the lookup of a CRC and returns an index.

The File System Tree sub-module 323 functions in a manner similar to the File System Directory sub-module 324, and supports the following functions: create, delete, insert a CRC into the directory, remove an entry, look up an entry. But in each case the function is with respect a CRC rather than a file.

The Non-Volatile Storage Processing sub-module 326 interfaces with associated non-volatile storage (called NVRAM in FIG. 4) to provide a method for recovery in the event of power interruption or other event that prevents cached data—which is slated for being saved to disk—from actually being saved to disk. In particular, since, at the last checkpoint, a complete set of file system structure has been stored, it is the task of the Non-Volatile Storage Processing sub-module 326 to handle storage of file system request data since the last checkpoint. In this fashion, recovery, following interruption of processing of file system request data, can be achieved by using the file system structure data from the last stored checkpoint and then reprocessing the subsequent file system requests stored in NVRAM.

In operation, the Non-Volatile Storage Processing sub-module 326, for every file system request that is received (other than a non-modifying request), is told by the processor whether to store the request in NVRAM, and, if so told, then stores in the request in NVRAM. (If this sub-module is a part of a multi-node file server system, then the request is also stored in the NVRAM of another node.) No acknowledgment of fulfillment of the request is sent back to the client until the sub-module determines that there has been storage locally in NVRAM by it (and any paired sub-module on another file server node). This approach to caching of file system requests is considerably different from prior art systems wherein a processor first writes the file system request to NVRAM and then to disk. This is approach is different because there is no processor time consumed in copying the file system request to NVRAM—the copying is performed automatically.

In order to prevent overflow of NVRAM, a checkpoint is forced to occur whenever the amount of data in NVRAM has reached a pre-determined threshold. A checkpoint is only valid until the next checkpoint has been created, at which point the earlier checkpoint no longer exists.

Figure 7:
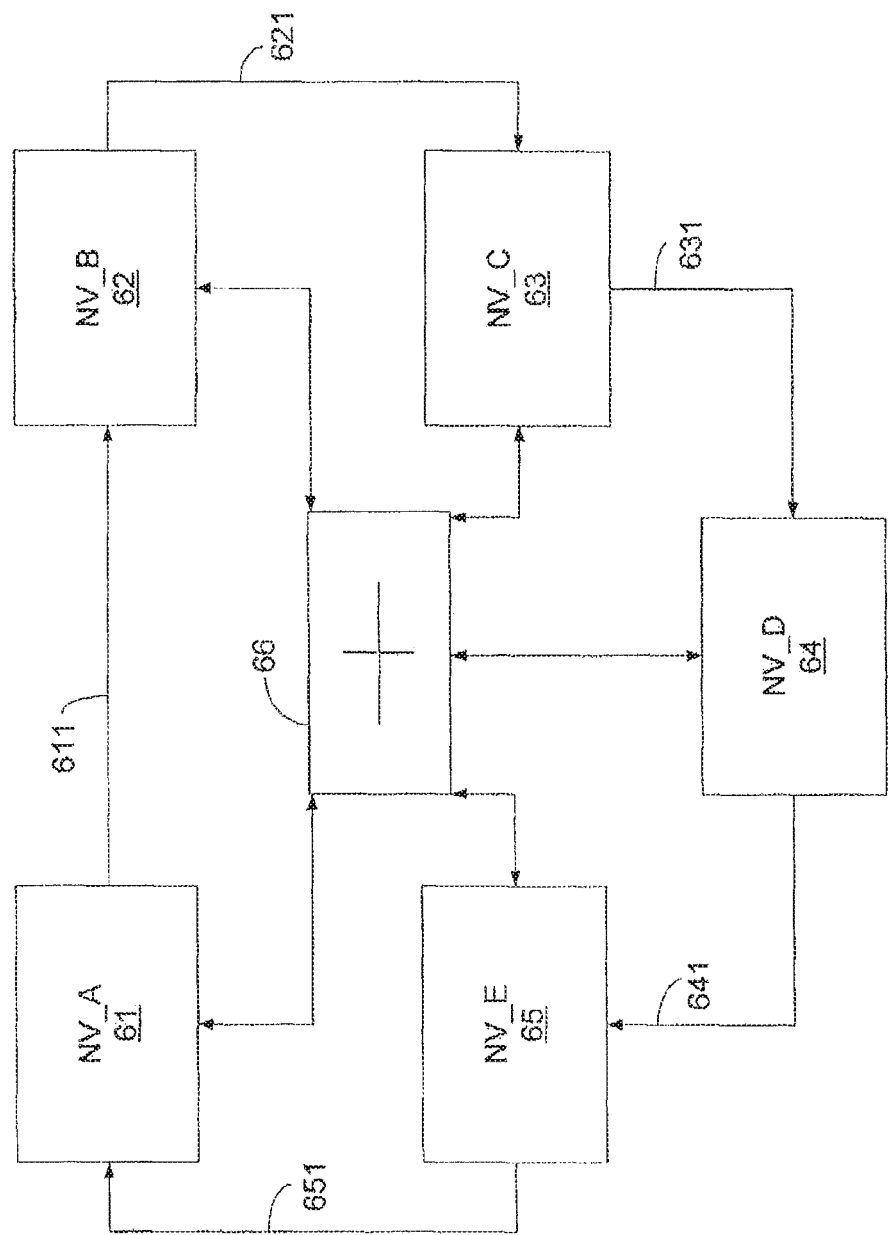
FIG. 7 is an exemplary block diagram of a clustered file server arrangement in accordance with an embodiment of the present invention wherein non-volatile memory is mirrored in a virtual loop configuration.

When file server systems are clustered, non-volatile storage may be mirrored using a switch to achieve a virtual loop. FIG. 7 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module.

In the event of a system failure, the processor detects that the on disk file system is not "clean" and it begins the recovery procedure. Initially, the on disk file system is reverted to the state represented by the last checkpoint stored on disk. Since this is a checkpoint, it will be internally consistent. However, any changes that were requested following the taking of this checkpoint will have been lost. To complete the recovery procedure, these changes must be restored. This is possible since these changes would all have been caused by requests issued by the processor, and (as explained above) all file system changes that have been requested by the processor but have not yet been stored on disk in a checkpoint are stored in NVRAM. The lost changes can therefore be restored by repeating the sequence of file system changing operations that were requested by the processor from the time of the last checkpoint until the system failure.

Figure 5:
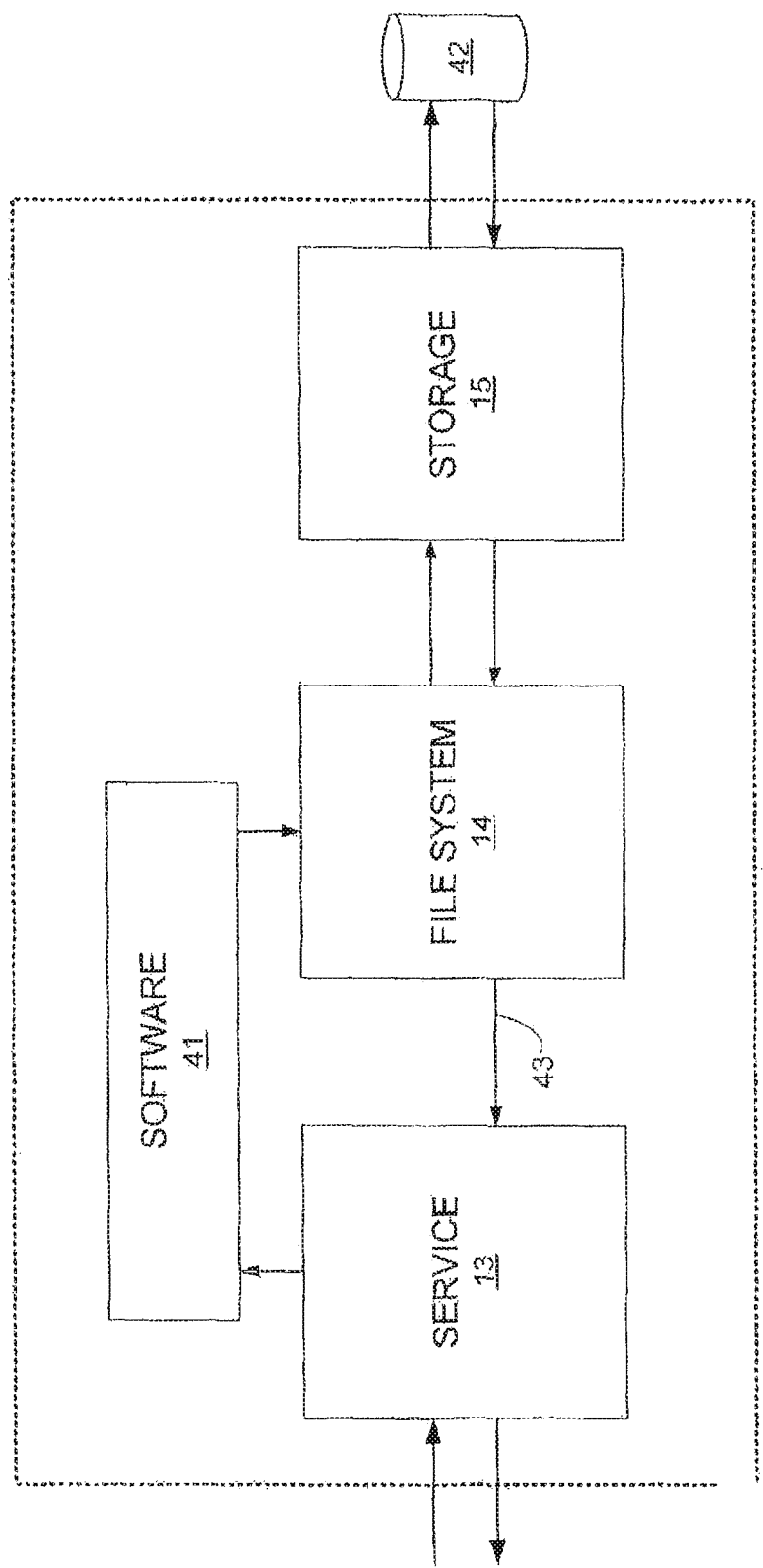
FIG. 5 is an exemplary block diagram showing how control flow may be used in embodiments of the present invention to permit automatic response by the file service module to a network request without intervention of software control.

FIG. 5 is a block diagram showing how control flow may be used in embodiments of the present invention to permit automatic response by the file service module to a network request without prior intervention of software control. In FIG. 5, there is shown service module 13, file system module 14, and storage module 15, as in FIG. 2, with service module 13 and file system module 14 under the control of software 41 and with storage module 15 in communication with storage arrangement 42. The connections between blocks represent control flows rather than data flows. On identification of a file service request by service module 13, the request is typically passed from the service module 13 to software control 41, for example, to handle security and other complex tasks. Then under software control 41, the request is processed by the file system module 14. On the other hand, the response to a file system request, which is not necessarily as complex, is routed from the file system module 14 directly back to the service module 13 over control flow 43 rather than being routed back through software control 41. The software control 41 is eventually informed that the request has been satisfied.

Figure 6:
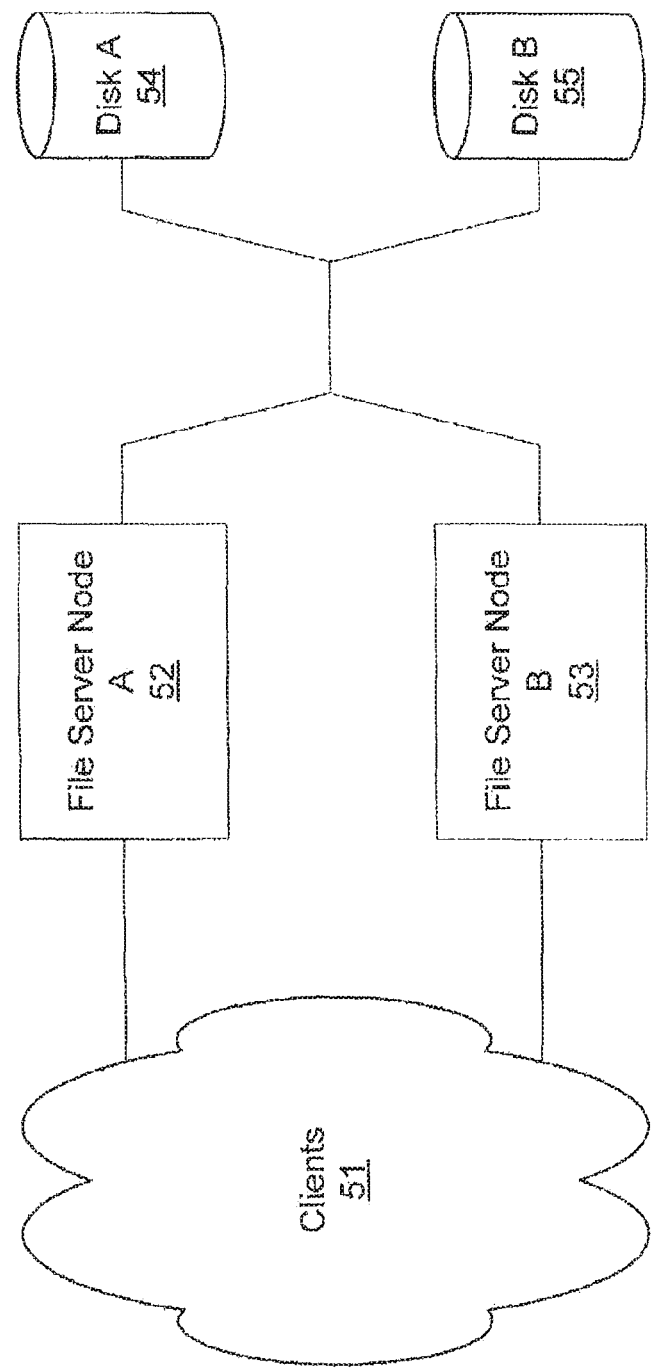
FIG. 6 is an exemplary block diagram of a clustered file server arrangement embodying sector cache locking in accordance with an embodiment of the present invention.

In a cluster of file server nodes accessing common storage, it is necessary to deal with instances wherein multiple nodes may seek to perform conflicting tasks with respect to a common storage location. FIG. 6 is a block diagram of a clustered file server arrangement having sector cache locking in accordance with one exemplary embodiment of the present invention. In this embodiment, file server node A (item 52) and file server node B (item 53), are both in communication with clients 51 and are configured so that each server node may access (that is, read from and write to) both disk A (item 54) and disk B (item 55). Disks A and B are arbitrary storage designators, and are not limited to single disks and also include the use of several disks, or a particular region on a single disk drive, and the mode of storage is any device suitable for, including but not limited to, magnetic and magneto-optical.

When file server systems are clustered, non-volatile storage may be mirrored using a switch to achieve a virtual loop. FIG. 7 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). The Non-Volatile Storage Processing sub-modules 326 interface with associated non-volatile storage (called NVRAM in FIG. 4) to provide a method for recovery in the event of power interruption or other event that prevents cached data—which is slated for being saved to disk—from actually being saved to disk. Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module. In order to prevent overflow of NVRAM, a checkpoint is forced to occur, for example, whenever the amount of data in NVRAM has reached a pre-determined threshold. A checkpoint is only valid until the next checkpoint has been created, at which point the earlier checkpoint is no longer considered current.

Exemplary File System

Figure 8:
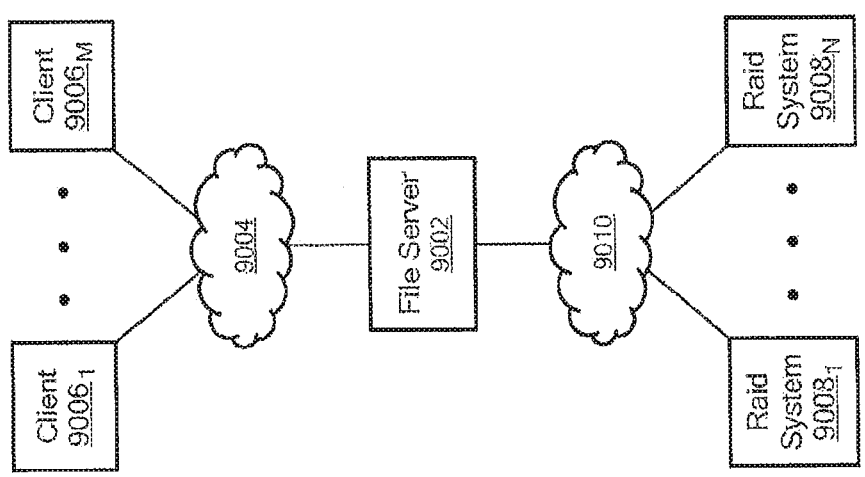
FIG. 8 is an exemplary schematic block diagram of a file storage system in accordance with an exemplary embodiment of the present invention.

FIG. 8 is a schematic block diagram of a file storage system in accordance with an exemplary embodiment of the present invention. The file storage system in FIG. 8 is also described in WO 2012/071335 and U.S. application Ser. No. 13/301,241 entitled "File Cloning and De-Cloning in a Data Storage System", which was filed on Nov. 21, 2011, and are incorporated herein by reference.

Among other things, the file storage system includes a number of file servers (a single file server 9002 is shown for the sake of simplicity and convenience) in communication with various client devices 9006₁-9006M over a communication network 9004 such as an Internet Protocol network (e.g., the Internet) and also in communication with various RAID systems 9008₁-9008N over a storage network 9010 such as a FibreChannel network. The client devices 9006₁-9006M and the file server 9002 communicate using one or more network file protocols, such as CIFS and/or NFS. The file server 9002 and the RAID systems 9008₁-9008N communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more file systems. The file server 9002 can be configured to allow client access to portions of the file systems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based file system including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more).

File System Tree Structure

The file server 9002 stores various types of objects in the file system. The objects may be classified generally as system objects and file objects. File objects are created for storage of user data and associated attributes, such as a word processor or spreadsheet flies. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the file system is managed using a tree structure having root node (referred to as a dynamic super-block or DSB) that is preferably stored at a fixed location within the storage system. Among other things, storing the DSB at a fixed location makes it easy for the file server 9002 to locate the DSB. The file server 9002 may maintain multiple DSBs to store different versions of the file system representing different checkpoints (e.g., a current "working" version and one or more "checkpoint" versions). In an exemplary embodiment, the DSB includes a pointer to an indirection object (described in detail below), which in turn includes pointers to other objects.

Figure 9:
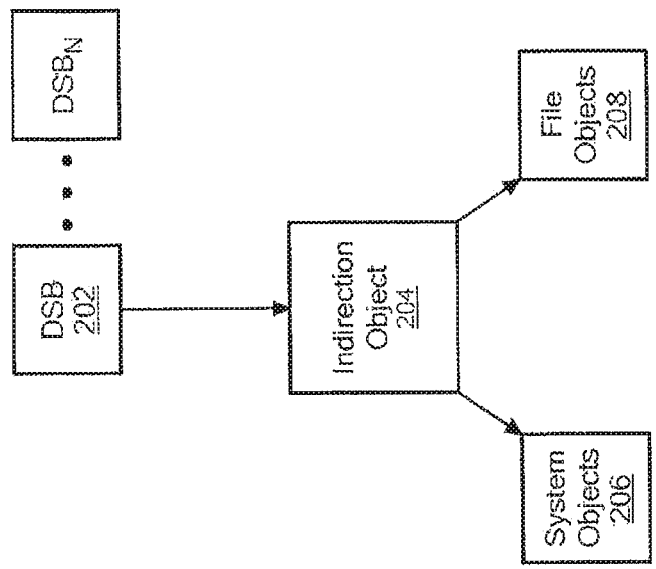
FIG. 9 is an exemplary schematic block diagram showing the general format of a file system in accordance with an exemplary embodiment of the present invention.

FIG. 9 is a schematic block diagram showing the general format of a file system instantiation in accordance with an exemplary embodiment of the present invention. The DSB 202 is a special structure that represents the root of the file system tree structure. Among other things, the DSB 202 includes a pointer to an indirection object 204, which in turn includes pointers to other objects in the file system including system objects 206 and file objects 208.

In embodiments of the present invention, N dynamic superblocks (N>2) are maintained for a file system, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information is stored in each dynamic superblock:

The checkpoint number associated with this dynamic superblock.

The handle of the modified checkpoint objects list object for this checkpoint.

The object number of the modified retained objects list object from the last retained checkpoint.

The state of this checkpoint (i.e., whether or not a checkpoint has been created).

A CRC and various other information to allow the DSB and other structures (e.g., the indirection object) to be checked for validity.

In an exemplary embodiment, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

Object Tree Structure

Generally speaking, each object in the file system, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 10:
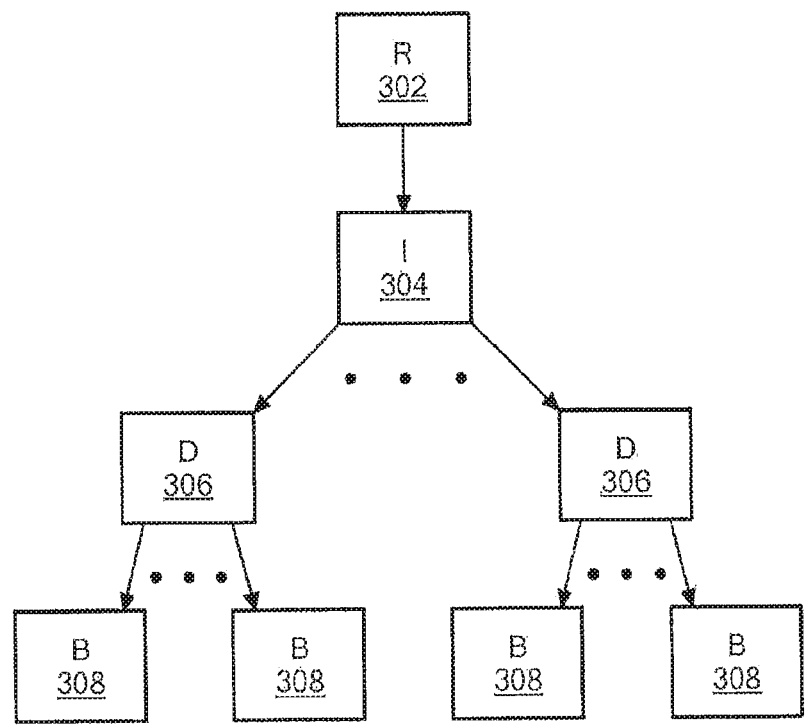
FIG. 10 is an exemplary schematic block diagram showing the general format of an object tree structure in accordance with an exemplary embodiment of the present invention.

FIG. 10 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

Figure 11:
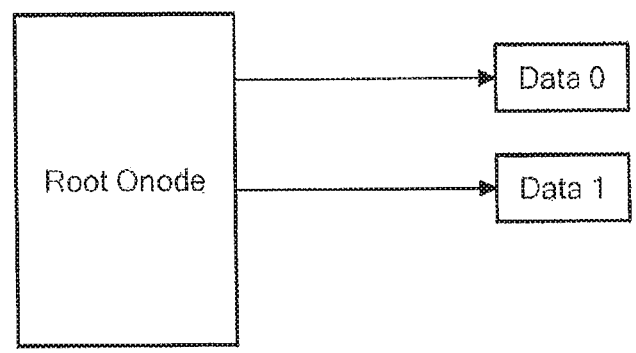
FIG. 11 is an exemplary block diagram showing use of a root onode with no other onodes in accordance with an exemplary embodiment of the present invention.

As data is added to the object, it is first of all put into data blocks pointed to directly from the root node. This is illustrated in the diagram of FIG. 11, showing use of a root node with no other nodes. Note that, for the sake of simplicity in this and all the following diagrams, the root node and direct node are shown as having only two data pointers, and the indirect node is shown as only having two indirect or direct node pointers.

Figure 12:
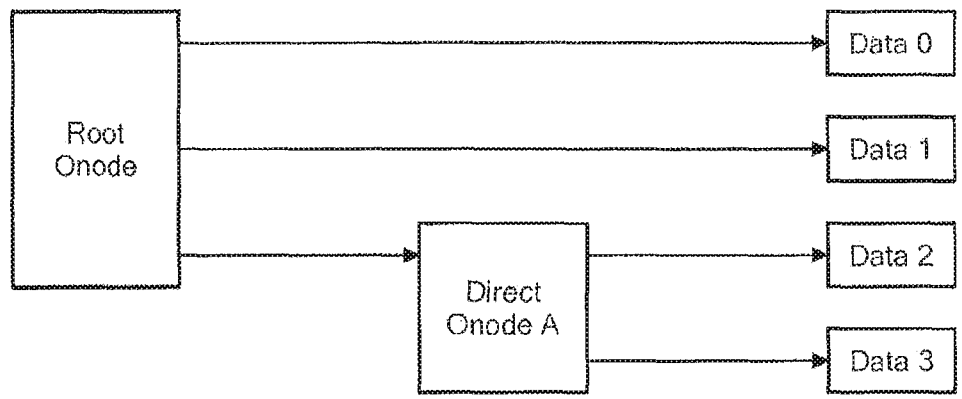
FIG. 12 is an exemplary block diagram showing employment of a root anode with a direct onode in accordance with an exemplary embodiment of the present invention.

Once all the direct block pointers in the root node are filled, then a direct node A is created with a pointer from the root node to the direct node. FIG. 12 shows employment of a root node with this direct node A. Note that the root node has multiple data block pointers but only a single pointer to either a direct or an indirect node.

Figure 13:
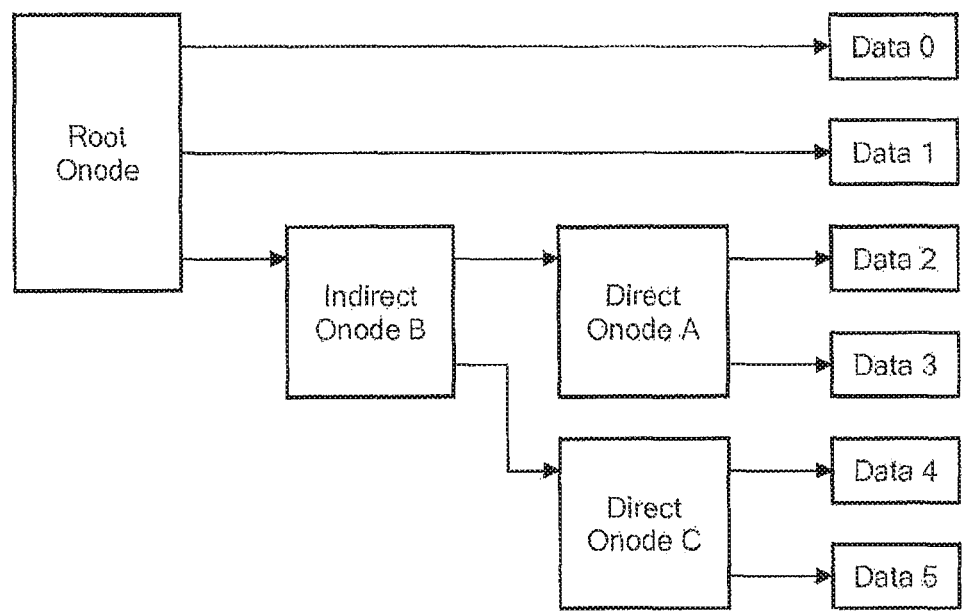
FIG. 13 is an exemplary block diagram showing employment of a root anode with an indirect onode as well as direct anodes in accordance with an exemplary embodiment of the present invention.

If the data in the object grows to fill all the data pointers in the direct node, then an indirect node B is created, as illustrated in FIG. 13. FIG. 13 shows employment of a root node with an indirect node as well as direct nodes. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Figure 14:
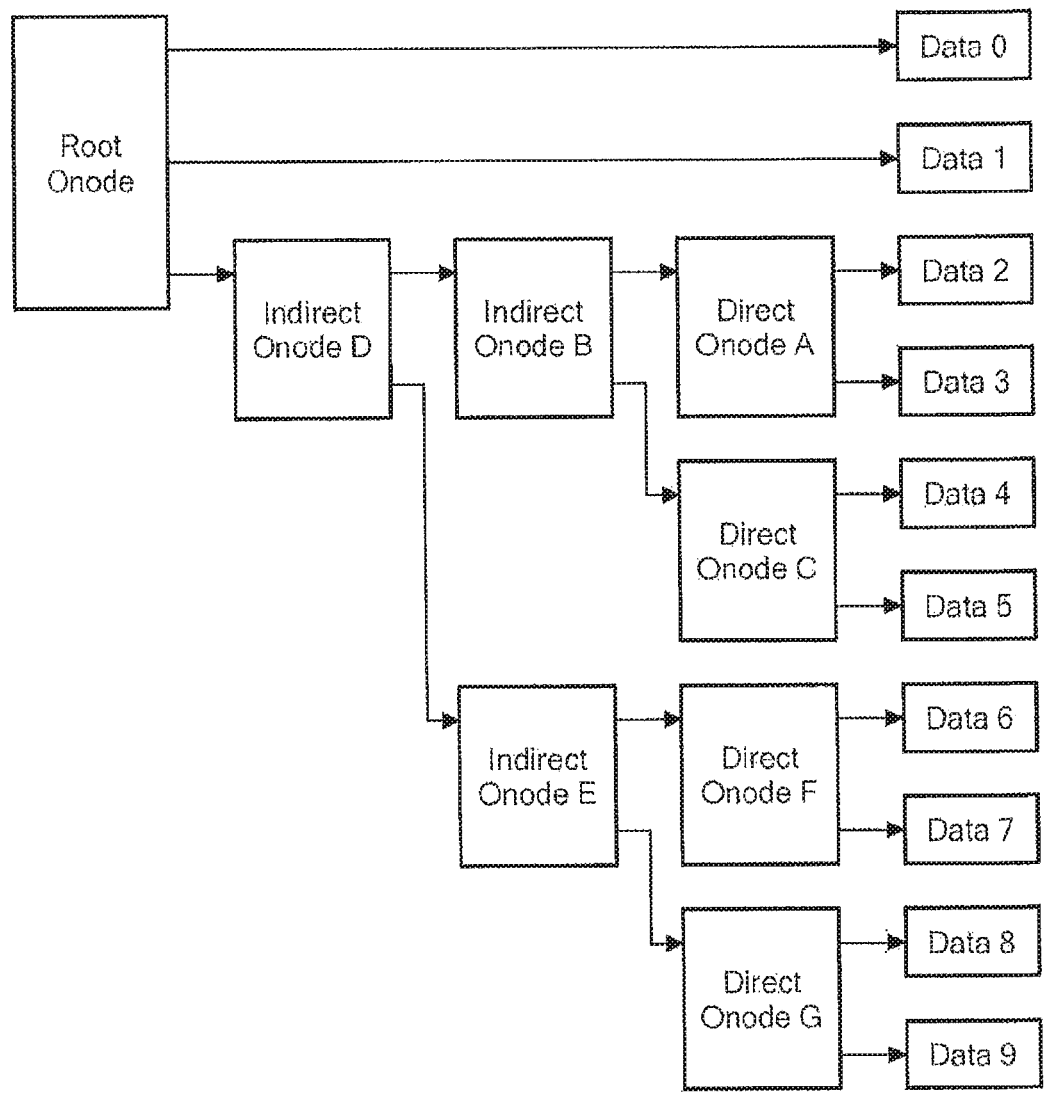
FIG. 14 is an exemplary block diagram illustrating use of multiple layers of indirect anodes placed between the root anode and the direct anodes in accordance with an exemplary embodiment of the present invention.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 14, which illustrates use of multiple layers of indirect nodes placed between the root node and the direct nodes.

This process of adding indirect nodes to create more levels of indirection is repeated to accommodate however much data the object contains.

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node. Also in the object root node is a parameter to identify the type of object for which the object root node is providing metadata. The object type may, for example, be any of a free space object, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation.

Node structure may also be established, in an exemplary embodiment, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an exemplary embodiment, a portion of the object root node is reserved for storage of file attributes.

More generally, the following structures for storage of file attributes are defined in an exemplary embodiment:
  enode (little overhead to update, limited capacity). This structure is defined in the object root node and is 128 bytes in an exemplary embodiment.
  software metadata object (expensive in overhead to update, near infinite capacity). This is a dedicated object for storage of metadata and therefore has its own storage locations on disk; the object is identified in the enode.

Thus, in an exemplary embodiment, each object root node stores the following types of information:
  The checkpoint number.
  The data length for this version of the object.
  The number of levels of indirection used in the runlist for this object,
  The type of the object. This is primarily used as a sanity check when a request comes in to access the object.
  A pointer to an older root node version made for a retained checkpoint (if there is one).
  A pointer to a newer root node version (will only be valid if this is a copy of a root node made for a retained checkpoint).
  Up to 16 data block pointers per root onode. Each data block descriptor includes a pointer to a data block, the checkpoint number, and a hit to say whether the block is zero filled.
  A single pointer to either a direct node or an indirect node.
  The 128 bytes of enode data for this object.
  A CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment:

The checkpoint number.
Pointers to either indirect or direct nodes (e.g., up to 60 such pointers).
A CRC and various sanity dwords to allow the indirect node to be checked for validity.

As discussed above, the direct node provides direct pointers to data blocks on the disk. The following information is stored in the direct node in an exemplary embodiment:

The checkpoint number.
A number of data block descriptors (e.g., up to 62 such descriptors). Each data block descriptor includes a pointer to a data block, the checkpoint number, and a bit to say whether the block is zero filled.
A CRC and various sanity dwords to allow the indirect node to be checked for validity.

As data is deleted from the object and data blocks and direct and indirect nodes are no longer required, they are returned to the free space allocation controller. Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

FIG. 15 shows a representation of object number assignments for an exemplary embodiment of the present invention. Specifically, the file system may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

In an exemplary embodiment, the indirection object 204 is logically organized as a table, with one table entry per object indexed by object number. As shown in FIG. 16, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

In an exemplary embodiment, the indirection object may be implemented as a "pseudo-file" having no actual storage blocks. In an exemplary embodiment, instead of having pointers to actual data blocks in the object tree structure (e.g., as shown in FIG. 9), such pointers in the indirection object tree structure point to the root nodes of the corresponding objects. Thus, in an exemplary embodiment, the indirection object maps each object number to the sector address of the root node associated with the corresponding file system object. The indirection object tree structure can then be traversed based on an object number in order to obtain a pointer to the root node of the corresponding object.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 17:
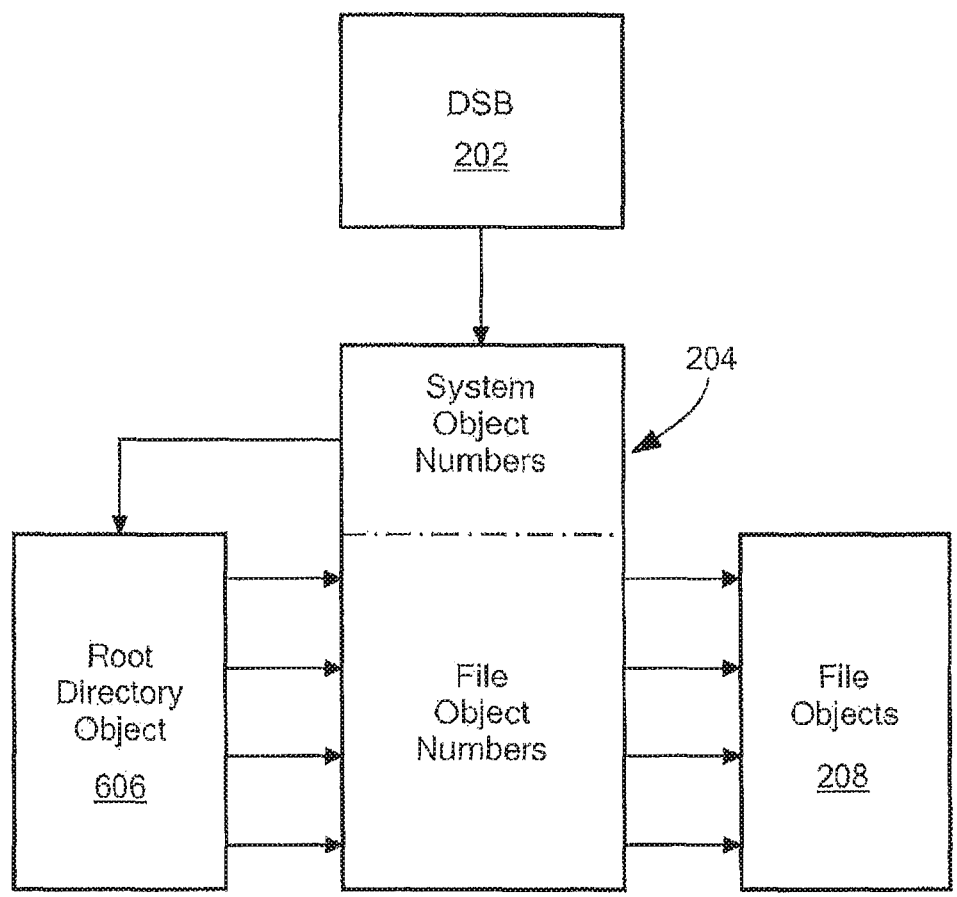
FIG. 17 is an exemplary schematic block diagram demonstrating the general relationship between the DSB, the indirection object, the root direction object, and the file objects, in accordance with an exemplary embodiment of the present invention.

FIG. 17 is a schematic block diagram demonstrating the general relationship between the DSB 202, the indirection object 204, the root directory object 606, and the file objects 208, in accordance with an exemplary embodiment of the present invention. As mentioned above, an entry in the indirection object maps the root directory object number to the disk address of the root directory object's root node, the root directory object maps file names to object numbers, and the indirection object maps object numbers to objects. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

Multi-Way Checkpoints

In certain embodiment, multiple checkpoints may be taken so that multiple versions of the file system can be maintained over time. For example, multiple separate root structures (referred to hereinafter as "dynamic superblocks" or "DSBs") are used to manage multiple instantiations of the file system. The DSBs are preferably stored in fixed locations within the storage system for easy access, although the DSBs may alternatively be stored in other ways. There are typically more than two DSBs, and the number of DSBs may be fixed or variable. There is no theoretical limit to the number of DSBs (although there may be practical limits for various implementations). In this way, if it becomes necessary or desirable to revert the file system back to a previous "checkpoint," there are multiple "checkpoints" from which to choose, providing a better chance that there will be an intact version of the file system to which the file system can be reverted or a checkpoint that contains a particular version of the file system.

With respect to each successive checkpoint, there is stored, on disk, current file structure information that supersedes previously stored file structure information from the immediately preceding checkpoint. Checkpoints are numbered sequentially and are used to temporally group processing of file requests.

As discussed above, exemplary embodiments of the present invention maintain N DSBs (where N is greater than two, e.g., 16). The DSBs are used to take successive checkpoints.

Thus, at any given time, there is a current (working) version of the file system and one or more checkpoint versions of the file system. Because the storage system is typically quite dynamic, the current version of the file system will almost certainly begin changing almost immediately after taking a checkpoint. For example, file system objects may be added, deleted, or modified over time. In order to maintain checkpoints, however, none of the structures associated with stored checkpoints can be permitted to change, at least until a particular checkpoint is deleted or overwritten. Therefore, as objects in the current version of the file system are added, deleted, and modified, new versions of object tree structures are created as needed, and the various pointers are updated accordingly.

Figure 18:
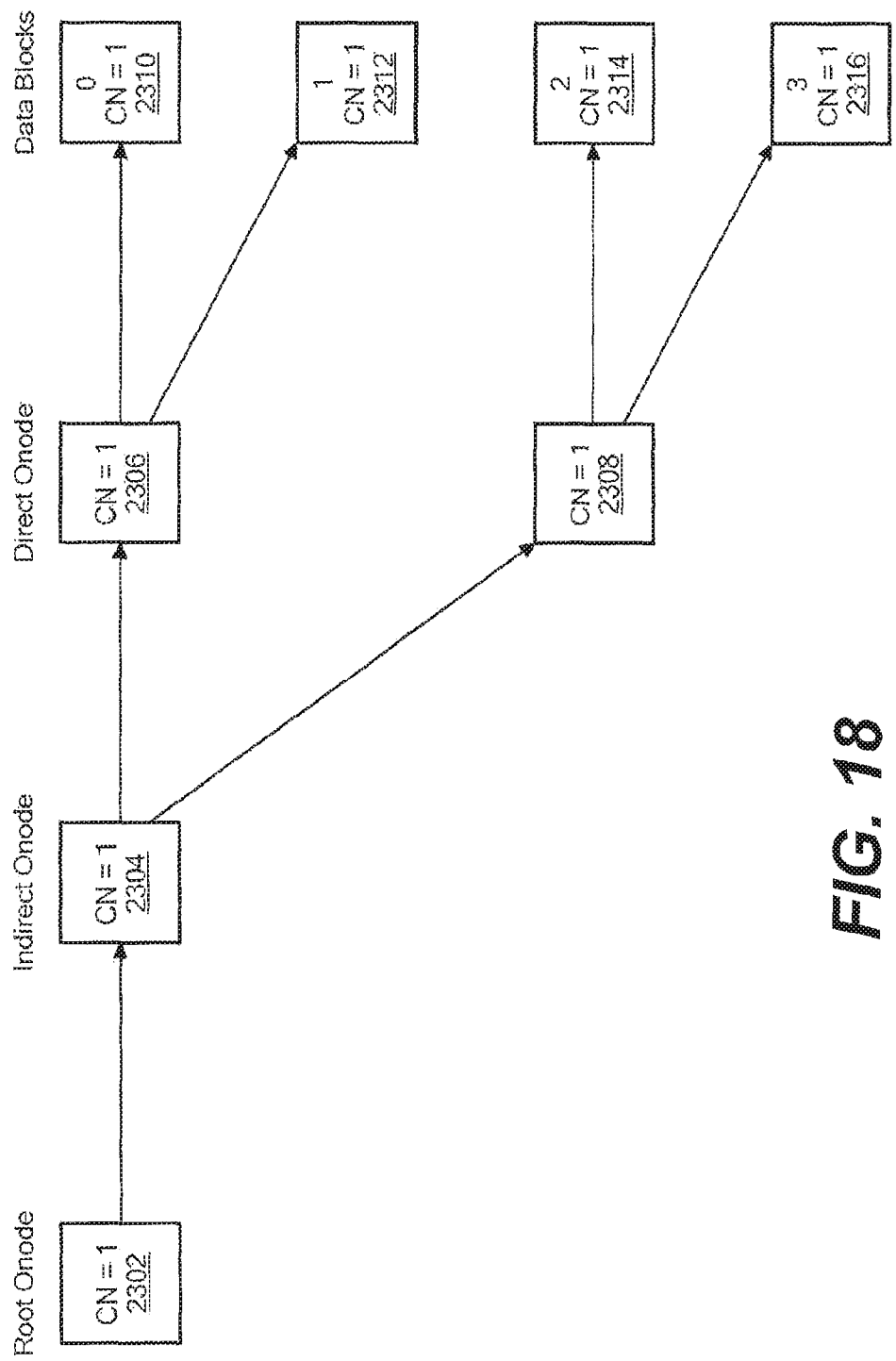
FIG. 18 is an exemplary schematic diagram that shows the structure of an exemplary object that includes four data blocks and various anodes at a checkpoint number 1 in accordance with an exemplary embodiment of the present invention.

For example, FIG. 18 schematically shows an object structure for an exemplary object that was created at a checkpoint number 1. The object includes four data blocks, namely data block 0 (2310), data block 1 (2312), data block 2 (2314), and data block 3 (2316). A direct node 2306 includes a pointer to data block 0 (2310) and a pointer to data block 1 (2312). A direct node 2308 includes a pointer to data block 2 (2314) and a pointer to data block 3 (2316). An indirect node 2304 includes a pointer to direct node 2306 and a pointer to direct node 2308. A root node 2302 includes a pointer to indirect node 2304. All nodes and all data blocks are marked with checkpoint number 1.

Figure 19:
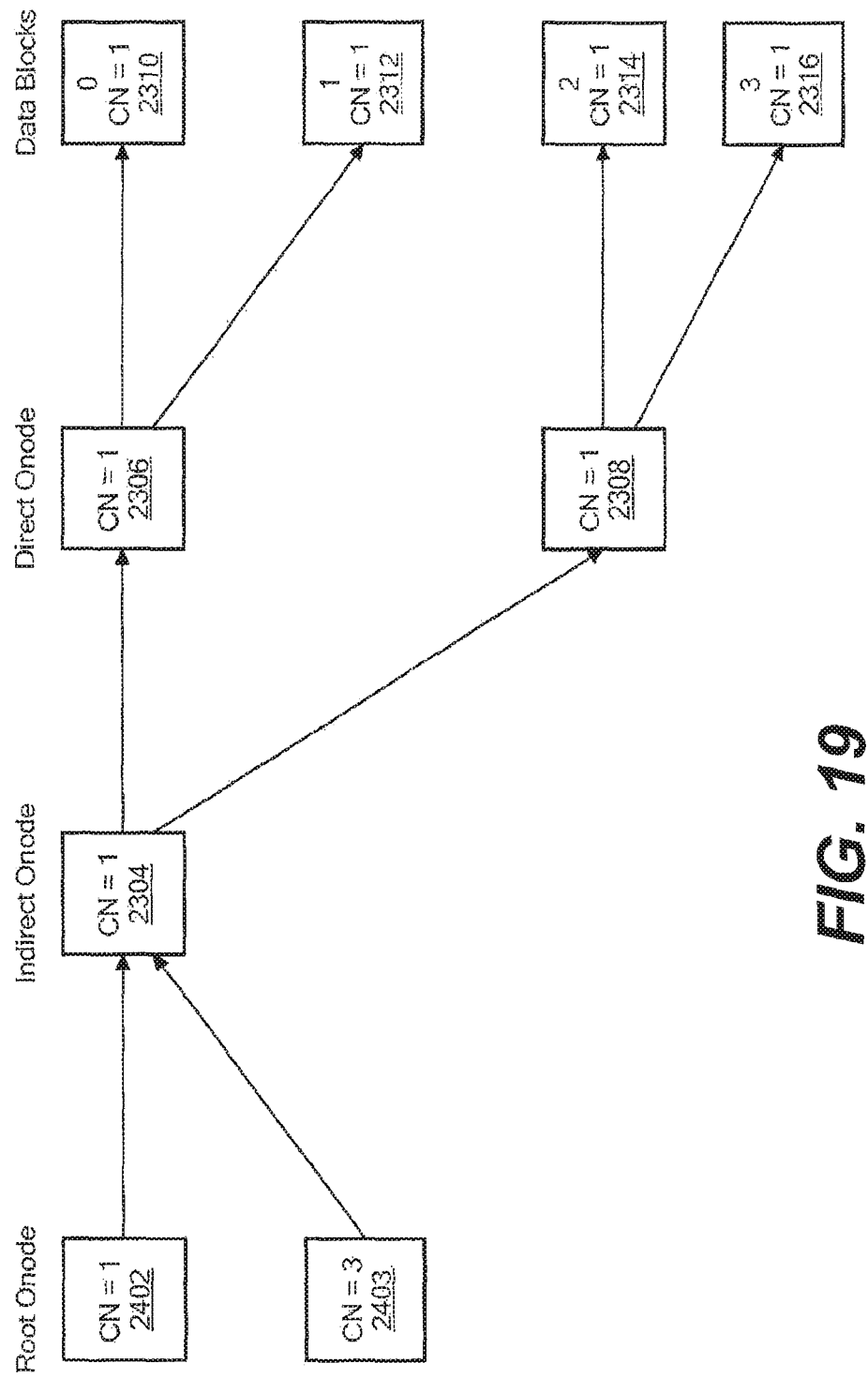
FIG. 19 is an exemplary schematic diagram that shows the structure of the exemplary object of FIG. 18 after a new root node is created for the modified object in accordance with an embodiment of the present invention.

Suppose now that data block 0 (2310) is to be modified in checkpoint number 3. Since root node 2402 is part of an earlier checkpoint, it cannot be modified. Instead, the Object Store sub-module of the file server 9002 saves a copy of the old root node 2302 to free space on the disk and marks this new root node with checkpoint number 3 (i.e., the checkpoint at which it was created). FIG. 19 schematically shows the object structure after creation of the new root node 2403. At this point, both root node 2402 and new root node 2403 point to indirect node 2304.

Figure 20:
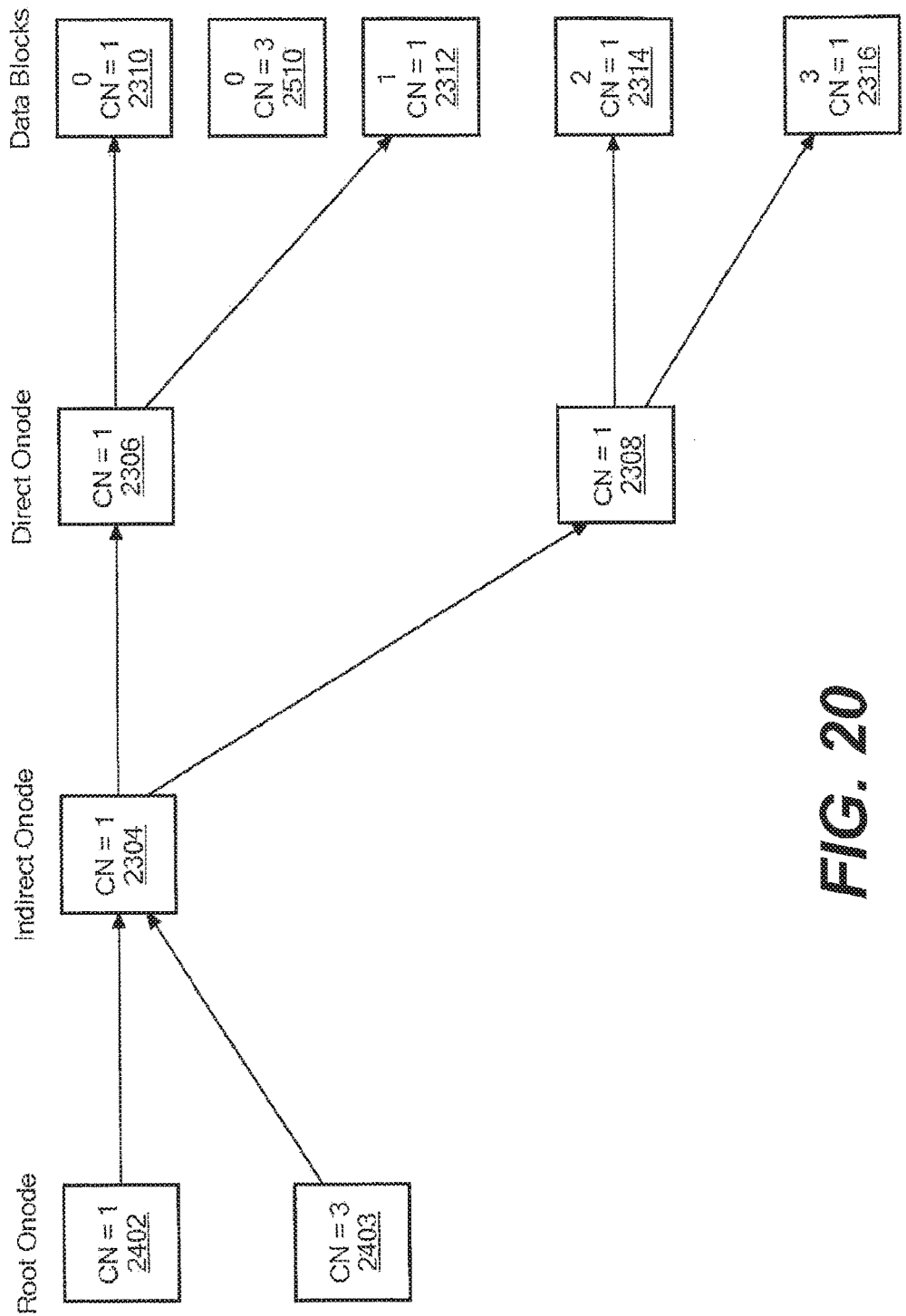
FIG. 20 is an exemplary schematic diagram that shows the structure of the exemplary object of FIG. 19 after a modified copy of a data block is created in accordance with an embodiment of the present invention.

The Object Store sub-module then traverses the object structure starting at the root node until it reaches the descriptor for data block 0 (2310). Since data block 0 (2310) is part of an earlier checkpoint, it cannot be modified. Instead, the Object Store sub-module creates a modified copy of data block 2310 in free space on the disk and marks this new data block with checkpoint number 3 (i.e., the checkpoint at which it was created). FIG. 20 schematically shows the object structure after creation of the new data block 2510.

Figure 21:
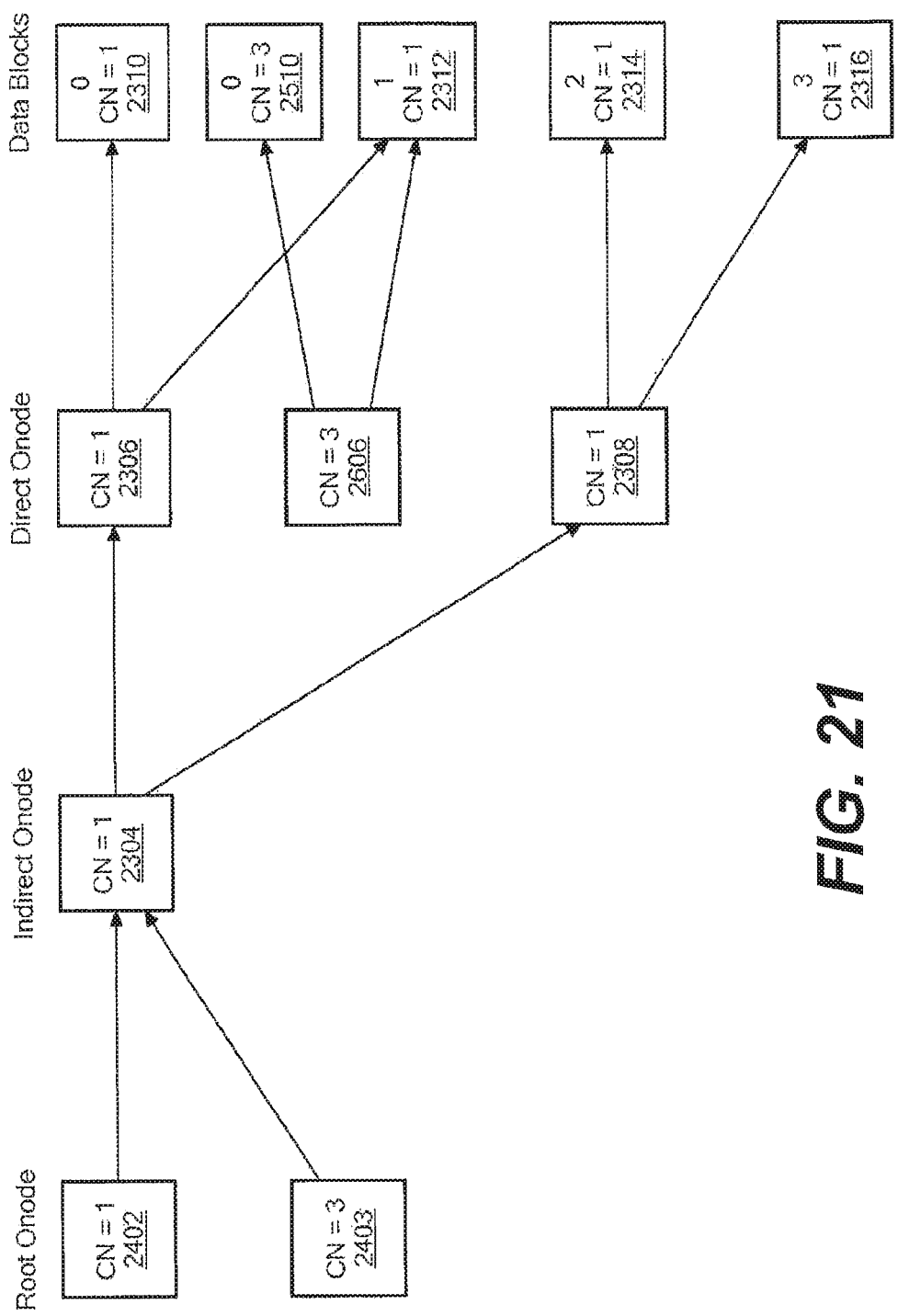
FIG. 21 is an exemplary schematic diagram that shows the structure of the exemplary object of FIG. 20 after a new direct onode is created to point to the modified copy of the data block in accordance with an embodiment of the present invention.

The Object Store sub-module now needs to put a pointer to the new data block 2510 in a direct node, but the Object Store sub-module cannot put a pointer to the new data block 2510 in the direct node 2306 because the direct node 2306 is a component of the earlier checkpoint. The Object Store sub-module therefore creates a modified copy of direct node 2306 to free space on the disk including pointers to the new data block 0 (2510) and the old data block 1 (2312) and marks this new direct node with checkpoint number 3 (i.e., the checkpoint at which it was created). FIG. 21 schematically shows the object structure after creation of the new direct node 2606 including pointers to the new data block 0 (2510) and the old data block 1 (2312).

Figure 22:
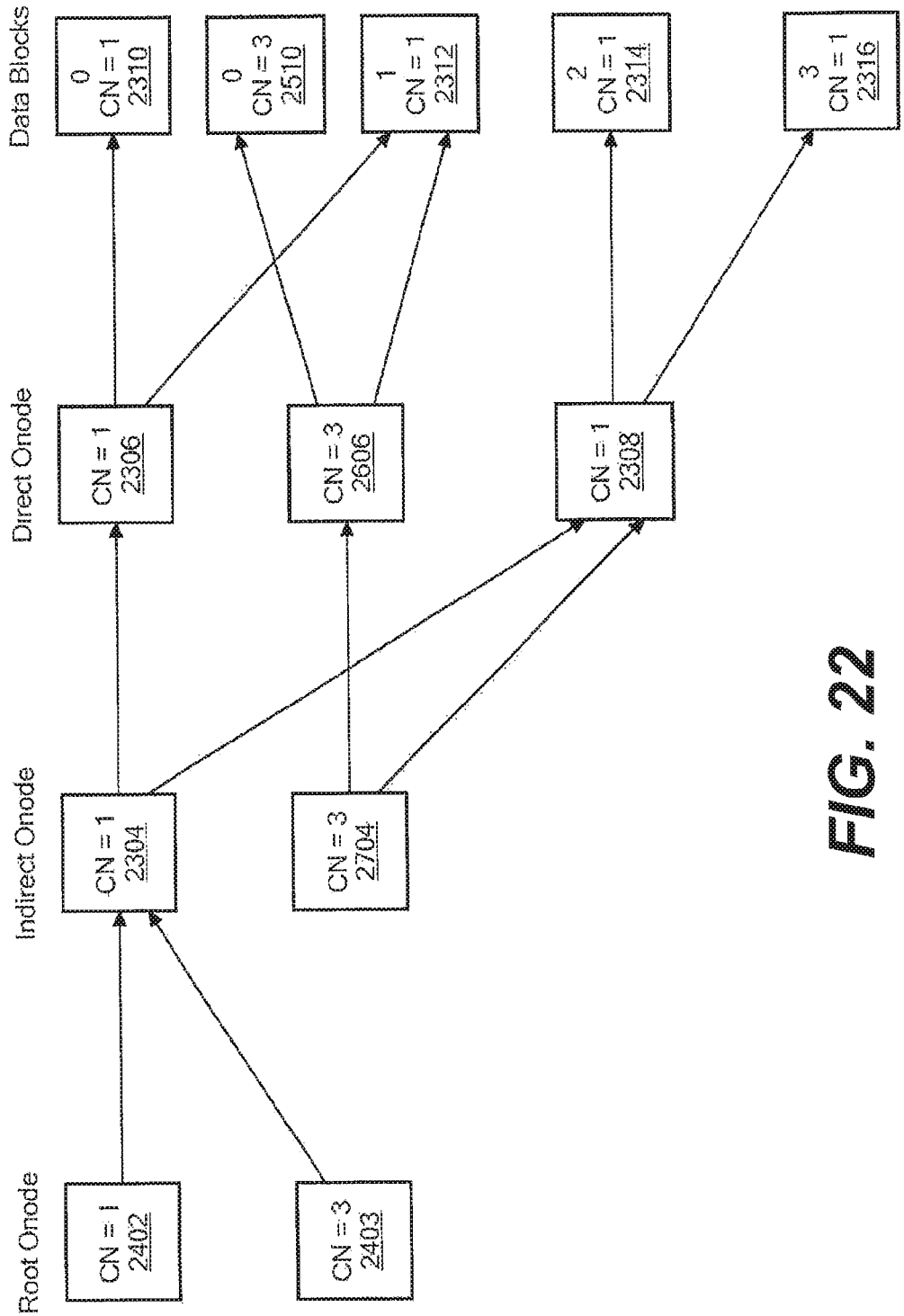
FIG. 22 is an exemplary schematic diagram that shows the structure of the exemplary object of FIG. 21 after a new indirect onode is created to point to the new direct onode in accordance with an embodiment of the present invention.

The Object Store sub-module now needs to put a pointer to the new direct node 2606 in an indirect node, but the Object Store sub-module cannot put a pointer to the new direct node 2606 in the indirect node 2304 because the indirect node 2304 is a component of the earlier checkpoint. The Object Store sub-module therefore creates a modified copy of indirect node 2304 with pointers to the new direct node 2606 and the old direct node 2308. FIG. 22 schematically shows the object structure after creation of the new indirect node including pointers to the new direct node 2606 and the old direct node 2308.

Figure 23:
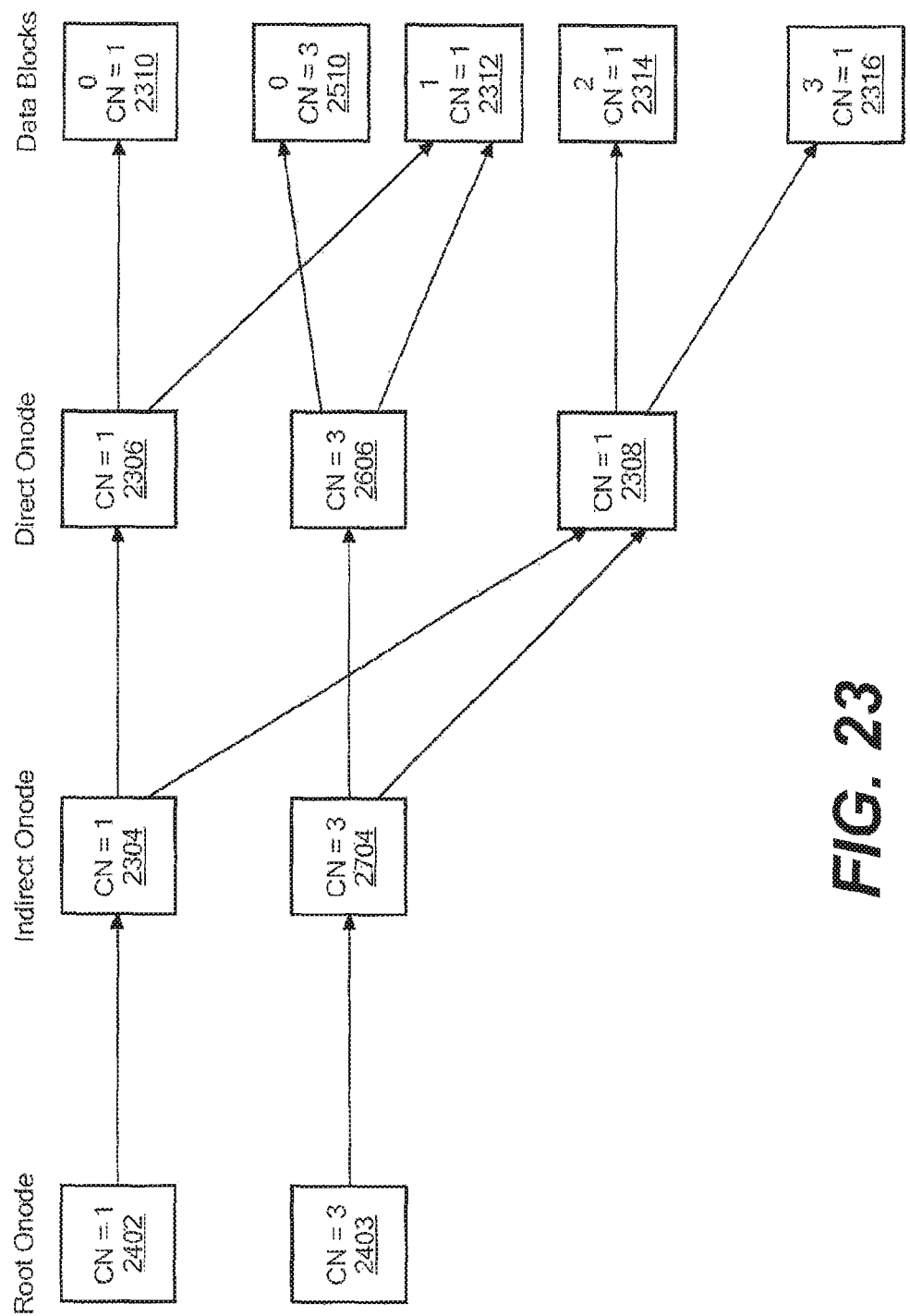
FIG. 23 is an exemplary schematic diagram that shows the structure of the exemplary object of FIG. 22 after the new root node is updated to point to the new indirect onode in accordance with an embodiment of the present invention.

Finally, the Object Store sub-module writes a pointer to the new indirect node 2704 in the new root node 2403. FIG. 23 schematically shows the object structure after the pointer to the new indirect node 2704 is written into the new root node 2403.

It should be noted that, after modification of data block 0 is complete, blocks 2402, 2304, 2306, and 2310 are components of the checkpoint 1 version but are not components of the current checkpoint 3 version of the object; blocks 2308, 2312, 2314, and 2316 are components of both the checkpoint 1 version and the current checkpoint 3 version of the object; and blocks 2403, 2704, 2606, and 2510 are components of the current checkpoint 3 version of the object but are not components of the checkpoint 1 version.

It should also be noted that the new node do not necessarily need to be created in the order described above. For example, the new root node could be created last rather than first.

Thus, when a file system object is modified, the changes propagate up through the object tree structure so that a new root node is created for the modified object. A new root node would only need to be created for an object once in a given checkpoint; the new root node can be revised multiple times during a single checkpoint.

In order for the new version of the object to be included in the current version of the file system, the current indirection object is modified to point to the root node of the modified object rather than to the root node of the previous version of the object. For example, with reference again to FIG. 23, the current indirection object would be updated to point to root node 2403 rather than to root node 2402 for the object number associated with this object.

Similarly, if a new object is created or an existing object is deleted in the current version of the file system, the current indirection object is updated accordingly. For example, if a new object is created, the indirection object is modified to include a pointer to the root node of the new object. If an existing object is deleted, the indirection object is modified to mark the corresponding object number as free.

Since the indirection object is also a tree structure having a root node, modification of the indirection object also propagates up through the tree structure so that a new root node would be created for the modified indirection object. Again, a new root node would only need to be created for the indirection object once in a given checkpoint; the new root node can be revised multiple times during a single checkpoint.

Thus, when a new version of the indirection object is created during a particular checkpoint, the DSB associated with that checkpoint is updated to point to the new root node for the modified indirection object. Therefore, each version of the file system (i.e., the current version and each checkpoint version) generally will include a separate version of the indirection object, each having a different indirection object root node (but possibly sharing one or more indirect nodes, direct nodes, and/or data blocks).

Figure 24:
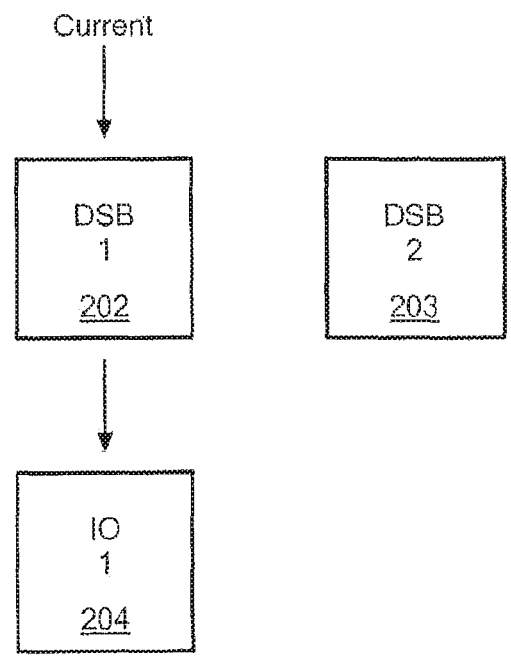
FIG. 24 is an exemplary schematic diagram showing various file system structures prior to the taking of a checkpoint, in accordance with an exemplary embodiment of the present invention using a circular list of DSBs to record checkpoints.

FIG. 24 is a schematic diagram showing various file system structures prior to the taking of a checkpoint, in accordance with an exemplary embodiment of the present invention. Specifically, two DSBs numbered 202 and 203 are shown. DSB 202 is associated with the current version of the file system and includes a pointer to the root node of the current version of the indirection object 204. DSB 203 is the next available DSB.

Figure 25:
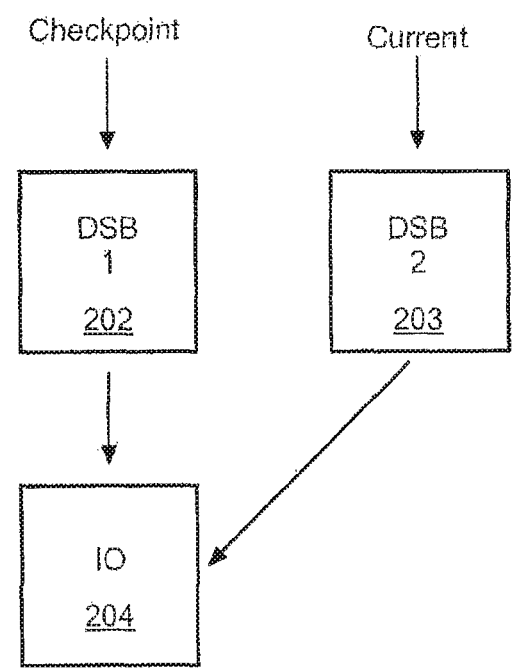
FIG. 25 is an exemplary schematic diagram showing the various file system structures of FIG. 24 after a checkpoint is taken, in accordance with an exemplary embodiment of the present invention using a circular list of DSBs to record checkpoints.

In order to create a checkpoint from the current version of the file system, the next DSB in the circular list (i.e., DSB 203 in this example) is initialized for the new checkpoint. Among other things, such initialization includes writing the next checkpoint number into DSB 203 and storing a pointer to the root node of indirection object 204 into DSB 203. FIG. 25 is a schematic diagram showing the various file system structures after a checkpoint is taken, in accordance with an exemplary embodiment of the present invention. At this point, DSB 202 represents the most recent checkpoint version of the file system, while DSB 203 represents the current (working) version of the file system.

Figure 26:
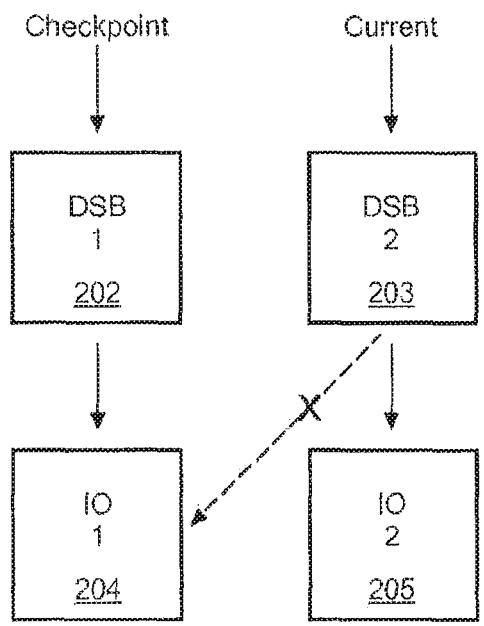
FIG. 26 is an exemplary schematic diagram showing the various file system structures of FIG. 25 after modification of the indirection object, in accordance with an exemplary embodiment of the present invention using a circular list of DSBs to record checkpoints.

As discussed above, the current version of the file system may change as objects are created, modified, and deleted. Also, as discussed above, when the current version of the file system changes, a new version of the indirection object (having a new root node) is created. Consequently, when the current version of the indirection object changes after a checkpoint is taken as depicted in FIG. 25, such that a new indirection object root node is created, the DSB for the current file system version (i.e., DSB 203 in FIG. 25) is updated to point to the new indirection object root node rather than to the prior indirection object root node. FIG. 26 is a schematic diagram showing the various file system structures after modification of the indirection object, in accordance with an exemplary embodiment of the present invention. Here, DSB 202, which is associated with the checkpoint version of the file system, points to the checkpoint version of the indirection object 204, while DSB 203, which is associated with the current version of the file system, points to the root node of new indirection object 205.

Figure 27:
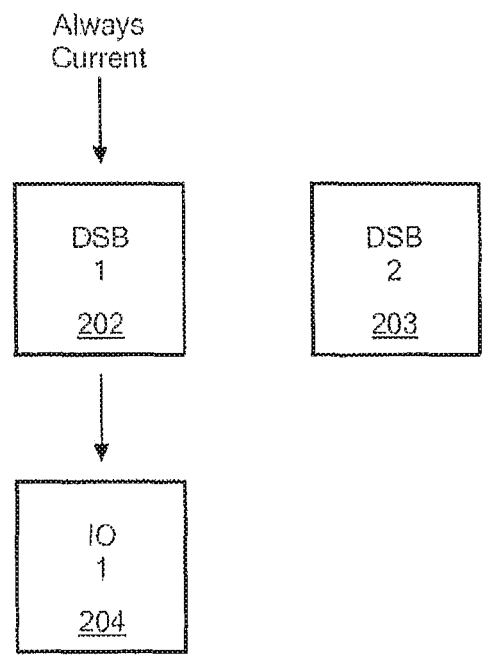
FIG. 27 is an exemplary schematic diagram showing various file system structures prior to the taking of a checkpoint, in accordance with an exemplary embodiment of the present invention in which one DSB is reused to create successive checkpoints.

FIG. 27 is a schematic diagram showing various file system structures prior to the taking of a checkpoint, in accordance with an exemplary embodiment of the present invention. Specifically, two DSBs numbered 202 and 203 are shown. DSB 202 is associated with the current version of the file system and includes a pointer to the root node of the current version of the indirection object 204. DSB 203 is the next available DSB.

In order to create a checkpoint from the current version of the file system, the next DSB 203 is initialized for the new checkpoint. Among other things, such initialization includes writing the next checkpoint number into DSB 203 and storing a pointer to the root node of indirection object 204 into DSB 203. FIG. 25 is a schematic diagram showing the various file system structures after a checkpoint is taken, in accordance with an exemplary embodiment of the present invention. At this point, DSB 203 represents the most recent checkpoint version of the file system, while DSB 202 continues to represent the current (working) version of the file system.

Figure 28:
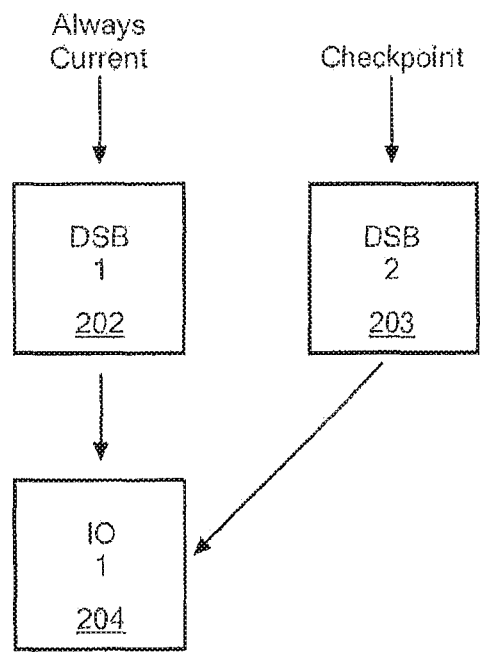
FIG. 28 is an exemplary schematic diagram showing the various file system structures of FIG. 27 after a checkpoint is taken, in accordance with an exemplary embodiment of the present invention in which one DSB is reused to create successive checkpoints.
Figure 29:
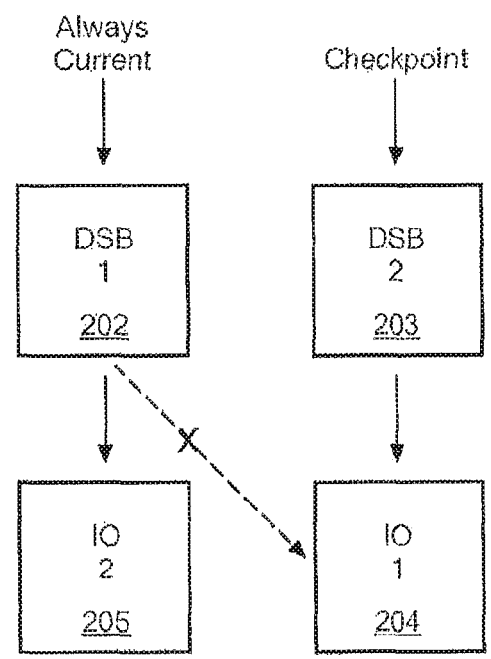
FIG. 29 is an exemplary schematic diagram showing the various file system structures of FIG. 28 after modification of the indirection object, in accordance with an exemplary embodiment of the present invention in which one DSB is reused to create successive checkpoints.

As discussed above, the current version of the file system may change as objects are created, modified, and deleted. Also, as discussed above, when the current version of the file system changes, a new version of the indirection object (having a new root node) is created. Consequently, when the current version of the indirection object changes after a checkpoint is taken as depicted in FIG. 28, such that a new indirection object root node is created, the DSB for the current file system version (i.e., DSB 202 in FIG. 28) is updated to point to the new indirection object root node rather than to the prior indirection object root node. FIG. 29 is a schematic diagram showing the various file system structures after modification of the indirection object, in accordance with an exemplary embodiment of the present invention. Here, DSB 203, which is associated with the checkpoint version of the file system, points to the checkpoint version of the indirection object 204, while DSB 202, which continues to be associated with the current version of the file system, points to the root node of new indirection object 205.

File Cloning

The process of file cloning is explained in U.S. patent application Ser. No. 10/286,015, which is incorporated by reference above. Relevant portions of the process are reprinted below from U.S. patent application Ser. No. 10/286,015 and some portions are omitted. According to an embodiment of the present invention, file cloning is performed according to the following process.

In certain embodiments of the present invention, a file cloning mechanism is employed to allow for quickly creating copies (clones) of files within a file system, such as when a user makes a copy of a file. In exemplary embodiments, a clone of a source object is at least initially represented by a structure containing references to various elements of the source object (e.g., indirect anodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. Some characteristics of such file cloning include:

The data stream of a file system object can be effectively cloned quickly and in a relatively fixed amount of time regardless of the size of the source objects data stream, since none of the user data blocks from which the data stream is comprised need to be copied. Also, none of the metadata blocks describing the data stream (i.e., the indirect/direct onodes) needs to be copied. A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In exemplary embodiments, a file system object is cloned by first creating a new object that represents a read-only clone (snapshot) of the source object, referred to hereinafter as a "data-stream-snapshot" object or "DSS," and then creating a mutable clone of the object. The block pointers and onode block pointer in the root onode of the clone objects are initially set to point to the same blocks as the source object. Certain metadata from the source object (e.g., file times, security, etc.) and named data streams are not copied to the clone object. Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the file system users. Both the source object and the mutable clone object effectively become writable versions of the DSS object and effectively store their divergences from the DSS object.

Before creating the data-stream-snapshot object, the system preferably ensures that the source object is quiescent. In an exemplary embodiment, this involves the following steps:

Step A1. Lock the source object against mutations.

Step A2. Perform a file system checkpoint, which effectively serializes the creation of clones on a given file system (although the creation rate will be limited by the rate at which the file system can commit the previous checkpoint to disk such that storage-side delays will result in longer create times). As explained below, in some embodiments, a file system checkpoint is not necessary in order to clone the object.

Then, after completion of the checkpoint, the system creates the data-stream-snapshot object, which involves the following steps:

Step A3. Create a data-stream-snapshot object.

Step A4. Copy the block pointers from the source object's root onode to the data-stream-snapshot object's root anode.

Step A5. Record the current checkpoint number in the source object's root anode. This is the object's cloned-in-checkpoint number ("CCN"); it defines the earliest checkpoint in which the object's data stream can diverge from its associated data-stream-snapshot object's data stream.

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4a. Associate the new data-stream-snapshot object with the source file's current data-stream-snapshot object.

Step A4b. Record the source file's current cloned-in-checkpoint number in the new data-stream-snapshot object's root anode.

Further objects that have a mutable clone of the data-stream-snapshot object's data stream can be created as follows:

Step B1. Create a new file system object.

Step B2. Copy the block pointers from the data-stream-snapshot object's root anode to the new object's root anode.

Step B3. Record the current checkpoint number in the new object's root anode.

Step B4. Record the handle of the data-stream-snapshot object in the new object's metadata.

Step B5. Increment the data-stream-snapshot object's reference count and add the new object's handle to the data-stream-snapshot object's list of references.

It should be noted that the cloned-in-checkpoint number (CCN) is distinct from an object's checkpoint number (labelled "CN" in FIG. 18), which records the checkpoint of the last modification of the object. Both are stored in the object root anode.

When modifying a user data or metadata block, the file system considers whether the block has already diverged from the clone object's associated data-stream-snapshot object, when deciding whether the block must be written to new space:

A change to a user/metadata block through a pointer with a checkpoint number less than the clone's clone-in-checkpoint number (an un-diverged block) must be written to new space.

A change to a user metadata block through a pointer with a checkpoint number greater than or equal to the clone's cloned-in-checkpoint number (a diverged block) follows the usual rules for objects in the "live" file system substantially as described above.

Some of the file cloning concepts described above can be demonstrated by the examples in U.S. patent application Ser. No. 10/286,015, which is incorporated by reference above.

Figure 30:
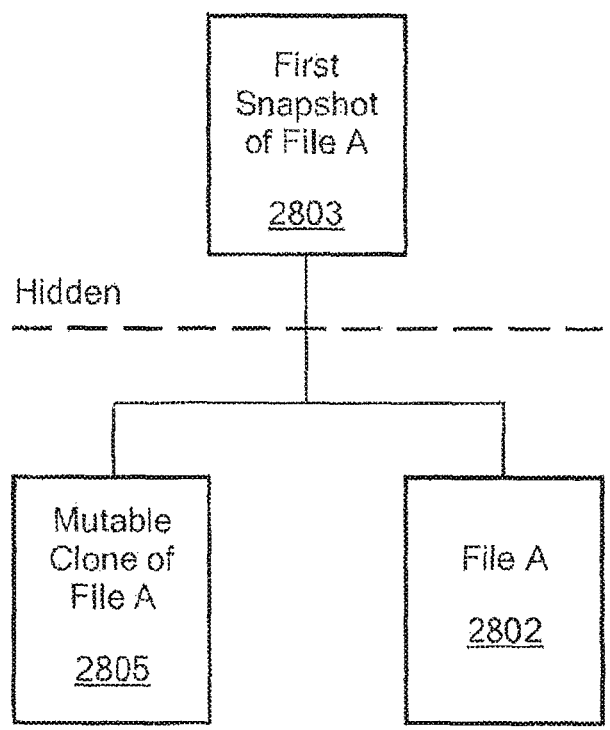
FIG. 30 exemplarily schematically shows the relationship between the source object (FileA) 2802, the hidden data-stream-snapshot object 2803, and the mutable copy 2805, in accordance with an exemplary embodiment of the present invention.

FIG. 30 schematically shows the relationship between the source object (FileA) 2802, the hidden data-stream-snapshot object 2803, and the mutable clone 2805, in accordance with an exemplary embodiment of the present invention.

As is apparent from the following description of exemplary embodiments of the present invention, modifications to the cloning and checkpointing mechanisms described above are implemented.

Figure 31:
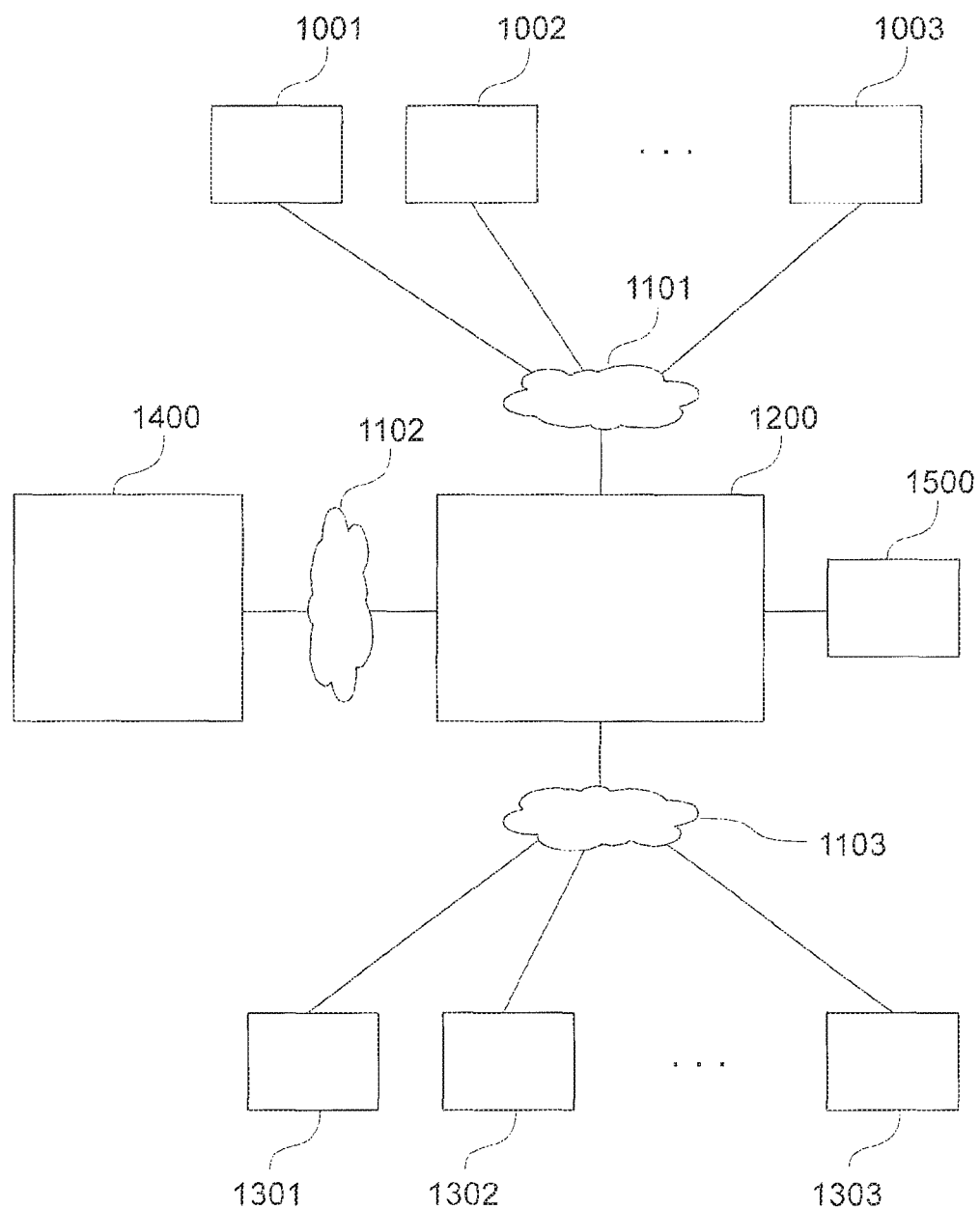
FIG. 31 is an exemplary schematic diagram showing a data storage system according to an exemplary embodiment of the present invention.

FIG. 31 exemplarily shows a schematic illustration of a configuration of a data storage system. The data storage system comprises a file system server 1200 connected to at least one host computer (client) and in FIG. 31 exemplarily a plurality of host computers (clients) 1001, 1002 and 1003 via a communication network 1101 (which may be organized and managed as a LAN, for example). The file system server 1200 is further connected to a plurality of storage apparatuses 1301, 1302 and 1303 via another communication network 1103 (which may be organized and managed as a SAN, for example). In other embodiments, only one storage apparatus may be connected to the file system server 1200, or in other embodiments the file system server and the one or more storage apparatuses may be implemented within one single device.

The file system server 1200 is adapted to manage one or a plurality of file systems, each file system being accessible by one or more of the host computers 1001 to 1003, possibly depending on individually set access rights, and, for accessing the one or more file systems, the host computers issue access requests to the file system server 1200.

Such access may include operations such as write new user data (e.g. write new files) and create new directories of the file system(s), read user data (read user data of one or more files), lookup directories, delete user data (such as delete existing files) and delete directories, modify user data (e.g. modify an existing file such as by modifying the file data or extend the file data by adding new user data to the file), create copies of files and directories, create soft links and hard links, rename files and directories etc. Also, the host computers 1001 to 1003 may issue inquiries with respect to metadata of the file system objects (e.g. metadata on one or more files and metadata on one or more directories of the file systems).

The file system server 1200 manages the access requests and inquiries issued from the host computers 1001 to 1003, and the file system server 1200 manages the file systems that are accessed by the host computers 1001 to 1003. The file system server 1200 manages user data and metadata. The host computers 1001 to 1003 can communicate via one or more communication protocols with the file system server 1200, and in particular, the host computers 1001 to 1003 can send I/O requests to the file system server 1200 via the network 1101.

A management computer 1500 is exemplarily connected to the file system server 1200 for enabling control and management access to the file system server 1200. An administrator/user may control and adjust settings of the file system management and control different functions and settings of the file system server 1200 via the management computer 1500. For controlling functions and settings of the file system management of the file system server 1200, the user can access the file system server 1200 via a Graphical User Interface (GUI) and/or via a Command Line Interface (CLI). In other embodiments such control of the file system management of the file system server 1200 can be performed via one or more of the host computers instead of the management computer 1500.

The file system server 1200 is additionally connected to the one or more storage apparatuses 1301 to 1303 via the network 1103, and the user data (and potentially also the metadata of the one or more file systems managed on the file system server 1200) is stored to storage devices of the storage apparatuses 1301 to 1303, wherein the storage devices may be embodied by plural storage disks and/or flash memory devices. In some embodiments, the storage devices of the storage apparatuses 1301 to 1303 may be controlled according to one or more RAID configurations of specific RAID levels.

Exemplarily, the file system server 1200 is additionally connected to a remote storage apparatus 1400 via another communication network 1102 for remote mirroring of the file system data (user data and/or metadata) to a remote site. Such remote mirroring may be performed synchronously and asynchronously, for example, and settings of the function of the remote mirror operation may be controlled also via the management computer 1500. The storage apparatus 1400 may be comprised of one or more apparatuses similar to the storage apparatuses 1301 to 1303 or it may be embodied by another remote file system server connected to one or more apparatuses similar to the storage apparatuses 1301 to 1303.

Figure 32:
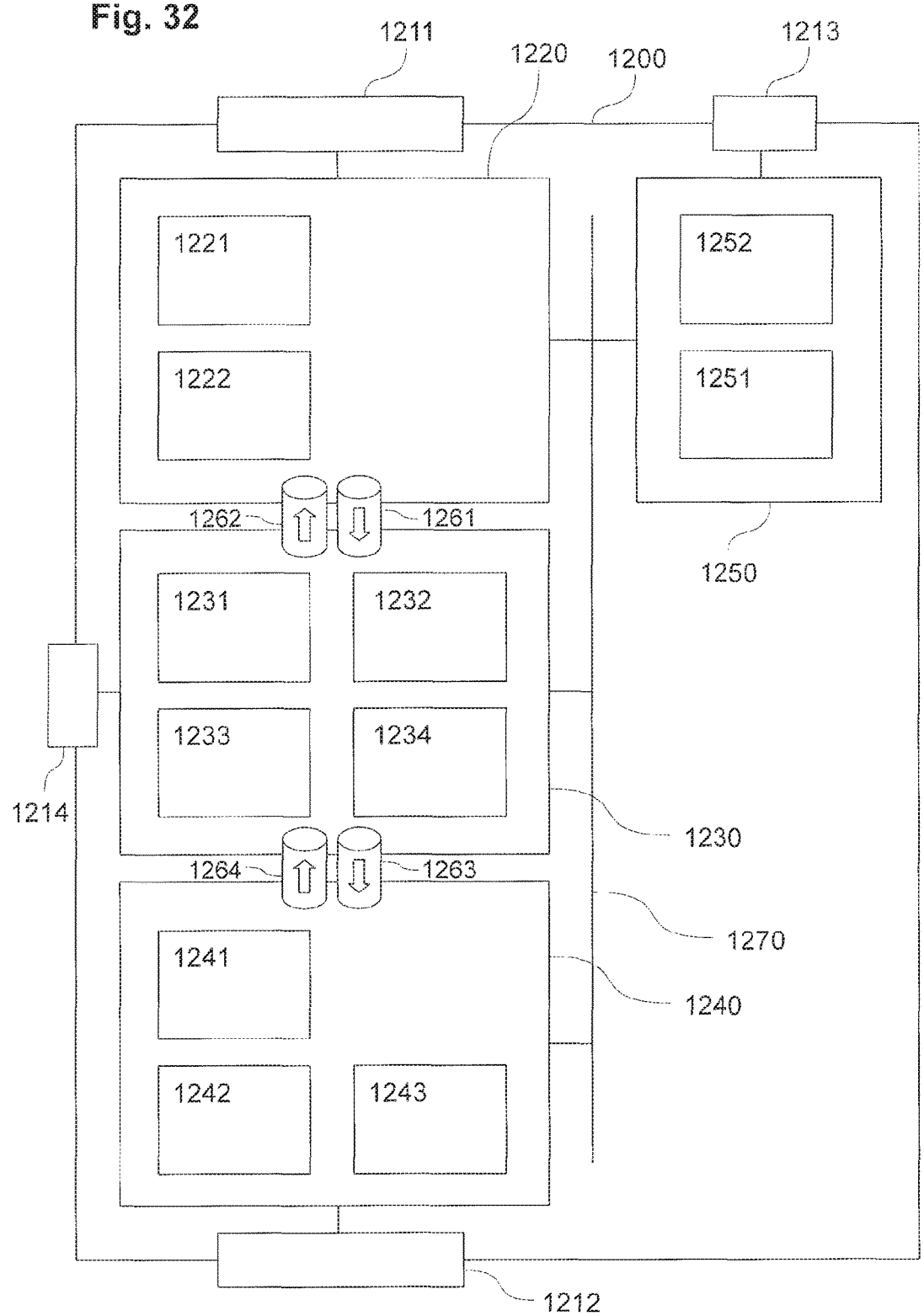
FIG. 32 is an exemplary schematic diagram showing an architecture of a file system server according to an exemplary embodiment of the present invention.

FIG. 32 exemplarily shows a schematic illustration of a configuration of a file system server 1200 (file system management apparatus) according to an exemplary embodiment, please also see FIGS. 1 to 3 for related implementations. The file system server 1200 comprises a network interface 1211 for connection to the host computers 1001 to 1003 (e.g. based on Ethernet connections or other technologies), a disk interface 1212 (or also referred to as a storage interface in that the "disk interface" of the file system server may not connect to a disk itself but rather connect to a network for communicating with a storage apparatus such as one or more storage arrays) for connection to the storage apparatuses 1301 to 1303 (e.g. based on Fibre Channel connections or other technologies), a management interface 1213 for connection to the management computer 1500 (e.g. based on Ethernet connections or other technologies), and a remote network interface 1214 for connection to the remote storage apparatus 1400 (e.g. based on Fibre Channel or Ethernet connections or other technologies).

The inner architecture of the file system server 1200 exemplarily comprises four functionally and/or structurally separated portions, each of which may be implemented as a software-based implementation, as a hardware-based implementation or as a combination of software-based and hardware-based implementations. For example, each of the portions may be provided on a separate board, in a separate module within one chassis or in a separate unit or even in a separate physical chassis.

In some embodiments of the present invention, the below described network interface portion 1220, the data movement and file system management portion 1230 and the disk interface portion 1240 are preferably realized as one or more hardware-side processing devices (preferably each including one or more programmable hardware-based chips such as e.g. FPGAs) which execute processing based on programmable hardware-implemented ICs, while the management portion 1250 is preferably realized as a software-side processing device including one or more CPUs executing control and management programs by use of the one or more CPUs.

Specifically, the file system server 1200 comprises a network interface portion 1220 (also referred to as NIP) that is connected to the network interface 1211, a data movement and file system management portion 1230 (also referred to as DFP) which may be further separated (functionally and/or structurally) into a data movement portion (also referred to as DMP) and a file system portion (also referred to as FMP), a disk interface portion 1240 (also referred to as DIP) that is connected to the disk interface 1212, and a management portion 1250 (also referred to as MP). The various components may be connected by one or more bus systems and communication paths such as, e.g. the bus system 1270 in FIG. 32. Exemplarily, the data movement and file system management portion 1230 is connected to the remote network interface 1214.

The network interface portion 1220 is configured to manage receiving and sending data packets from/to hosts via the network interface 1211. The network interface portion 1220 comprises a processing unit 1221 (which may comprises one or more processors such as one or more CPUs (in particular, here and in other aspects, one or more CPUs may be provided as single-core CPUs or even more preferably as one or more multi-core CPUs) and/or one or more programmed or programmable hardware-implemented chips or ICs such as for example one or more Field Programmable Gate Arrays referred to as FPGAs) and a network interface memory 1222 for storing packets/messages/requests received from the host(s), prepared response packets/messages prior to sending the packets to host(s), and/or for storing programs for control of the network interface portion 1220 and/or the processing unit 1221.

The network interface portion 1220 is connected to the data movement and file system management portion 1230 via the fastpath connections 1262 and 1261 for sending received packets, messages, requests and user data of write requests to the data movement and file system management portion 1230 and for receiving packets, messages, requests, file system metadata and user data in connection with a host-issued read request from the data movement and file system management portion 1230. The fastpath connections (communication paths 1261 and 1262) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 is configured to manage data movement (especially of user data) between the network interface portion 1220 and the disk interface portion 1240, and to further manage the one or more file system(s), in particular manage file system objects of the one or more file systems and metadata thereof, including the management of association information indicating an association relation between file system objects and actual data stored in data blocks on the storage devices or the storage apparatuses 1301 to 1303.

The data movement and file system management portion 1230 comprises a processing unit 1231 (which may comprises one or more processors such as one or more CPUs and/or one or more programmed or programmable hardware-implemented chips or ICs such as for example one or more Field Programmable Gate Arrays referred to as FPGAs) and a DFP memory 1232 for storing packets/messages/requests received from the NIP, prepared response packets/messages prior to sending the packets to the NIP, and/or for storing programs for control of the data movement and file system management portion 1230 and/or the processing unit 1231.

The data movement and file system management portion 1230 is connected to the disk interface portion 1240 via the fastpath connections 1263 and 1264 for sending received packets, messages, requests and user data of write requests to the disk interface portion 1240 and for receiving packets, messages, requests, and user data in connection with a host-issued read request from the disk interface portion 1240. The fastpath connections (communication paths 1263 and 1264) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 exemplarily further comprises a metadata cache 1234 for storing (or temporarily storing) metadata of the file system(s) and file system objects thereof used for managing the file system.

The data movement and file system management portion 1230 exemplarily further comprises a non-volatile memory 1233 (such as e.g. an NVRAM) for storing data of packets, messages, requests and, especially, for storing user data associated with write requests and read requests. Especially, since the data of write requests can be saved quickly and efficiently to the non-volatile memory 1233 of the DFP 1230, the response to the hosts can be issued quickly directly after the associated data has been safely stored to the non-volatile memory 1233 even before actually writing the data to one or more caches or to the storage devices of the storage apparatuses 1301 to 1303.

The disk interface portion 1240 is configured to manage receiving and sending user data, data packets, messages, instructions (including write instructions and read instructions) from/to storage apparatuses 1301 to 1303 via the network interface 1212.

The disk interface portion 1240 comprises a processing unit 1241 (which may comprises one or more processors such as one or more CPUs and/or one or more programmed or programmable hardware-implemented chips or ICs such as for example one or more Field Programmable Gate Arrays referred to as FPGAs) and a disk interface memory 1242 for storing packets/messages/requests received from the DFP and/or for storing programs for control of the disk interface portion 1240 and/or the processing unit 1241.

In addition, the disk interface portion 1240 exemplarily further comprises a user data cache 1243 (sometimes also referred to as disk interface cache or sector cache, not to be confused with a cache of a storage apparatus described later) for storing or temporarily storing data to be written to storage apparatuses and/or data read from storage apparatuses via the disk interface 1212.

Finally, the management portion 1250 connected to the management interface 1213 comprises a processing unit 1251 (which may comprises one or more processors such as one or more CPUs and/or one or more programmed or programmable hardware-implemented chips or ICs such as for example one or more Field Programmable Gate Arrays referred to as FPGAs) and a management memory 1252 for storing management information, management setting information and command libraries, and/or for storing programs for control of the management portion 1250 and/or the processing unit 1251, e.g. for controlling a Graphical User Interface and/or a Command Line Interface provided to the user of the management computer 1500.

Figure 33A:
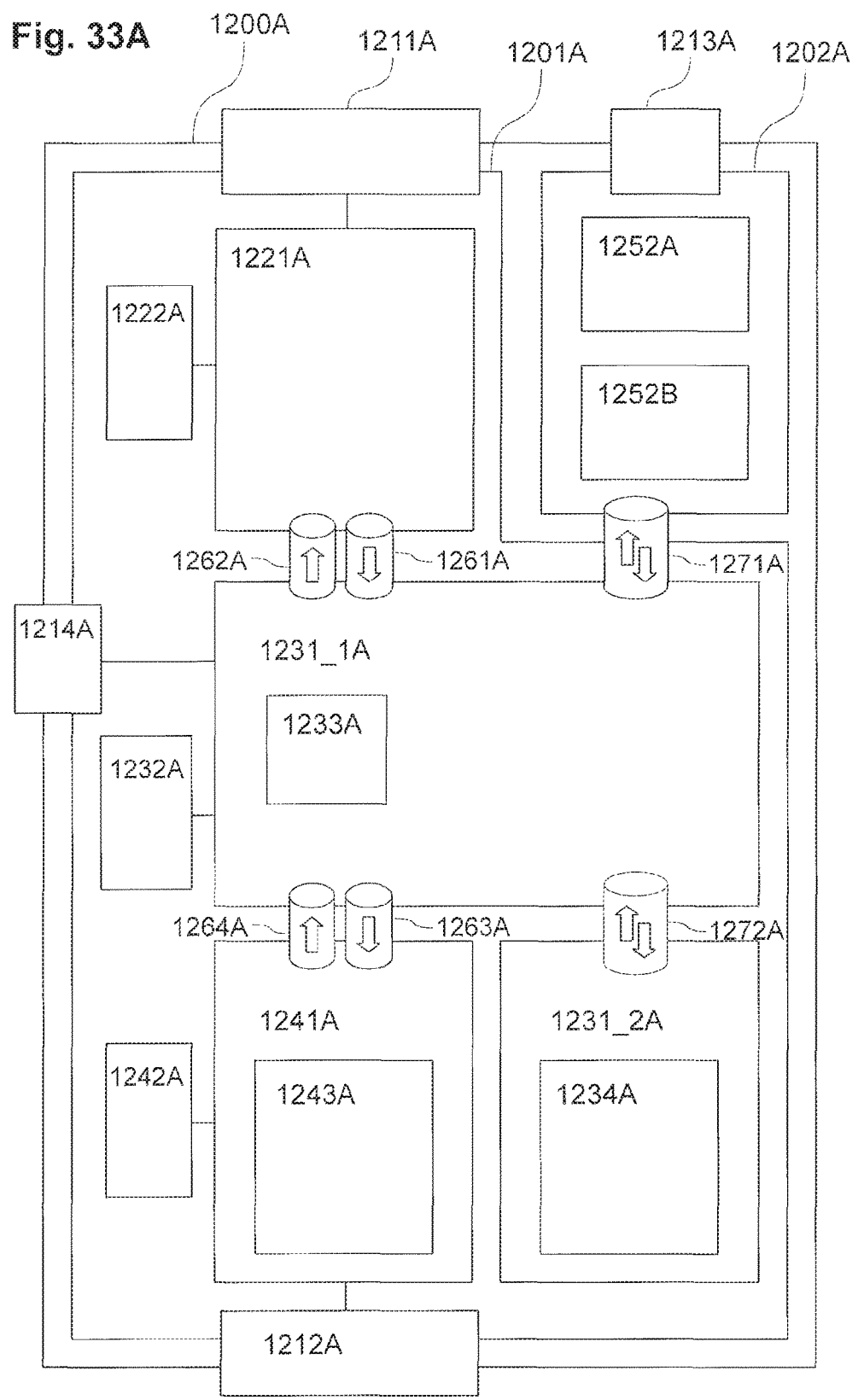
FIG. 33A is another exemplary schematic diagram showing an architecture of a file system server according to an exemplary embodiment of the present invention.

FIG. 33A exemplarily shows a schematic illustration of a more specific configuration of a file system server 1200A (file system management apparatus) according to an embodiment.

Exemplarily, the file system server 1200A comprises a file system unit 1201A and a management unit 1202A. In some embodiments, the file system unit 1201A and the management unit 1202A may be embodied by separate boards, i.e. a file system board and a management board, that may be implemented in one server module (one or more of the modules may be implemented in one server chassis) or as separate modules, e.g. as a file system module and a management module, which may be implemented in one or more server chassis.

In this embodiment of FIG. 33A, the management unit 1202A may functionally and/or structurally correspond to the management portion 1250 of FIG. 32. The management unit 1202A (e.g. a management board) comprises the management interface 1213A (corresponding to the management interface 1213), the processing unit 1251A (corresponding to the processing unit 1251), preferably comprising one or more CPUs, and the management memory 1252A (corresponding to the management memory 1252). In some embodiments, the management unit 1202A can be regarded as part of a software-side processing device (preferably including one or more CPUs).

The file system unit 1201A may functionally and/or structurally correspond to the portions 1220 to 1240 of FIG. 32. The file system unit 1201A (e.g. a file system board) comprises the network interfaces 1211A (corresponding to network interface 1211), the disk interface 1212A (corresponding to disk interface 1212), and the remote network interface 1214A (corresponding to remote network interface 1214).

Corresponding to the network interface portion 1220, the file system unit 1201A comprises a network interface memory 1222A and a network interface unit (NIU) 1221A which corresponds to processing unit 1221 and may be embodied by one or more programmed or programmable hardware-implemented chips or ICs such as for example one or more Field Programmable Gate Arrays referred to as FPGAs. In some embodiments, the network interface unit 1221A can be regarded as part of a hardware-side processing device (preferably including one or more programmable hardware-based chips such as e.g. FPGAs).

Corresponding to the disk interface portion 1240, the file system unit 1201A comprises a disk interface memory 1242A and a disk interface unit 1241A (DIU), which corresponds to processing unit 1241, and may be embodied by one or more programmed or programmable hardware-implemented chips or ICs such as for example one or more Field Programmable Gate Arrays referred to as FPGAs. The disk interface unit 1241A comprises the sector cache memory 1243A (corresponding to the sector cache memory 1243). In some embodiments, the disk interface unit 1241A can be regarded as part of a hardware-side processing device (preferably including one or more programmable hardware-based chips such as e.g. FPGAs).

Corresponding to the data movement portion of the DFP 1230, the file system unit 1201A comprises a DM memory 1232A (corresponding to DMP memory 1232), a DM unit 1231_1A (data movement management unit—DMU) and a FS unit 1231_2A (file system management unit—FSU) corresponding to processing unit 1231, and both being possibly embodied by one or more programmed or programmable hardware-implemented chips or ICs such as for example one or more Field Programmable Gate Arrays referred to as FPGAs. In some embodiments, the DM unit 1231_1A (for data movement management) and the FS unit 1231_2A (for file system management) can be regarded as part of a hardware-side processing device (preferably each including one or more programmable hardware-based chips such as e.g. FPGAs).

The DM unit 1231_1A comprises or is connected to the non-volatile memory 1233A (corresponding to the non-volatile memory 1233) and the FS unit 1231_2A comprises or is connected to the metadata cache memory 1234A (corresponding to the metadata cache memory 1234). The FS unit 1231_2A is configured to handle management of the file system(s), file system objects and metadata thereof and the DM unit 1231_1A is configured to manage user data movement between the network and disk interface units 1221A and 1241A.

The network interface unit 1221, the DM unit 1231_1A and the disk interface unit 1241A are respectively connected to each other by the data connection paths 1261A and 1262A, and 1263A and 1264A (e.g. fastpath connections corresponding to paths 1261 to 1264). In addition, the DM unit 1231_1A is connected to the management unit 1202A by communication path 1271A and to the DM unit 1231_1A by communication path 1272A (which may be implemented via fastpaths or regular data connections such as via an internal bus system etc.).

FIG. 333 exemplarily shows a schematic illustration of another more specific configuration of a file system server 1200B (file system management apparatus) according to an embodiment. Exemplarily, the file system server 1200B comprises a network interface module 1220B, a data movement and file system management module group comprising the data movement and file system module 1230B and a management module 1250B, and a disk interface module 1240B. In some embodiments, each of the above modules may be provided separately and inserted into a physical server chassis to be connected to each other according to a modular assembly (i.e. single modules may be exchanged if required, or some or all of the modules may be provided at a higher number depending on the requirements).

For management purposes, each of the network interface module 1220B, the management module 1250B and the disk interface module 1240B comprises a respective management memory 1252_1B, 1252_2B and 1252_3B and a respective processing unit 1251_1B, 1251_2B and 1251_3B (each of which may comprises one or more processors such as one or more CPUs). Accordingly, the components on the right side of the dashed line in FIG. 33B correspond to the management portion 1250 of FIG. 33, however, exemplarily, different processing units and associated memories are provided for controlling management of the network interfaces, the file system and data movement management, and the disk interfaces. The respective portions of the modules are communicably connected via communication paths 1271B, 1272B and 1275B to allow for communication to the management computer 1500 via the interface 1213B (the communication paths 1271B, 1272B and 1275B may be implemented via fastpaths or regular data connections such as via a bus system etc.).

Corresponding to the network interface portion 1220, the network interface module 1220B exemplarily comprises two network interface memories 1222_1B and 1222_2B and a plurality of network interface units (NIU) 1221B (corresponding to processing unit 1221) which are connected to the network interface via communication path 12733 and may be embodied by a plurality of programmed or programmable hardware-implemented chips or ICs such as for example Field Programmable Gate Arrays referred to as FPGAs.

Corresponding to the disk interface portion 1240, the disk interface module 1240B exemplarily comprises two disk interface memories 1222_1B and 1222_2B and a plurality of disk interface units 1241B (DIU), which corresponds to processing unit 1241, and which may be embodied by a plurality of programmed or programmable hardware-implemented chips or ICs such as for example one or more Field Programmable Gate Arrays referred to as FPGAs. The disk interface units 1241B comprise or are connected to the sector cache memory 1243B (corresponding to the sector cache memory 1243) and are connected to the disk interface 1212B via communication path 1274B.

Corresponding to the DFP 1230, the file system and data movement management module 1201A comprises a data movement management memory 1232_1 B, a file system management memory 1232_2B and a plurality of DFP units 1231B (corresponding to processing unit 1231) and which may be embodied by a plurality of programmed or programmable hardware-implemented chips or ICs such as for example Field Programmable Gate Arrays referred to as FPGAs. Preferably, one or more of the DFP units 1231B is/are responsible mainly for management of data movement (e.g. similar to the responsibilities of unit 1231_1A) and one or more of the DFP units 1231B is/are responsible mainly for management of the file system and metadata (e.g. similar to the responsibilities of unit 1231_2A). The DFP units 1231B comprise or are connected to the non-volatile memory 1233B (corresponding to the non-volatile memory 1233) and the metadata cache memory 1234B (corresponding to the metadata cache memory 1234).

In the above aspects, data connection lines and data connection paths between modules, boards and units of the file server architecture, in particular those other than fastpaths, may be provided as one or more bus systems, e.g. on the basis of PCI, in particular PCI-E.

Figure 34:
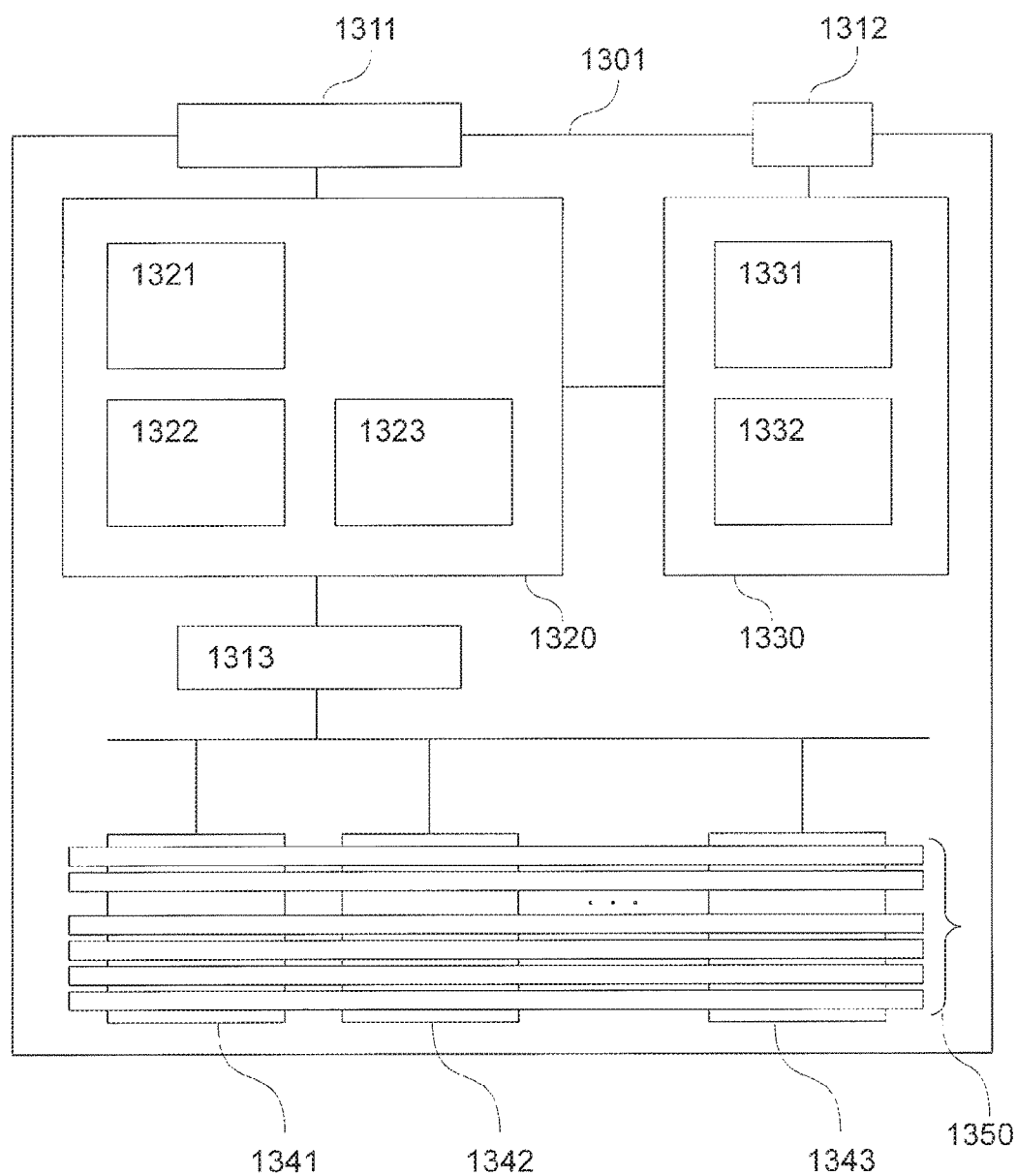
FIG. 34 is an exemplary schematic diagram showing an architecture of a storage apparatus according to an exemplary embodiment of the present invention.

FIG. 34 exemplarily shows a schematic illustration of a configuration of a storage apparatus 1301 according to an exemplary embodiment, please also see FIG. 4 for related implementations. The storage apparatus 1301 (e.g. a storage array) comprises a network interface 1311 for connection to the disk interface of the file system server 1200 via network 1103 and a memory control unit 1320 for controlling the data movement from/to the network interface 1311 and the disk interface 1313 that is connected to a plurality of storage devices 1341, 1342 and 1343 which may be embodied by storage drives such as storage disks such as Fibre Channel disks or SATA disks, by flash memory devices, flash memory drives, solid state drives, hybrid storage drives, magnetic drives and tapes and optical disks, or combinations thereof.

The memory control unit 1320 comprises a processing unit 1321, a memory 1322 and a cache memory 1323. The memory control unit 1320 is configured to manage receiving and sending user data, data packets, messages, instructions (including write instructions and read instructions) from/to the file system server 1200.

The processing unit 1321 may comprises one or more processors such as one or more CPUs and/or one or more programmed or programmable hardware-implemented chips or ICs such as for example one or more Field Programmable Gate Arrays referred to as FPGAs, and the memory 1322 is provided for storing packets/messages/requests received from the file system server and response packets to be sent to the file system server, and/or for storing programs for control of the memory control unit 1320 and/or the processing unit 1321. The cache 11323 (sometimes also referred to as disk cache) is provided for storing or temporarily storing data to be written to disk and/or data read from disk via the disk interface 1313.

Finally, a management unit 1330 of the storage apparatus 1301 is connected to a management interface 1312 and comprises a processing unit 1331 (which may comprises one or more processors such as one or more CPUs and/or one or more programmed or programmable hardware-implemented chips or ICs such as for example one or more Field Programmable Gate Arrays referred to as FPGAs) and a management memory 1332 for storing management information, management setting information and command libraries, and/or for storing programs for control of the management unit 1330 and/or the processing unit 1331, e.g. for controlling a Graphical User Interface and/or a Command Line Interface provided to a user of a management computer (not shown, or may be the management computer 1500) connected via the management interface 1312.

The data to be stored on the storage devices 1341 to 1343 (storage disks and/or flash memory devices, herein commonly referred to as disks) is controlled to be stored in RAID groups 1350. The management of RAID groups distributed over the plurality of storage devices 1341 to 1343, and calculation of required parities according to selected RAID configurations is preferably performed by the memory control unit 1320.

In some embodiments, the portions and parts left of the dashed line in FIG. 33B can be regarded as part of a hardware-based processing device (preferably including one or more programmable hardware-based chips such as e.g. FPGAs), and the portions and parts to the right-hand side of the dashed line in FIG. 33B can be regarded as part of a software-based processing device (preferably including one or more CPUs).

It is to be noted that aspects and embodiments of the present invention as described above and below may relate to plural network communication protocols such as SMB (e.g. SMB1, SMB2, or higher), NFS (e.g. NFSv4[.1] or higher), RPCSEC_GSS, etc. Also, aspects and embodiments of the present invention as described above and below may relate to different network protocols such as TCP or UDP.

FIGS. 35A to 35D exemplarily illustrate metadata tables according to some exemplary embodiments.

FIG. 35A exemplarily shows an example of a metadata table MID1 which may have entries which relate associated groups of IDs, each group of IDs including at least an interface ID, a network ID and a client ID (such as e.g. an IP address, a socket address or a socket pair ID). Each entry in the metadata table MID1 exemplarily associates an interface ID, a network ID and a client ID.

Specifically, it is exemplarily desirable that each client of a certain tenant group has a specific client ID and is associated with a certain communication network having a specific network ID and connects to the network interface via a specific interface having a specific interface ID. If another client from another tenant would use the same client IP (e.g. because different tenants use overlapping or even similar client ID ranges).

The idea is that the apparatus 1200, 1200A or 1200B or other apparatus such as a file server is connected to at least two groups of clients, wherein each group may be exemplarily associated with another tenant, and the at least two groups of clients may potentially use overlapping or even similar client ID ranges.

However, the network interface portion of the apparatus 1200, 1200A or 1200B has at least two interfaces and clients of different groups may communicably connect to different interfaces, wherein each of the interfaces (which may be different physical interfaces and/or different virtual interfaces sharing the same physical interfaces) has a unique interface ID. Also, clients of different groups may communicably connect via different networks, wherein each of the networks (which may be different physical network connections and/or different virtual networks such as VLAN, for example, sharing the same physical network connection) has a unique network ID.

Accordingly, even if two clients from different groups of clients would use the same client ID, for example, because the at least two groups of clients may potentially use overlapping or even similar client ID ranges, the clients could still be unambiguously identified by at least the unique combination of network ID and client ID or the unique combination of interface ID and client ID, and even more reliably by the redundant information of the unique combination of network ID, client ID and interface ID.

At the network interface portion of the apparatus 1200, 1200A or 1200B or other apparatus such as a file server, it is possible to determine the network ID and client ID based on header information of an incoming received message packet, and to further determine the interface ID of the interface at which the message packet is received.

Then, the respective network ID, client ID and interface ID can be looked up in the metadata table MDT 1 if FIG. 35A, and if the respective corresponding request exists, this means that the request is legitimate and can be processed, and if the respective corresponding request does not exists, the message packet can be dropped in order to avoid that clients of a certain client group accidentally access data of a file system used by clients of another client group.

FIG. 35B exemplarily shows an example of a metadata table MTD2 which may have entries which relate associated groups of IDs, each group of IDs including at least the interface ID, the network ID and a virtual server ID. Here, the interface ID and the network ID are the same as in FIG. 35A above.

The idea is that the apparatus 1200, 1200A or 1200B or other apparatus such as a file server is connected to at least two groups of clients, but acts as different servers to the clients of the groups, e.g. in a virtual server infrastructure, wherein each of the at least two groups of clients is connected to another virtual server or another group of virtual servers as uniquely identified by the virtual server ID.

Specifically, it is exemplarily desirable that each client group of a certain tenant group is associated with a certain communication network having a specific network ID and connects to the network interface via a specific interface having a specific interface ID to a specific virtual server or virtual server group uniquely identified by the virtual server ID.

Of course, in some embodiments, the metadata tables in FIGS. 35A and 35B can be combined to one single table which has entries that relate an interface ID, a network ID, a client ID and a virtual server ID.

FIG. 35C exemplarily shows an example of a metadata table MTD3 which may have entries which relate associated groups of IDs, each group of IDs including at least the network ID, the virtual server ID, and a file system ID. Here, the network ID and the virtual server ID are the same as in FIG. 35B above. The file system ID may uniquely identify one or more file systems and/or volumes of file system data relating to a file system that is accessed by the clients of the client group that are associated with the respective network ID according to the metadata tables of FIGS. 35A and 35B.

Figure 36A:
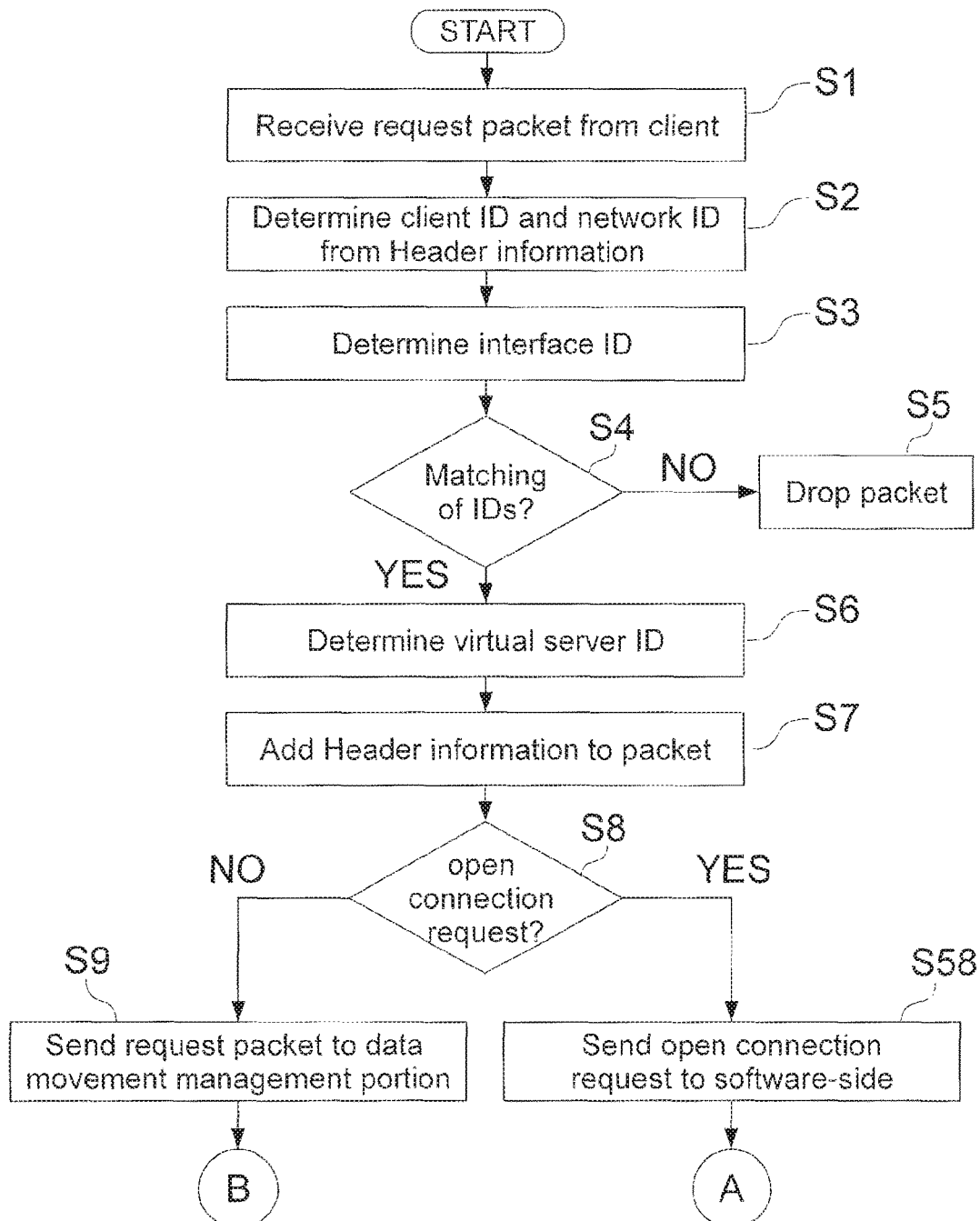
FIG. 36A exemplarily shows a receipt process performed at a network interface portion at the hardware-side of the file system server according to an exemplary embodiment of the present invention.

FIG. 36A exemplarily shows a receipt process performed at a network interface portion at the hardware-side of the file system server according to an exemplary embodiment of the present invention.

In step S1, a request packet is received from a client (e.g. host computer) via the communication network.

The request packet may relate to a first request by the client requesting to open a connection (open connection request, e.g. negotiate request) or, if the connection has been already established earlier, the request packet may relate to an input/output request to a file system or file system object of a file system managed by the file system server, such as requests for opening or closing a file or directory of the file system for subsequent access to it, a request for creating a new file or directory in the file system, a request to write or read user data to/from the file system, a request to obtain or modify metadata of a file or directory of the file system, a request to rename, move or copy a file or directory in the file system, a request to flush data from a cache to disk, etc.

Such requests to a file system may be generally distinguished as modifying requests (such as write to, rename, create, copy, or move a file system object) and non-modifying requests (such as read, get metadata etc.).

Also, the request packet may relate to a last request by the client requesting to close/terminate a connection (close connection request).

In step S2, the network interface portion determines the client ID of the client which has transmitted the received request packet and the network ID of the network of the client which has transmitted the received request packet based on the header information of the received request packet.

In step S3, the network interface portion determines interface ID of the interface via which the request packet has been received in step S1.

In step S4, based on the client ID, the network ID and the interface ID as determined in steps S2 and S3, the network interface portion determines whether a corresponding entry of the determined client ID, the network ID and the interface ID exists in the metadata table MTD1 stored in the memory or register of the network interface portion. If the corresponding entry of the determined client ID, the network ID and the interface ID exists in the metadata table MTD1, it is determined in step S4 that the determined IDs do match and indicate a correct request (step S4 returns YES). Otherwise, if step S4 returns NO and the determined client ID, the network ID and the interface ID does not exist in the metadata table MTD1, this implies that the client having the determined client ID may actually be a member of another client group using an overlapping or similar IP range, and the packet is dropped in step S5.

In step S5, in some embodiments, the main aspect is that the packet request is not processed. In some exemplary embodiments, it is possible to further issue an alert notification to the software-side of the apparatus 1200, 1200A or 1200B, and/or to return a failure response to the client. Also, an entry in a failure log register may be created for later reference.

If step S4 returns YES as the client ID, network ID and interface ID match according to the metadata table MTD1, the process continues with step S6 in which the network interface portion determines the corresponding virtual server ID based on the network ID and the interface ID determined in steps S2 and S3 and based on the metadata table MTD2 stored in the memory or register of the network interface portion (e.g. according to FIG. 35B or another metadata table combining the information from FIGS. 35A and 35B).

In step S7, the network interface portion add header information to the request packet, the additional header information including at least the virtual server ID determined in step S6, and preferably the virtual server ID determined in step S6, the client ID determined in step S2 and/or and at least one of the interface ID and the network ID determined in steps S2 and S3. In preferred embodiments, the client ID, network ID, interface ID and virtual server ID is included as additional header information.

In step S8, it is checked whether the received request packet relates to an open connection request for opening a connection, or whether the request packet may relate to an already established connection between the client and the file system server.

It is to be noted that aspects and embodiments of the present invention may relate to plural network protocols such as SMB (e.g. SMB1, SMB2, or higher), NFS (e.g. NFSv4[.1] or higher), RPCSEC_GSS, etc. In some protocols, such open connection requests may relate to a NEGOTIATE command, e.g. SMB2_NEGOTIATE in case of SMB2.

If step S8 returns YES (i.e. the request relates to an open connection request), the process proceeds with step S58 of sending the received request packet to the software side portion for further processing of the received request. Here, the network interface portion may extract the header of the request packet and only send the extracted header to the software side.

On the other hand, if step S8 returns NO as the request does not relate to an open connection request but relates to an already established connection, the received packet is send to the data management movement portion of the hardware-side of the file system server in step S9. An exception may be a close connection request which may be also send directly to the software-side similar to step S58.

Figure 36B:
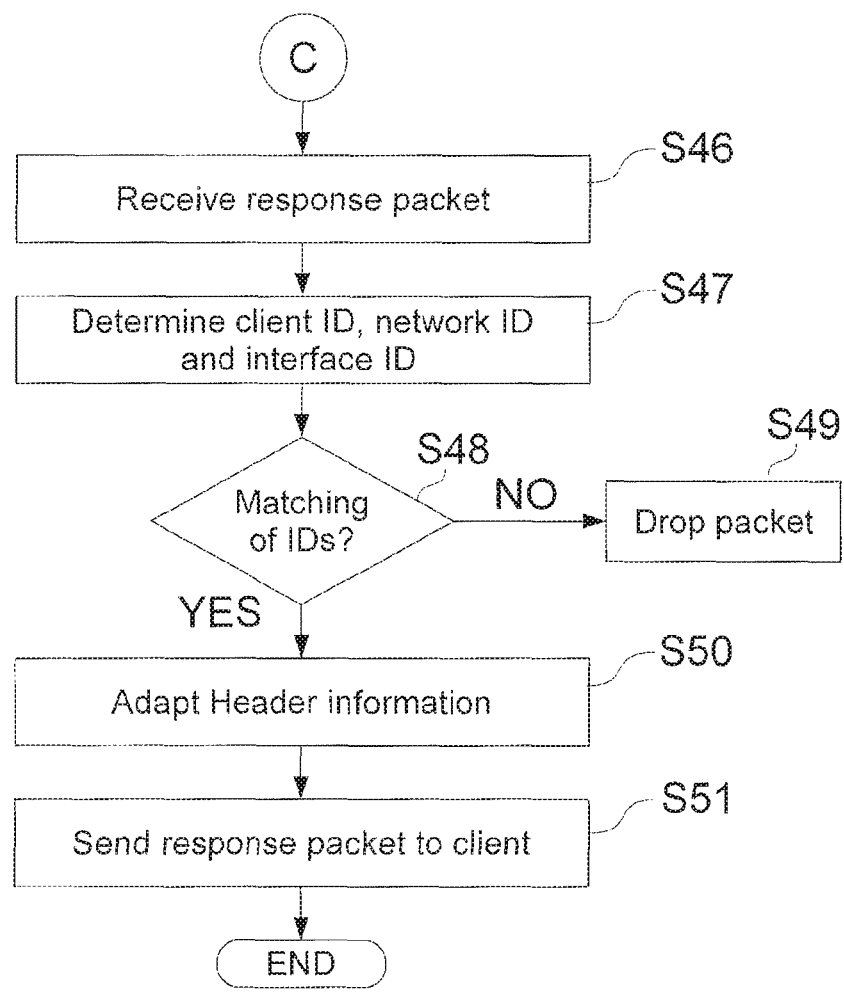
FIG. 36B exemplarily shows a response process performed at the network interface portion at the hardware-side of the file system server according to an exemplary embodiment of the present invention.

FIG. 36B exemplarily shows a response process performed at the network interface portion at the hardware-side of the file system server according to an exemplary embodiment of the present invention.

In step S46, the network interface portion receives a prepared response packet from the data management movement portion of the hardware-side of the file system server or from the software-side of the file system server as described later.

Based on header information of the prepared response packet, the network interface portion determines the client ID, network ID and interface ID in step S47 and checks whether a corresponding entry exists in the metadata table MTD1 similar to step S4 above, and if step S4 returns NO, the process continues with step S49 of dropping the packet similar to step S5 above. If step S48 returns YES and the IDs are determined to match an entry in the metadata table MTD1, the response packet is prepared by adapting the header information. Specifically, header information which has been added similar to step S7 above may be removed, in particular in that the interface ID and/or the virtual server ID may be removed. Also each of the interface ID, the virtual server ID, the client ID and the network ID may be removed from the header information.

In the subsequent step 351, the response packet is transmitted to the client connected via the network as a response packet for the previously received request packet (step S1).

FIG. 37 exemplarily shows a request processing process performed at a data movement management portion at the hardware-side of the file system server according to an exemplary embodiment of the present invention.

In step S10, the data movement management portion receives the request packet from the network interface portion as transmitted in step S9 above. In step S11, the data movement management portion extracts the header (or headers in case of a compound message having multiple headers) of the received request packet.

In step S12, the data movement management portion determines the network ID, interface ID and virtual server ID based on the extracted header information (based on the header information added in step 37 above).

In step S13, based on the network ID, the interface ID, and the interface ID as determined in step S12, the data movement management portion determines whether a corresponding entry of the determined network ID, interface ID, and virtual server ID exists in the metadata table MTD2 stored in the memory or register of the data movement management portion.

If the corresponding entry of the determined network ID, interface ID, and virtual server ID exists in the metadata table MTD2, it is determined in step S13 that the determined IDs do match and indicate a correct request (step S13 returns YES). Otherwise, if step S13 returns NO and the determined network ID, interface ID, and virtual server ID does not exist in the metadata table MTD2, the packet is dropped in step S14.

In step S14, in some embodiments, the main aspect is that the packet request is not processed. In some exemplary embodiments, it is possible to further issue an alert notification to the software-side of the apparatus 1200, 1200A or 1200B, and/or to instruct the network interface portion to return a failure response to the client. Also, an entry in a failure log register may be created for later reference.

Otherwise, if step S13 returns YES, the process continues with step S15.

In case of normal processing, which may involve the software-side for parsing and decoding the received packet, the extracted header(s) are sent to the software-side in step S16.

However, in some embodiment, an autoinquiry function may be implemented which allows to process at least some request packets without involvement of the software-side in order to avoid additional processing burden on the software-side. Such autoinquiry function may be possible for some specific command types included in the request packet and/or on the basis of whether the function has been enabled by a user.

For example, autoinquiry may be enabled for non-modifying requests in some embodiments, but it may also be enabled for simple modifying requests. In preferred embodiments, autoinquiry may be enabled for non-modifying requests such as read requests, get metadata requests, flush data from cash to disk requests.

For example, for the SMB2 protocol, autoinquiry may be enabled for non-modifying commands such as e.g. SMB2_FLUSH, SMB2_READ, SMB2_QUERY_DIRECTORY and SMB2_QUERY_INFO or the like. Per connection and/or client or globally, the administrator may enable/disable autoinquiry function for one or more requests individually. Then the hardware-side processing device may store data (such as a table or register) that indicates per command, per client, and/or per connection, whether the respective command has autoinquiry disabled or enabled. Specifically, the memory of the data movement management portion may have a stored register or table that associates a command of a request packet header (e.g. according to a network protocol) to a corresponding related internal file system inquiry command. Such register or table may additionally include the information of whether autoinquiry is enabled or disabled by a user (and if the corresponding command has autoinquiry disabled, step S6 may be performed instead).

It is to be noted that even for commands/request for which autoinquiry is enabled, there may occur situations in which the request packet cannot be parsed by the hardware-side processing device and is preferably sent to the software-side for packet decoding (no autoinquiry). For example, packets which cannot be parsed and are preferably sent to the software-side may include: corrupt, unparsable packets, or packets where values violate specified limits, requests for unsupported info levels, asynchronous packets, compounds, and/or signed requests. In step S15, the data movement management portion determines whether executing the autoinquiry function is possible for the underlying command(s) of the received request packet based on analyzing the extracted header(s) and/or on the basis of whether the autoinquiry function is enabled for the underlying command type.

If step S15 returns NO, the extracted header(s) are sent to the software-side in step S16 according to the normal request processing.

Otherwise, if it is determined that executing the autoinquiry function is possible and step S15 returns YES, the data movement management portion continues by determining the file system ID based on the network ID and/or the virtual server ID as determined in step S12 and based on a metadata table MTD3 stored in the memory or register of the data movement management portion in step S52.

Then, the data movement management portion continues with step S52 and automatically creates a file system inquiry (as a file system server internal command) based on the specific command type(s) included in the request packet and based on the file system to be accessed determined on the basis of the virtual server ID and/or file system ID determined in step S52.

In the following, the created internal file system inquiry will be referred to as FS inquiry.

A memory or register at the hardware-side processing device, e.g. at the data movement management portion, may associate respective protocol commands (preferably for each of the supported network protocols) with the associated internal inquiries so as to allow for the generation of the corresponding internal file system inquiry.

For example, for SMB2 commands, it may exemplarily associate the respective SMB2 commands to internal FS inquiries as follows: SMB2_FLUSH→WFILE_COMMIT, SMB2_READ→WFILE_READ, SMB2_WRITE→WFILE_WRITE, SMB2_QUERY_DIRECTORY→WFILE_READDIR, SMB2_QUERY_DIRECTORY (no wildcards)→WFILE_ LOOKUP, SMB2_QUERY_INFO→WFILE_GET_ATTR, SMB2_SET_INFO→WFILE_SET_ ATTR, etc. Of course, the present invention may relate to plural network protocols such as SMB (e.g. SMB1, SMB2, or higher), NFS (e.g. NFSv4[.1] or higher), RPCSEC_GSS, etc. and may have such association tables or association data for plural different protocols (mapping commands of the respective protocol to the above exemplary internal FS inquiries).

Autoinquiry function is a process which processes a request packet and inquires the file system based on the request packet without involvement in the processing by the software-side in order to increase IOPS efficiency. However, in the end, a response packet must still be created to be sent back to the client/host. If such process of creating the response packet is also performed without involvement in the processing by the software-side in order to increase Iops efficiency, this is referred to as a so-called autoresponse in the following.

In step S54, the data movement management portion adds an instruction for autoresponse to the created FS inquiry in order to inform the file system management portion about the requirement of an autoresponse.

In step S55, the data movement management portion transmits the created FS inquiry to the file system management portion of the hard-ware side of the file system server.

Figure 38A:
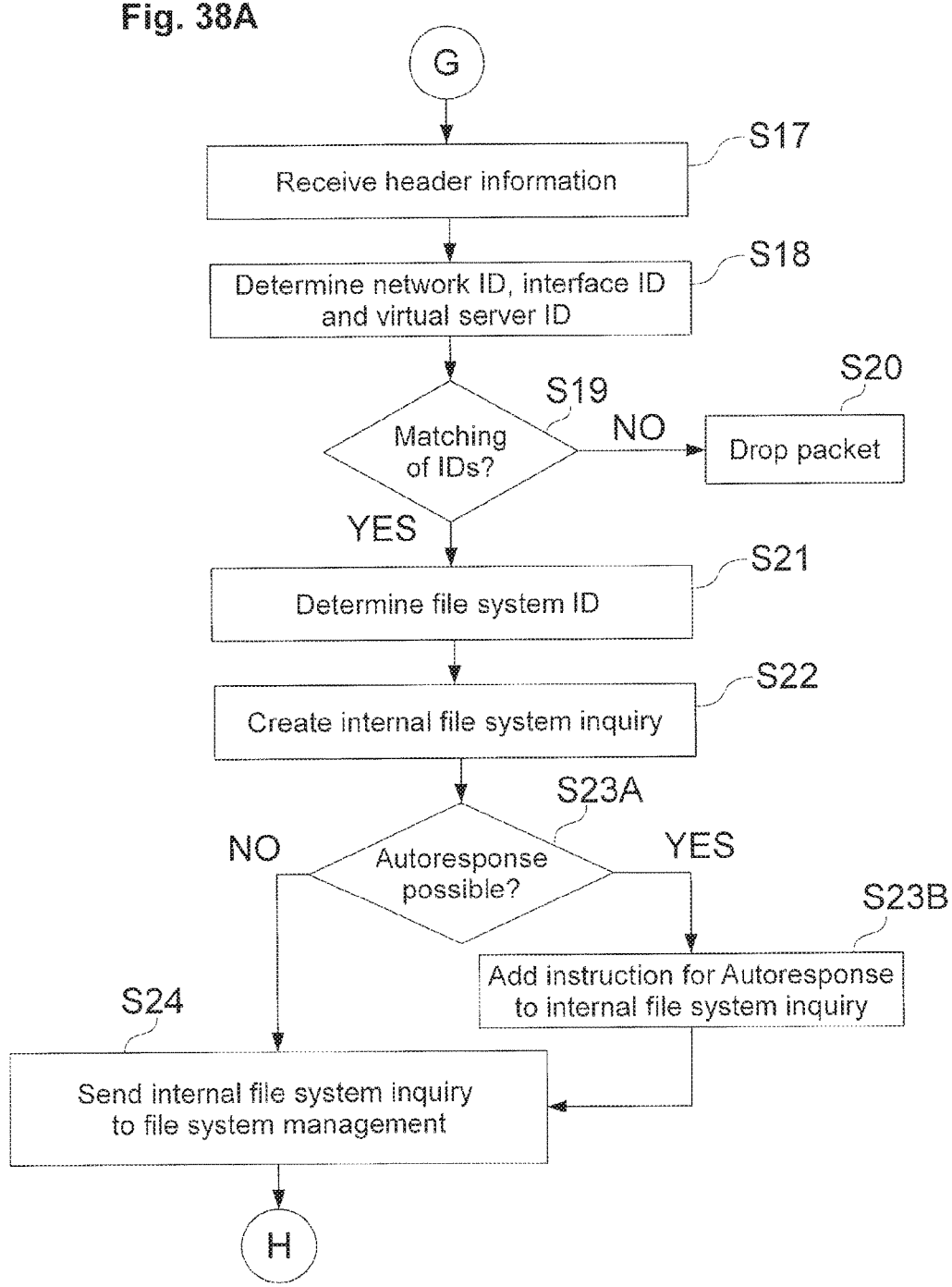
FIG. 38A exemplarily shows a request processing process performed at a software-side of the file system server according to an exemplary embodiment of the present invention.

FIG. 38A exemplarily shows a request processing process performed at a software-side of the file system server according to an exemplary embodiment of the present invention;

In step S17, the software-side portion (which includes one or more CPUs for executing the steps based on executing software instructions) receives the header information/header(s) of the current request packet from the data movement management portion (step S16 above).

Based on the received header information, a processing unit of the software-side portion of the file system server determines the network ID, interface ID and virtual server ID (and potentially also the client ID, if included) in step S18 and determines in metadata such as metadata tables MTD1 and/or MTD2 whether a corresponding entry with matching network ID, interface ID and virtual server ID (and potentially also the client ID, if included) exists in step S19.

If the corresponding entry does not exist and the IDs do not match, when step S19 returns NO, the software-side continues with step S20 and drops the packet. In step S20, in some embodiments, the main aspect is that the packet request is not processed. In some exemplary embodiments, it is possible to further issue an alert notification to the hardware-side of the apparatus 1200, 1200A or 1200B, and/or to instruct the network interface portion to return a failure response to the client. Also, an entry in a failure log register may be created for later reference.

On the other hand, if step S19 returns YES and the IDs do match, the processing unit of the software-side portion of the file system server determines the corresponding file system ID in step S21. Specifically, it determines the file system ID based on the network ID and/or the virtual server ID as determined in step S18 and based on a metadata table MTD3 stored in the memory or register of the software-side in step S21.

The processing unit of the software-side portion of the file system server then creates an internal file system inquiry (FS inquiry, similar to step S53) in step S22.

A memory or register at the hardware-side processing device, e.g. at the file system management portion, may associate respective protocol commands (preferably for each of the supported network protocols) with the associated internal inquiries so as to allow for the generation of the corresponding internal file system inquiry.

For example, for SMB2 commands, it may exemplarily associate the respective SMB2 commands to internal FS inquiries as follows: SMB2_FLUSH→WFILE_COMMIT, SMB2_READ→WFILE_READ, SMB2_WRITE→WFILE_WRITE, SMB2_QUERY_DIRECTORY→WFILE_READDIR, SMB2_QUERY_DIRECTORY (no wildcards)→WFILE_LOOKUP, SMB2_QUERY_INFO→WFILE_GET_ATTR, SMB2_SET_INFO→WFILE_SET_ATTR, etc. Of course, the present invention may relate to plural network protocols such as SMB (e.g. SMB1, SMB2, or higher), NFS (e.g. NFSv4[.1] or higher), RPCSEC_GSS, etc. and may have such association tables or association data for plural different protocols (mapping commands of the respective protocol to the above exemplary internal FS inquiries).

In step S23A, the processing unit of the software-side portion of the file system server determines whether the autoresponse function is possible for the current request, i.e. whether the hard-ware side can create the required response packet for transmittal to the client without further processing involvement by the software-side of the file system server.

If step S23A returns YES, the processing unit of the software-side portion of the file system server adds an instruction for autoresponse to the created FS inquiry in order to inform the file system management portion about the requirement of an autoresponse in step S23B, and sends the created FS inquiry to the file system management portion of the hardware-side of the file system server in step S24.

On the other hand, if it is determined in step S23A that autoresponse is not possible, it just sends the created FS inquiry to the file system management portion of the hardware-side of the file system server in step S24 (without instruction for autoresponse).

For example, autoresponse may be enabled for modifying and/or non-modifying requests in some embodiments. In preferred embodiments, autoresponse may be enabled for non-modifying requests such as read requests, get metadata requests, flush data from cash to disk requests, as well as for modifying requests such as write requests and set metadata requests. For example, for the SMB2 protocol, autoresponse may be enabled for non-modifying commands such as e.g. SMB2_FLUSH, SMB2_READ, SMB2_QUERY_DIRECTORY and SMB2_QUERY_INFO or the like, and for modifying commands such as e.g. SMB2_WRITE and SMB2_SET_ATTR, etc. Per connection and/or client or globally, the administrator may enable/disable autoresponse function for one or more requests individually. Then the hardware-side processing device may store data (such as a table or register) that indicates per command, per client, and/or per connection, whether the respective command has autoresponse disabled or enabled. Specifically, the memory of the file system management portion may have a stored register or table that associates a command of a request packet header (e.g. according to a network protocol) to a corresponding related internal file system inquiry command. Such register or table may additionally include the information of whether autoresponse is enabled or disabled by a user. Also, the software-side processing device may have such management data in order to be able to instruct autoresponse in some embodiments.

Figure 38B:
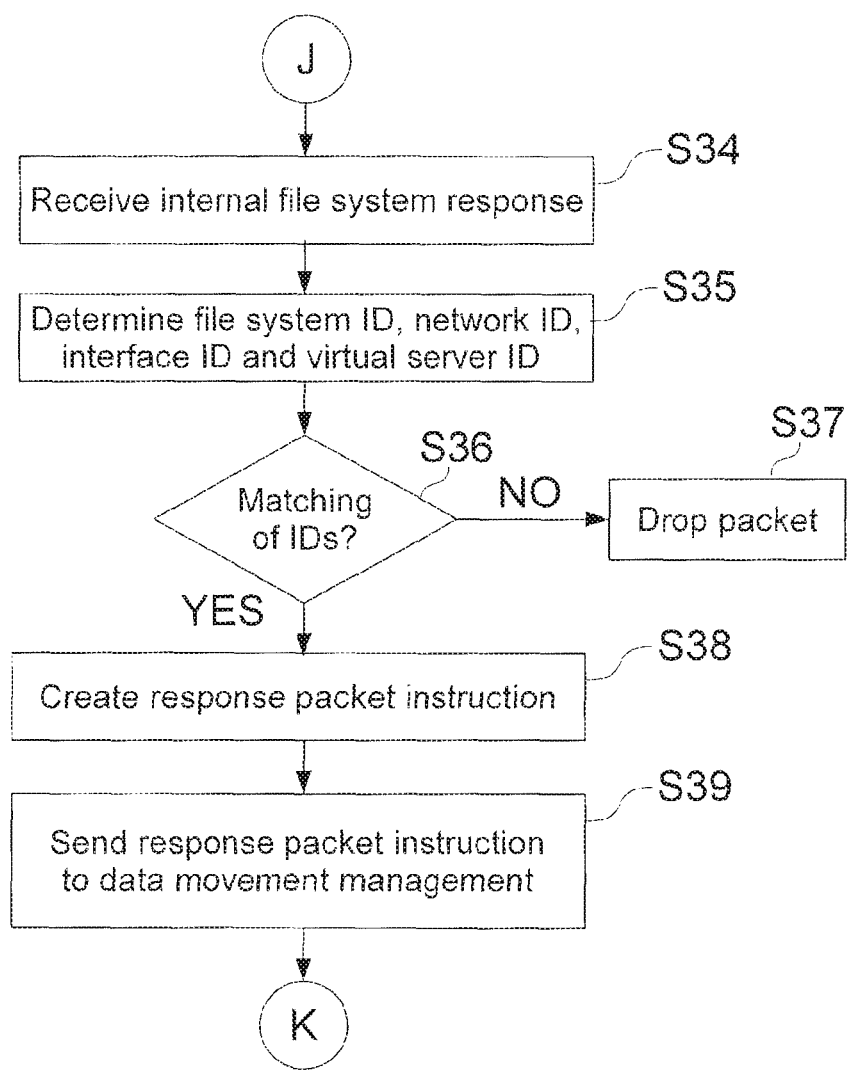
FIG. 38B exemplarily shows a response processing process performed at a software-side of the file system server according to an exemplary embodiment of the present invention.

FIG. 38B exemplarily shows a response processing process performed at a software-side of the file system server according to an exemplary embodiment of the present invention;

In step S34, the software-side of the file system server receives an FS response from the file system management portion of the hardware-side of the file system server.

In step S35, based on header information of the FS response, the software-side of the file system server determines the file system ID, network ID, interface ID and/or virtual server ID, and checks in step S36 whether a corresponding entry exists in one or more corresponding metadata tables such as e.g. metadata tables MTD1, MTD2 and/or MTD3 as discussed above so as to check whether the IDs do match. If step S36 returns NO, then the software-side of the file system server drops the packet in step S37.

In step S37, in some embodiments, the main aspect is that the packet request is not processed. In some exemplary embodiments, it is possible to further issue an alert notification to the hardware-side of the apparatus 1200, 1200A or 1200B, and/or to instruct the network interface portion to return a failure response to the client. Also, an entry in a failure log register may be created for later reference.

If step S36 returns YES, in step S38, the software-side of the file system server creates a respective response packet instruction (which may already include a fully prepared header of a respective response packet) for an appropriate response packet to be sent to the client in response to the previously received and currently processed request packet.

In step S39, the software-side of the file system server sends the created response packet instruction to the data movement management portion of the hardware-side of the file server.

FIG. 39 exemplarily shows a request processing process performed at a file system management portion of the hardware-side of the file system server according to an exemplary embodiment of the present invention.

In step S25, the file system management portion of the hardware-side of the file system server receives an FS inquiry either from the software-side (step S24) or directly as an autoinquiry from the data movement management portion of the hardware-side of the file system (S55).

In step S26, the file system management portion of the hardware-side of the file system server determines the file system ID of the file system to be accessed on the basis of the received FS inquiry.

In step S27, based on header information of the FS inquiry, the file system management portion of the hardware-side of the file system server determines the network ID, interface ID and/or virtual server ID.

In step S28, based on the IDs determined in steps S26 and/or S27 and metadata tables such as metadata tables MTD1, MTD2 and/or MTD3, the file system management portion of the hardware-side of the file system checks whether the corresponding entries exist so as to determine whether the IDs do match.

If step S28 returns NO, the file system management portion of the hardware-side of the file system server drops the packet in step S29.

In step S29, in some embodiments, the main aspect is that the packet request is not processed. In some exemplary embodiments, it is possible to further issue an alert notification to the software-side of the apparatus 1200, 1200A or 1200B, and/or to instruct the network interface portion to return a failure response to the client. Also, an entry in a failure log register may be created for later reference.

If step 28 returns YES, in step S30, the file system management portion of the hardware-side of the file system server processes the received FS inquiry and generates a respective appropriate files system response (FS response) in step S31.

In step S32, the file system management portion determines whether autoresponse is instructed or not (i.e. whether an autoresponse instruction is added to the received FS inquiry). If step S32 returns NO, the created FS response is sent back to the software-side of the file system server in step S33.

On the other hand, if step S32 returns YES (either because the packet is already processed as autoinquiry and the data movement management portion had instructed autoresponse, or because the software-side has instructed autoresponse), the file system management portion generates a response packet instruction based on the created FS response in step S56 and sends the created FS response and the created response packet instruction directly to the data movement management portion of the hardware-side of the file system server in step S57 without involvement of the software side in the generation of the response packet.

Figure 40A:
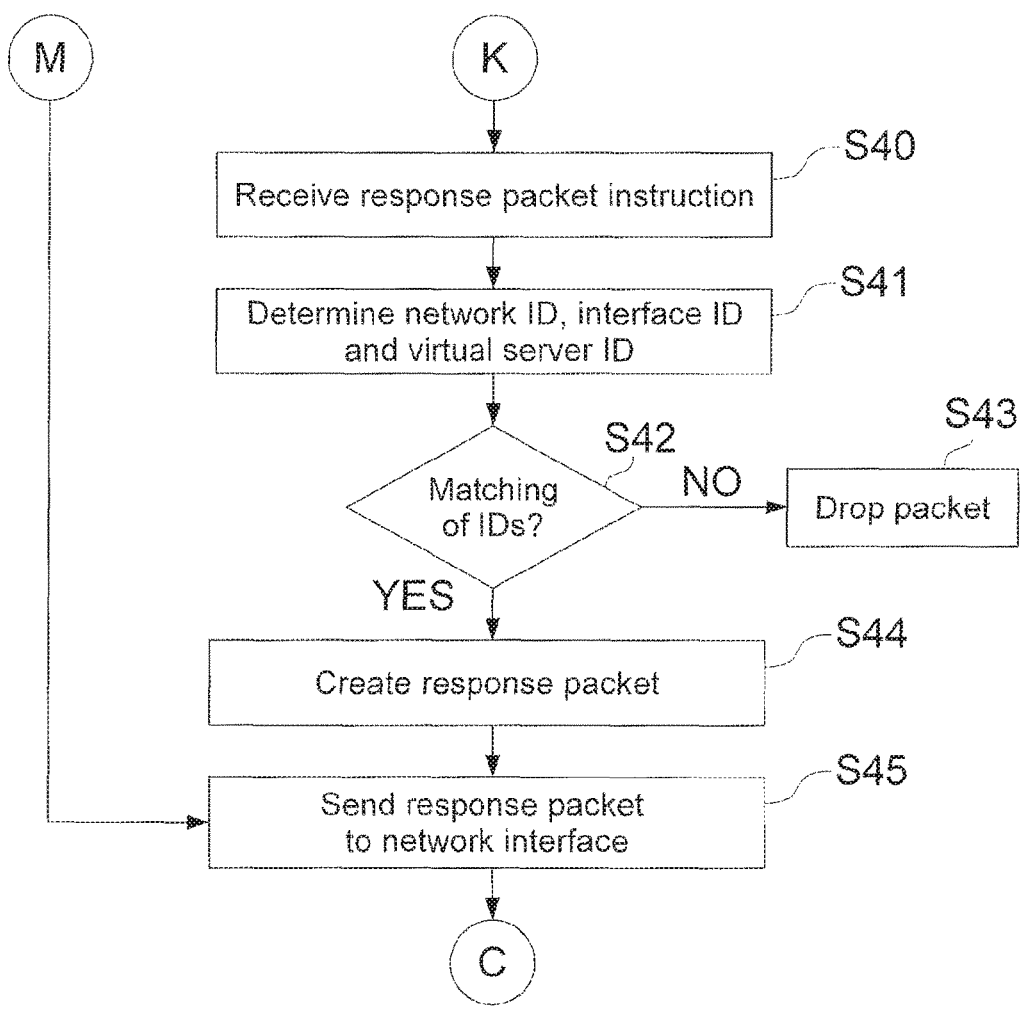
FIG. 40A exemplarily shows a response processing process performed at the data movement management portion of the hardware-side of the file system server according to an exemplary embodiment of the present invention.

FIG. 40A exemplarily shows a response processing process performed at the data movement management portion of the hardware-side of the file system server according to an exemplary embodiment of the present invention;

In step S40, the data movement management portion of the hardware-side of the file system server receives the response packet instruction either from the software-side (step S39) or from the file system management portion of the hardware-side of the file system server (step S57).

In step S41, based on header information of the response packet, the data movement management portion of the hardware-side of the file system server determines the network ID, interface ID and/or virtual server ID.

In step S42, based on the IDs determined in step S41 and metadata tables such as metadata tables MTD1, MTD2 and/or MTD3, the data movement management portion of the hardware-side of the file system checks whether the corresponding entries exist so as to determine whether the IDs do match.

If step S42 returns NO, the file system management portion of the hardware-side of the file system server drops the packet in step S43.

In step S43, in some embodiments, the main aspect is that the packet request is not processed. In some exemplary embodiments, it is possible to further issue an alert notification to the software-side of the apparatus 1200, 1200A or 1200B, and/or to instruct the network interface portion to return a failure response to the client. Also, an entry in a failure log register may be created for later reference.

If step 42 returns YES, the data movement management portion of the hardware-side of the file system server generates a response packet for the client on the basis of the received response packet instruction in step S44. Then, the data movement management portion sends the generated response packet to the network interface portion in step S45.

Figure 40B:
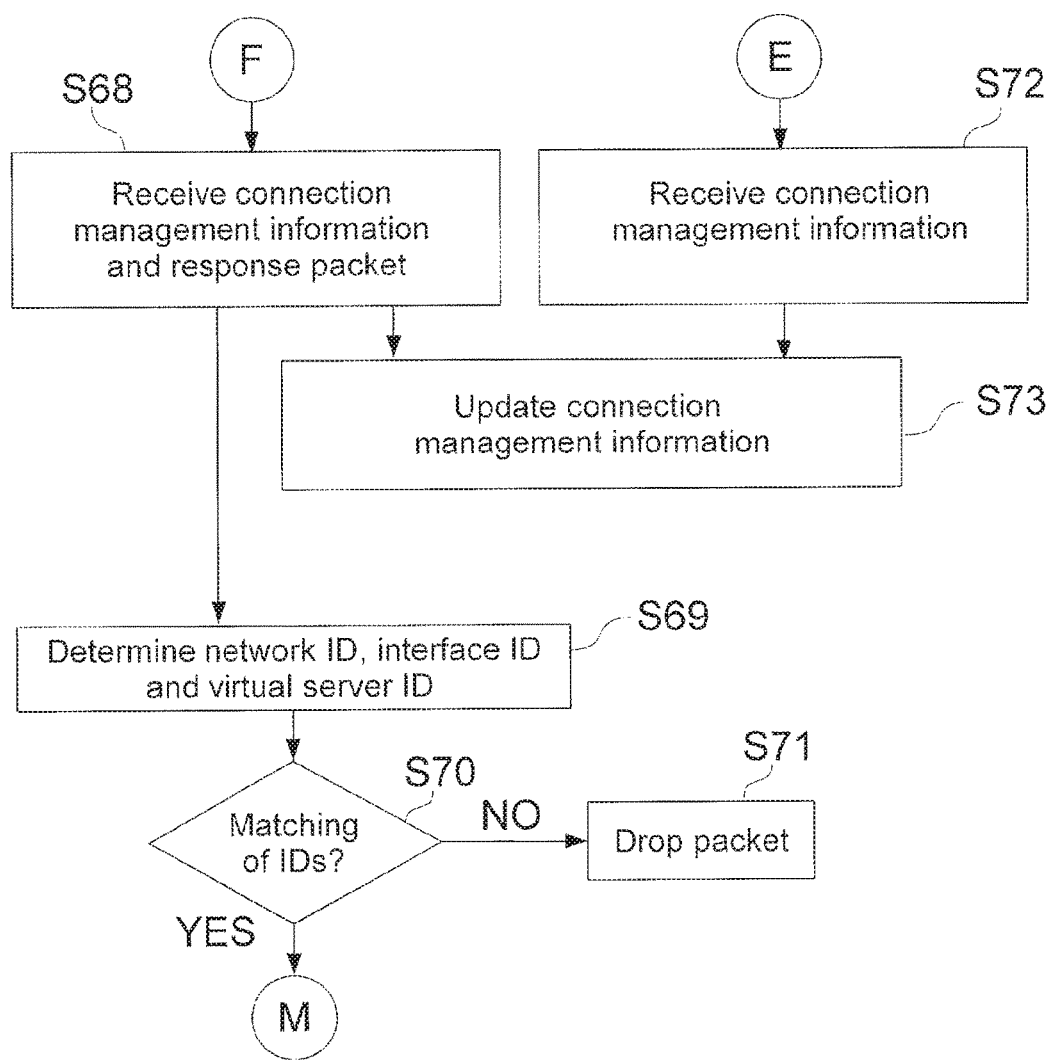
FIG. 40B exemplarily shows a management process performed at the data movement management portion of the hardware-side of the file system server according to an exemplary embodiment of the present invention.

FIG. 40B exemplarily shows a management process performed at the data movement management portion of the hardware-side of the file system server according to an exemplary embodiment of the present invention;

Upon a connection to the client has been opened first by the software-side, the data movement management portion either receives only management information about the opened connection in step S72 or management information about the opened connection and a prepared response packet in step S68, and then updates the management information about opened connection to clients by adding the management information about the newly opened connection in step S73. If the response packet has been received (step S68) and if step S70 returns YES, the response packet is send to the network interface portion of the hardware-side of the file system server (go to step S45).

Here, prior to step S45, the data movement management portion determines the network ID, interface ID and/or virtual server ID in step S69, based on header information of the response packet.

In step S70, based on the IDs determined in step S69 and metadata tables such as metadata tables MID1, MTD2 and/or MTD3, the data movement management portion of the hardware-side of the file system checks whether the corresponding entries exist so as to determine whether the Ds do match.

If step S70 returns NO, the file system management portion of the hardware-side of the file system server drops the packet in step S71.

In step S71, in some embodiments, the main aspect is that the packet request is not processed. In some exemplary embodiments, it is possible to further issue an alert notification to the software-side of the apparatus 1200, 1200A or 1200B, and/or to instruct the network interface portion to return a failure response to the client. Also, an entry in a failure log register may be created for later reference.

Figure 41B:
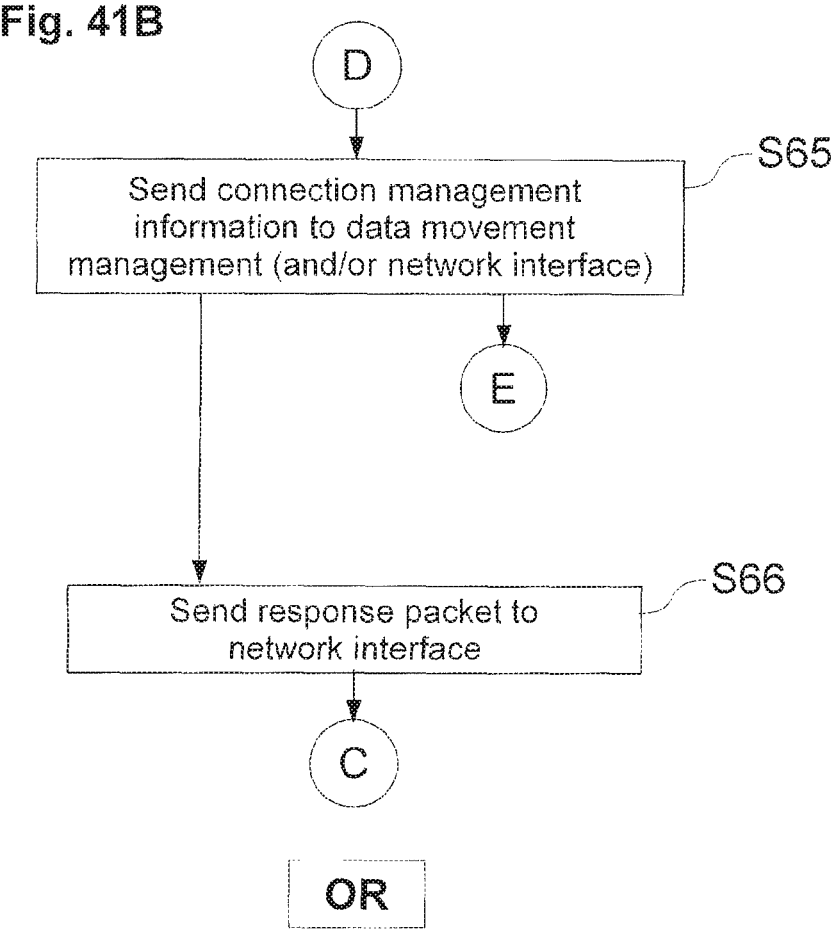
Figure 41C:
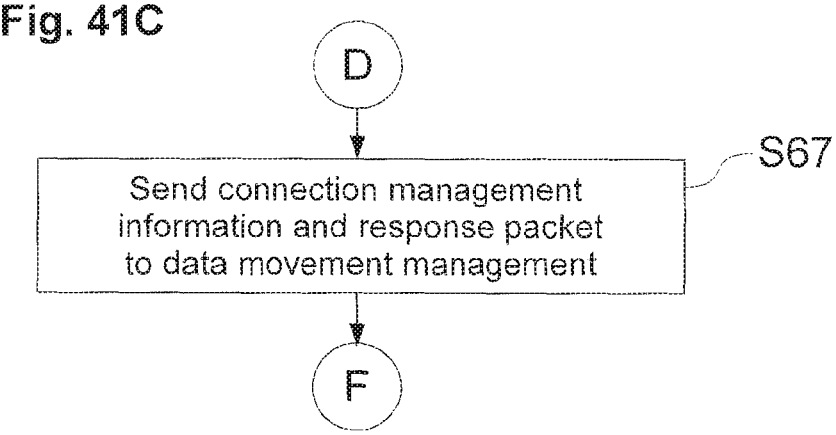

FIGS. 41A to 41C exemplarily show examples of open connection processes performed at the software-side of the file system server according to some exemplary embodiments of the present invention.

As exemplarily shown in FIG. 41A, in step S59, the software-side receives the open connection request (step S58)

In step S60, based on header information of the open connection request, the software-side of the file system server determines the network ID, interface ID and/or virtual server ID, and checks in step S61 whether a corresponding entry exists in one or more corresponding metadata tables such as e.g. metadata tables MTD1, MTD2 and/or MTD3 as discussed above so as to check whether the IDs do match. If step S61 returns NO, then the software-side of the file system server drops the packet in step S62.

In step S62, in some embodiments, the main aspect is that the packet request is not processed. In some exemplary embodiments, it is possible to further issue an alert notification to the hardware-side of the apparatus 1200, 1200A or 1200B, and/or to instruct the network interface portion to return a failure response to the client. Also, an entry in a failure log register may be created for later reference.

If step S61 returns YES, in step S63, the software-side updates connection management information for the new connection and provides a new connection ID to be included in the connection management information. Then, a response packet is generated in step S64 which includes the information about the connection ID.

Then, as exemplarily shown in FIG. 41B, in some embodiments, the software-side sends connection management information about the new connection to the data movement management portion (and/or the network interface) in step S65 and sends the created response packet to the network interface portion in step S66.

Alternatively, as exemplarily shown in FIG. 41C, in some embodiments, the software-side may send the connection management information about the new connection and the created response packet to the network interface in step S67.

FIG. 42A exemplarily shows a configuration of the file system server and the steps of the normal processing of a request packet. At first, the steps S1, S2, S3, S4, S6, S7 and S9 are performed at the network interface portion (hardware-side) and the steps S10, S11, S12, S13, S15 and S16 are performed at the data movement management portion (hardware-side).

Then, the processing is given over to the software-side which performs steps S17, S18, S19, S21, S22 and S24 ($1^{st}$ processing of software-side, avoided by autoinquiry).

The file system management portion (hardware-side) performs steps S25, S26, S27, S28, S30, S31 and S33 and gives over again to the software-side which performs steps S34, S35, S36, S38 and S39 ($2^{nd}$ processing of software side, avoided by autoinquiry and by autoresponse).

Then, the data movement management portion (hardware-side) performs steps S40, S41, S42, S44 and S45, and the network interface portion (hardware-side) performs steps S46, S47, S48, S50 and S51.

FIG. 42B exemplarily shows a configuration of the file system server and the steps of the autoresponse processing of a request packet.

At first, the steps S1, S2, S3, S4, S6, S7 and S9 are performed at the network interface portion (hardware-side) and the steps S10, S11, S12, S13, S15 and S16 are performed at the data movement management portion (hardware-side).

Then, the processing is given over to the software-side which performs steps S17, S18, S19, S21, S22, S23B and S24 ($1^{st}$ processing of software side, avoided by autoinquiry).

The file system management portion (hardware-side) performs steps S25, S26, S27, S28, S30, S31, S32, S56 and S57.

Then, the data movement management portion (hardware-side) performs steps S40, S41, S42, S44 and S45, and the network interface portion (hardware-side) performs steps S46, S47, S48, S50 and S51.

FIG. 42C exemplarily shows a configuration of the file system server and the steps of the autoinquiry processing of a request packet.

At first, the steps S1, S2, S3, S4, S6, S7 and S9 are performed at the network interface portion (hardware-side) and the steps S10, S11, S12, S13, S15, S52, S53, S54 and S55 are performed at the data movement management portion (hardware-side), and steps S25, S26, S27, S28, S30, S31, S32, S56 and S57 are performed by the file system management portion (hardware-side).

Then, the data movement management portion (hardware-side) performs steps S40, S41, S42, S44 and S45, and the network interface portion (hardware-side) performs steps S46, S47, S48, S50 and S51.

FIG. 43A to FIG. 43D exemplarily illustrate request processing between a client/host computer and a file system server according to an exemplary embodiment of the present invention. It is to be noted that aspects and embodiments of the present invention as described above and below may relate to plural network protocols such as SMB (e.g. SMB1, SMB2, or higher), NFS (e.g. NFSv4[.1] or higher), RPC-SEC_GSS, etc.

Figure 43A:
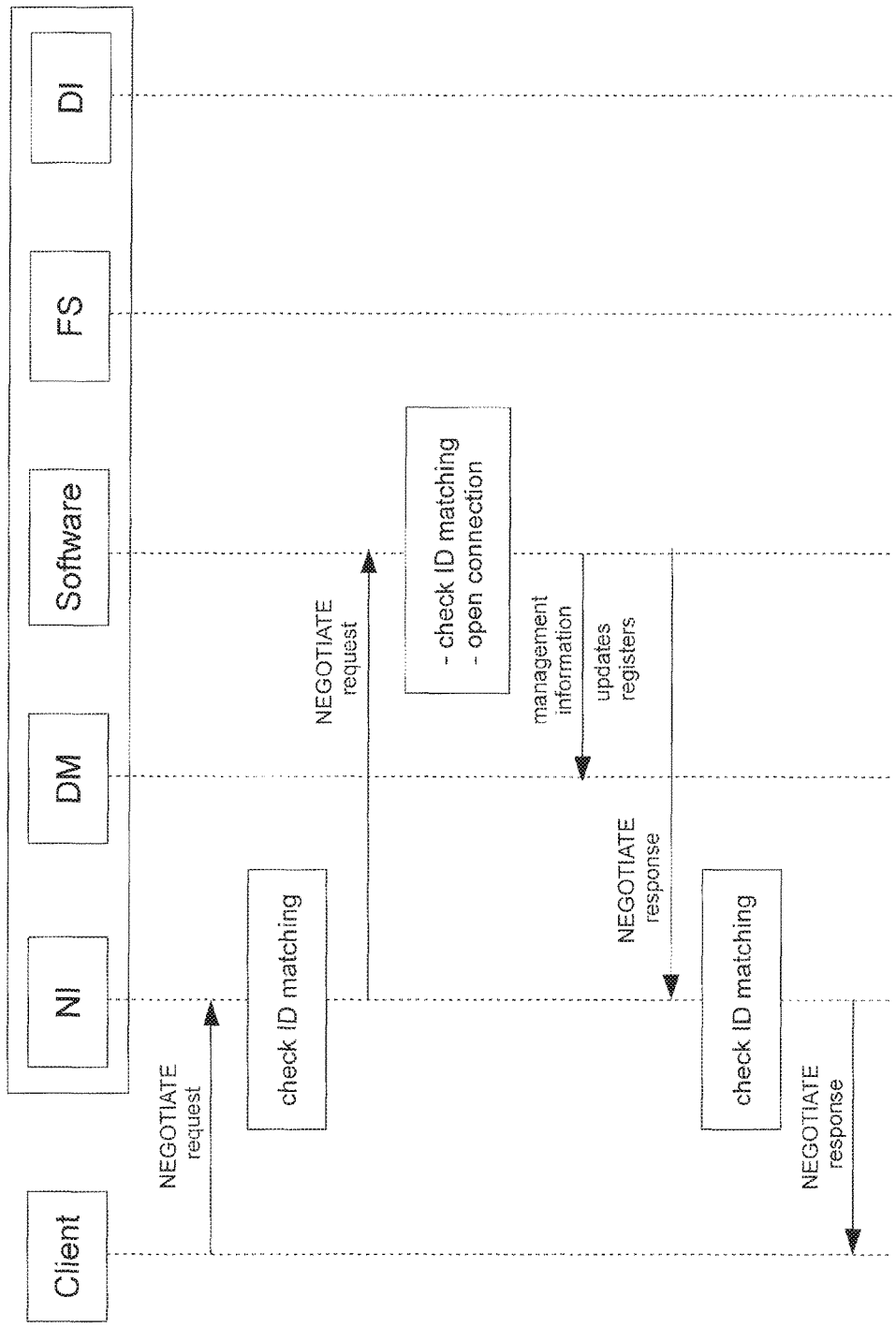
FIG. 43A to FIG. 43E exemplarily illustrate request processing between a client/host computer and a file system server according to an exemplary embodiment of the present invention.

FIG. 43A exemplarily illustrates request processing between a client/host computer and a file system server according to an exemplary embodiment of the present invention in connection with an open connection request or NEGOTIATE request, e.g. such as SMB2_NEGOTIATE.

The client sends the NEGOTIATE request which is received at the network interface NI (hardware-side, e.g. having one or more programmable chips of the hardware-side processing device), see e.g. step S1 above, and the NEGOTIATE request is transferred to the software-side SW (software-side processing device), see e.g. S58 above, after a check is performed at the network interface NI as to whether the interface ID, network ID and client ID do match, e.g. according to steps S2 to S4 above.

Then, the software-side (software-side processing device) may do its own check based on a check the interface ID, network ID, client ID and/or virtual server ID of the header information do match, e.g. according to steps S60 to S61 above prior to opening the connection, and to send the management information to the data movement management portion DM (hardware-side). The NEGOTIATE response may then sent directly (or indirectly via the data movement management portion DM) to the network interface NI (hardware-side) and then to the client.

In addition, based on the newly opened connection, the software-side (software-side processing device) may update memories and/or registers on the hardware-side such as e.g. the memories and registers of the network interface and/or the data movement management portion.

Prior to sending the NEGOTIATE response to the client, the network interface Ni may perform another check as to whether the interface ID, network ID and client ID do match.

Figure 43B:
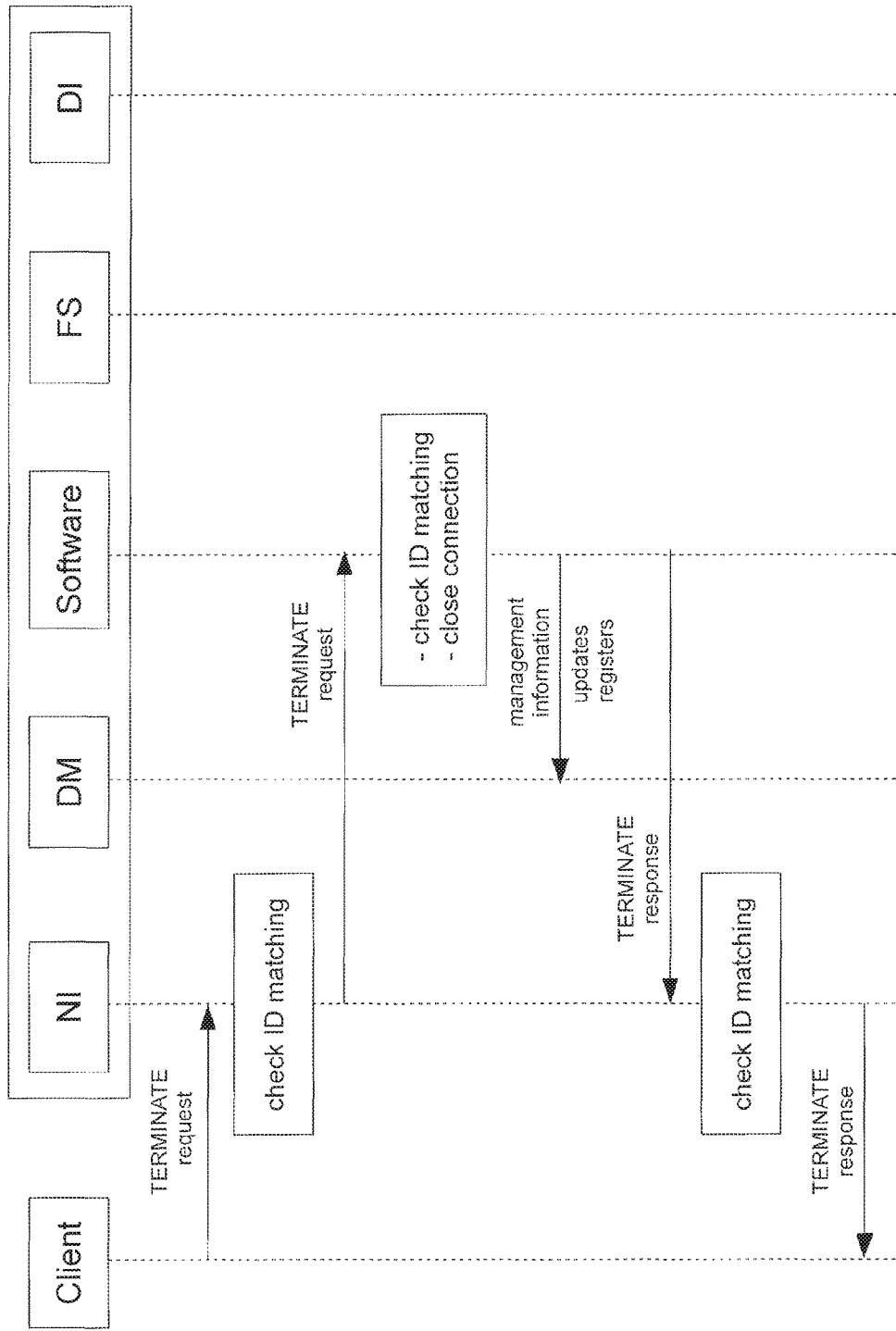

FIG. 43B exemplarily illustrates request processing between a client/host computer and a file system server according to an exemplary embodiment of the present invention in connection with a close connection request or TERMINATE request for closing an established connection.

The client sends the TERMINATE request which is received at the network interface NI (hardware-side, e.g. having one or more programmable chips of the hardware-side processing device), see e.g. step S1 above, and the TERMINATE request is transferred to the software-side (software-side processing device), e.g. analogous to S58 above, after a check is performed at the network interface NI as to whether the interface ID, network ID and client ID do match. If the IDs match, the TERMINATE request is transferred to the software-side, where the connection may be closed or terminated after the software side may perform its own multi-tenancy check based on the client ID, network ID, interface ID and/or virtual server ID, and the management information for informing the data movement management portion DM about termination of the connection is sent to the data movement management portion DM and the network interface NI (hardware-side) to update the memories or registers.

The data movement management portion DM and network interface NI (hardware-side) can then remove the management data in connection with the now closed connection from its memory or register in order to allow for storage space for new connections and management thereof.

The TERMINATE response generated by the software-side processing device SW is sent directly (or indirectly via the data movement management portion DM) to the network interface NI (hardware-side) and then to the client, potentially after another multi-tenancy check at the network interface based on the client ID, network ID, interface ID and/or virtual server ID.

Figure 43C:
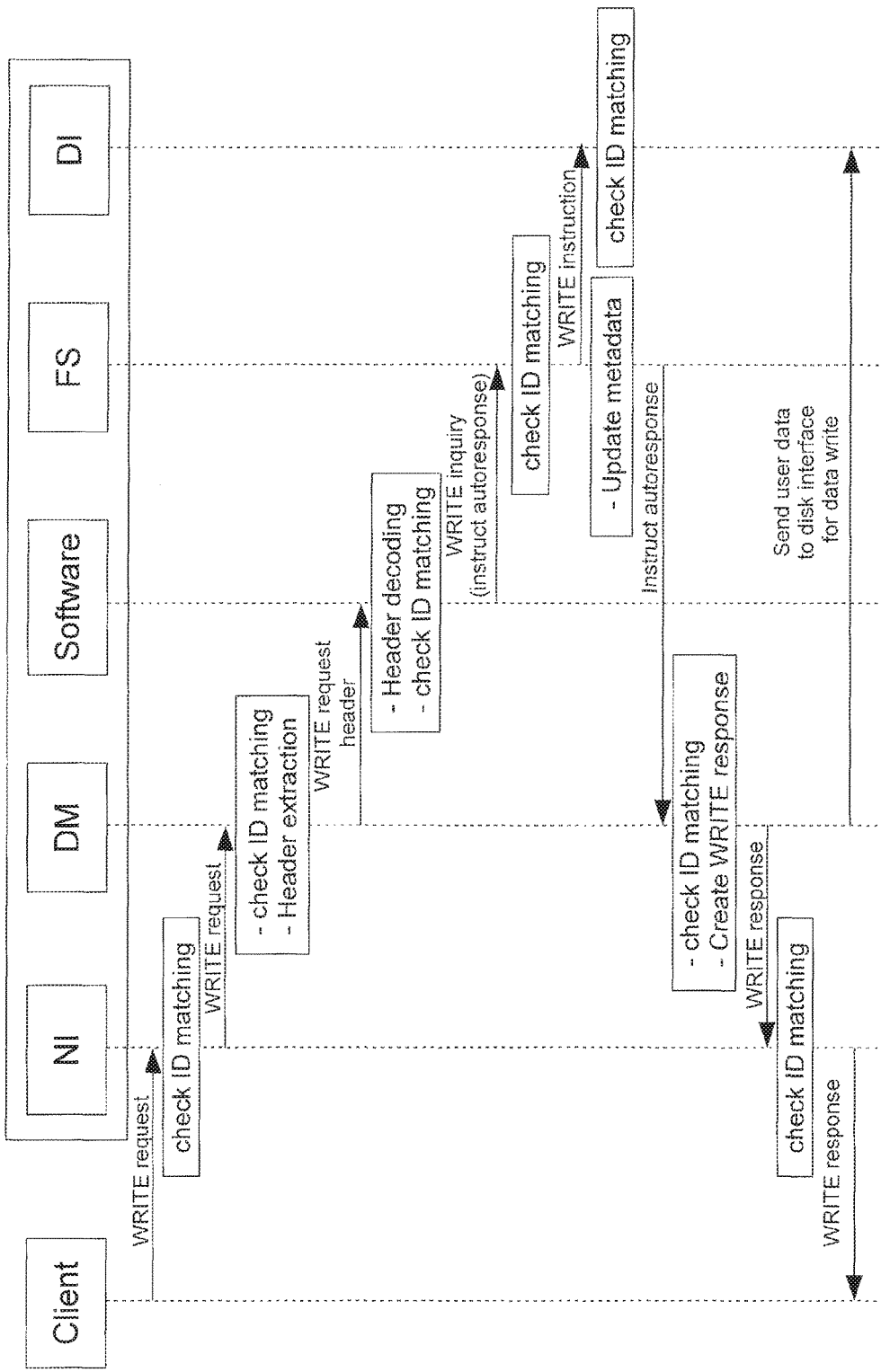

FIG. 43C exemplarily illustrates request processing between a client/host computer and a file system server according to an exemplary embodiment of the present invention in connection with a WRITE request, e.g. such as SMB2_WRITE.

It is to be noted that FIG. 43C assumes that autoresponse is enabled for SMB2_WRITE. Also, it is to be noted that a similar process could be provided, in addition to a WRITE request, in connection with other modifying commands such as a Metadata modifying command such as e.g. SM_B2SET_INFO.

The client sends the WRITE request (e.g. SMB2_WRITE) which is received at the network interface NI (hardware-side, e.g. having one or more programmable chips of the hardware-side processing device), see e.g. step S1 above, and the WRITE request is transferred to the data movement management portion DM of the hardware-side (e.g. having one or more programmable chips of the hardware-side processing device) after a multi-tenancy check at the network interface based on the client ID, network ID, interface ID and/or virtual server ID.

At the data movement management portion DM of the hardware-side, header extraction and a optional multi-tenancy check based on the client ID, network ID, interface ID and/or virtual server ID is performed.

The extracted WRITE header is sent to the software-side for decoding of the received WRITE header at the software-side and for sending a created file system inquiry (internal WRITE inquiry, e.g. WFILE_WRITE) to the file system management portion FS of the hardware-side (including an autoresponse instruction) after another optional multi-tenancy check based on the client ID, network ID, interface ID and/or virtual server ID at the software-side.

According to the received internal WRITE inquiry, after another optional multi-tenancy check based on the client ID, network ID, interface ID and/or virtual server ID, the file system management portion FS of the hardware-side issues a corresponding WRITE instruction to the disk interface portion DI of the hardware-side (for writing the corresponding data to disk and/or cache, at least upon receipt of the corresponding user data/write data from the data movement management portion DM, such processing may however be performed later and asynchronously). Also, the file system management portion FS of the hardware-side updates file system metadata and file system object metadata according to the issued WRITE instruction and instructs an Autoresponse to the data movement management portion DM of the hardware-side.

The data movement management portion DM of the hardware-side generates, based on the received Autoresponse instruction, the corresponding WRITE response packet and sends the WRITE response packet to the network interface NI of the hardware-side after another optional multi-tenancy check based on the client ID, network ID, interface ID and/or virtual server ID.

That is, the WRITE response generated by the data movement management portion DM of the hardware-side is sent to the network interface NI (hardware-side) and then to the client after another multi-tenancy check based on the client ID, network ID, interface ID and/or virtual server ID at the network interface.

Figure 43D:
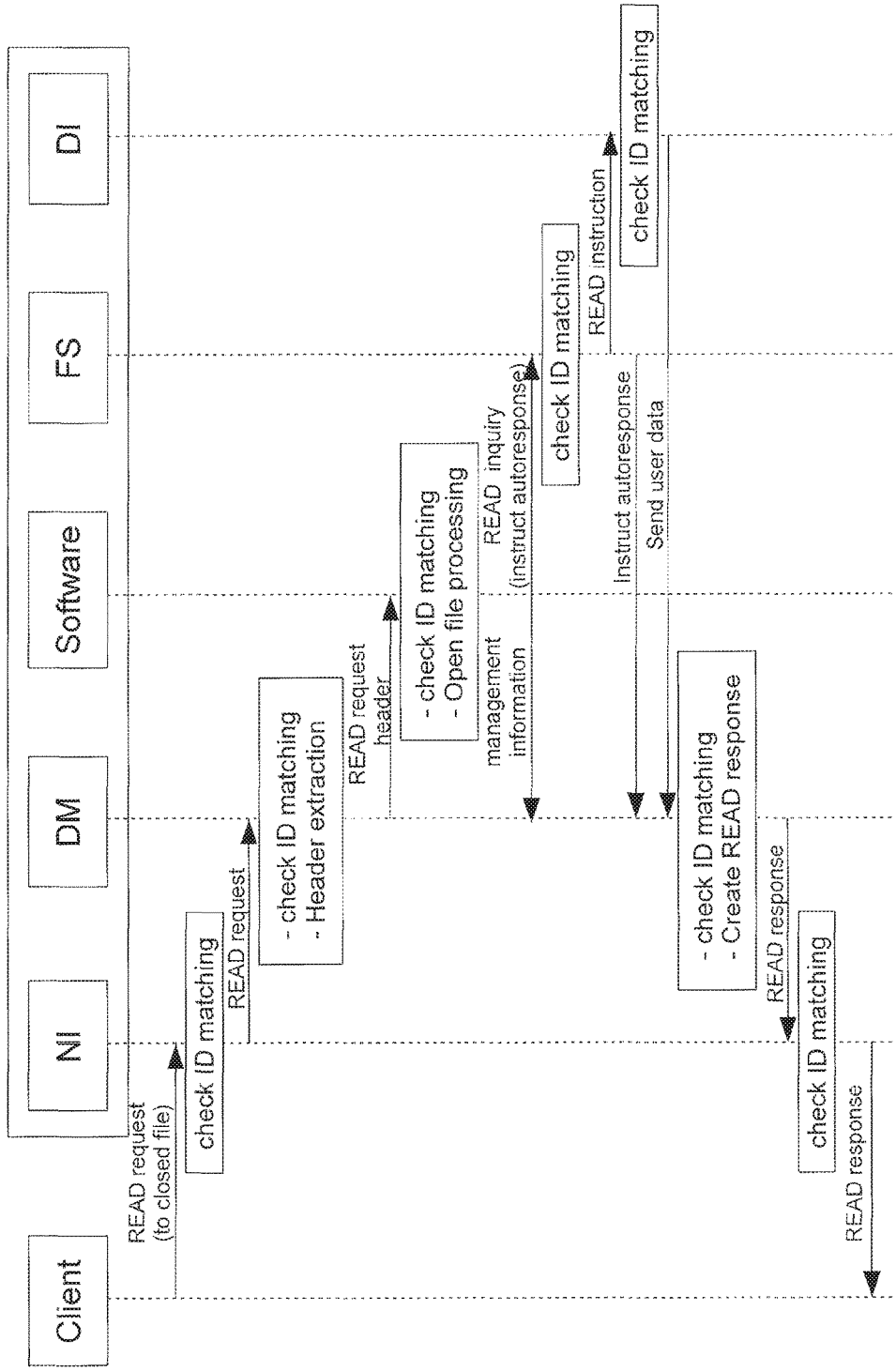

FIG. 43D exemplarily illustrates request processing between a client/host computer and a file system server according to an exemplary embodiment of the present invention in connection with a READ request, e.g. such as SMB2_READ, however in connection with a previously non-opened file.

It is to be noted that FIG. 43D assumes that autoinquiry is enabled for SMB2_READ, but the request is still executed according to autoresponse only because the target file of the read request is not yet openend, and the software side is responsible in some embodiments for opening a file. Also, it is to be noted that a similar process could be provided in addition to a READ request in connection with other non-modifying commands such as a Metadata obtaining commands such as e.g. SMB2_QUERY_INFO to metadata of a non-opened file or SMB2_QUERY_DIRECTORY to metadata of a directory.

The client sends the READ request (e.g. SMB2_READ) which is received at the network interface NI (hardware-side, e.g. having one or more programmable chips of the hardware-side processing device), see e.g. step S1 above, and the READ request is transferred to the data movement management portion DM of the hardware-side (e.g. having one or more programmable chips of the hardware-side processing device) after a multi-tenancy check based on the client ID, network ID, interface ID and/or virtual server ID.

At the data movement management portion DM of the hardware-side, after another optional multi-tenancy check based on the client ID, network ID, interface ID and/or virtual server ID, header extraction is performed.

Since it can be determined in the open file table that the target file is not yet opened, although autoinquiry may generally enabled for READ requests, autoinquiry is not performed, and the extracted READ header is sent to the software-side after another optional multi-tenancy check based on the client ID, network ID, interface ID and/or virtual server ID for decoding of the received READ header at the software-side and for sending a created file system inquiry (internal READ inquiry, e.g. WFILE_READ) to the file system management portion FS of the hardware-side (including an autoresponse instruction) upon carrying out the open file processing and after another optional Multi-tenancy check based on the client ID, network ID, interface ID and/or virtual server ID.

In addition, the software side SW sends management information (including a file ID of the openend file) to the data movement management portion DM which then may update the open file table accordingly.

According to the received internal READ inquiry, the file system management portion FS of the hardware-side issues a corresponding READ instruction to the disk interface portion DI of the hardware-side (for reading the corresponding data from disk and/or cache) after another optional multi-tenancy check based on the client ID, network ID, interface ID and/or virtual server ID. Also, the file system management portion FS of the hardware-side instructs an Autoresponse to the data movement management portion DM of the hardware-side.

The data movement management portion DM of the hardware-side generates, based on the received Autoresponse instruction and based on the READ user data sent from the disk interface, the corresponding READ response packet (including the READ user data) and sends the READ response packet to the network interface NI of the hardware-side after another optional multi-tenancy check based on the client ID, network ID, interface ID and/or virtual server ID. That is, the READ response generated by the data movement management portion DM of the hardware-side is sent to the network interface NI (hardware-side) and then to the client after another multi-tenancy check based on the client ID, network ID, interface ID and/or virtual server ID at the network interface.

Figure 43E:
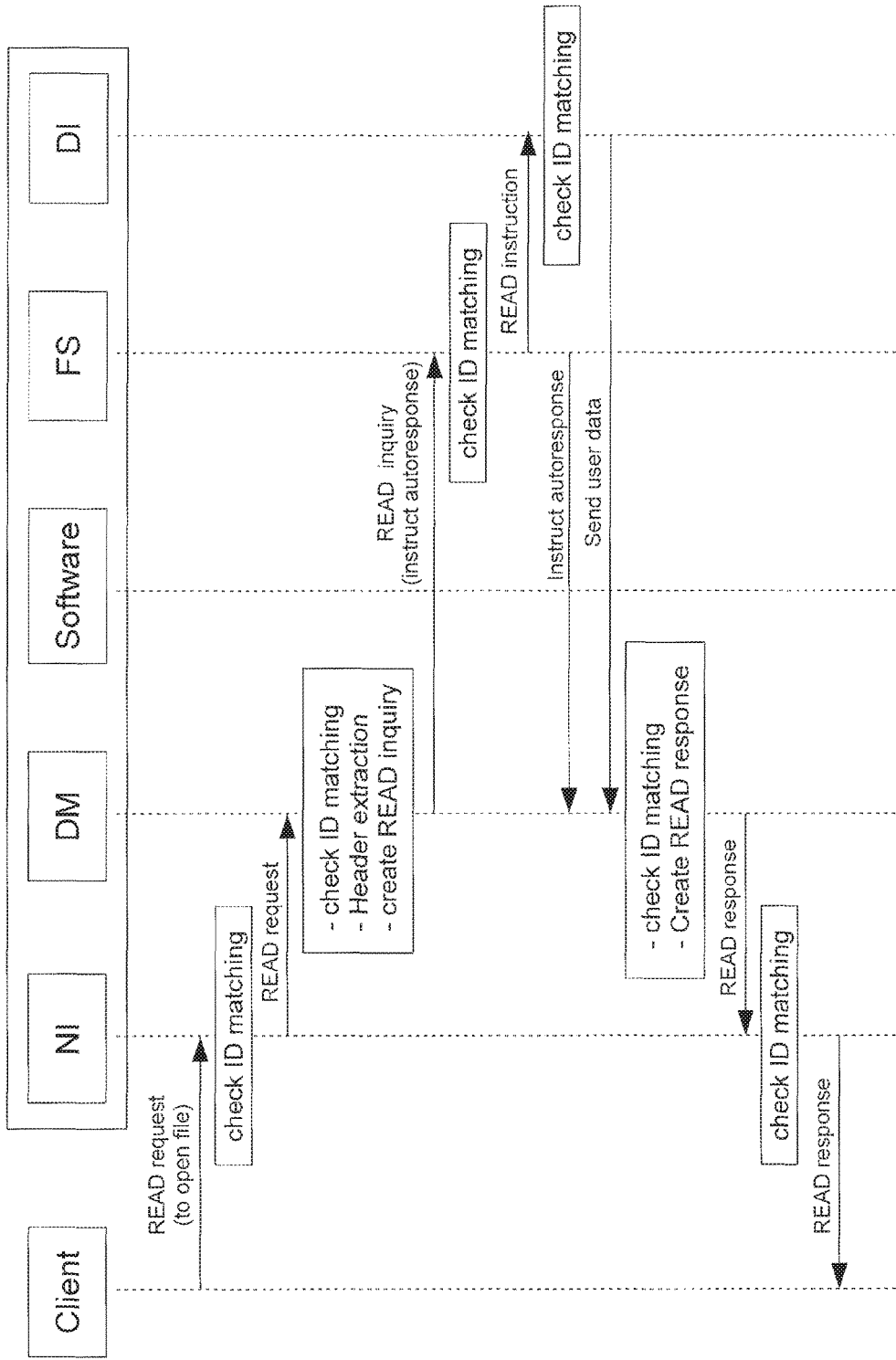

FIG. 43E exemplarily illustrates request processing between a client/host computer and a file system server according to an exemplary embodiment of the present invention in connection with a READ request, e.g. such as SMB2_READ, however in connection with an already opened file. It is to be noted that FIG. 43E assumes that autoinquiry is enabled for SMB2_READ.

Also, it is to be noted that a similar process could be provided in addition to a READ request in connection with other non-modifying commands such as a Metadata obtaining commands such as e.g. SMB2_QUERY_INFO to metadata of an opened file or SMB2_QUERY_DIRECTORY to metadata of a directory.

The client sends the READ request (e.g. SMB2_READ) which is received at the network interface NI (hardware-side, e.g. having one or more programmable chips of the hardware-side processing device), see e.g. step S1 above, and the READ request is transferred to the data movement management portion DM of the hardware-side (e.g. having one or more programmable chips of the hardware-side processing device) after a multi-tenancy check based on the client ID, network ID, interface ID and/or virtual server ID at the network interface.

At the data movement management portion DM of the hardware-side, header extraction is performed after another optional multi-tenancy check based on the client ID, network ID, interface ID and/or virtual server ID.

Since it can be determined in the open file table that the target file is already opened, autoinquiry is performed at the data movement management portion DM of the hardware-side, and the extracted READ header is used to perform generation of a corresponding internal file system inquiry (e.g. internal READ inquiry, e.g. WFILE_READ) and, after another optional multi-tenancy check based on the client ID, network ID, interface ID and/or virtual server ID, the created file system inquiry (internal READ inquiry, e.g. WFILE_READ) is sent to the file system management portion FS of the hardware-side (including an autoresponse instruction).

According to the received internal READ inquiry, the file system management portion FS of the hardware-side issues a corresponding READ instruction to the disk interface portion DI of the hardware-side (for reading the corresponding data from disk and/or cache) after another optional multi-tenancy check based on the client ID, network ID, interface ID and/or virtual server ID. Also, the file system management portion FS of the hardware-side instructs an Autoresponse to the data movement management portion DM of the hardware-side.

The data movement management portion DM of the hardware-side generates, based on the received Autoresponse instruction and based on the READ user data sent from the disk interface, the corresponding READ response packet (including the READ user data) and sends the READ response packet to the network interface NI of the hardware-side after another optional multi-tenancy check based on the client ID, network ID, interface ID and/or virtual server ID.

That is, the READ response generated by the data movement management portion DM of the hardware-side is sent to the network interface NI (hardware-side) and then to the client after another multi-tenancy check based on the client ID, network ID, interface ID and/or virtual server ID at the network interface.

In the above examples and embodiments, multi-tenancy checks based on the client ID, network ID, interface ID and/or virtual server ID have been performed at multiple involved units, modules and/or portions, however, it is to be noted that this is not limited and in some embodiments the check is done only once, or more often. For example, in some embodiments, the multi-tenancy checks are only performed at the network interface for incoming packets and/or for outgoing packets.

It should be noted that headings are used above for convenience and readability of the detailed description and are not to be construed as limiting the present invention in any way.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. An apparatus for managing one or more file systems, the apparatus being connectable to a storage apparatus and to a plurality of host computers, each host computer being associated with a client identification (ID), the apparatus comprising:
a plurality of interfaces, each interface having an associated interface ID;
a first-type processing device including at least one programmable hardware-implemented chip configured to process request packets, which are received from host computers and relate to access requests to the one or more file systems managed by the apparatus, and to generate response packets for the processed request packets; and
a second-type processing device including at least one processor configured to execute decoding of at least one portion of request packets sent from host computers based on a computer program stored in a memory of the second-type processing device;
wherein, for a request packet which is received from a first host computer via a first interface of the apparatus, at least one programmable hardware-implemented chip of the first-type processing device is configured to:
determine the client ID being associated with the first host computer,
determine the interface ID being associated with the first interface,
determine whether the determined client ID and interface ID represent a permitted ID set or a prohibited ID set, and
refrain from processing the received request packet if the determined client ID and interface ID are determined to represent a prohibited ID set,
wherein, if the determined client ID and interface ID are determined to represent a permitted ID set and if the request packet is of a first-type, the first-type processing device is configured to process the request packet of the first-type according to a normal processing function and, if the determined client ID and interface ID are determined to represent a permitted ID set and if the request packet is of a second-type, the first-type processing device is configured to process the request packet of the second-type according to an autoinquiry processing function,
wherein processing the request packet of the first-type according to the normal processing function includes decoding the request packet at the second-type processing device, and processing the request packet of the second-type according to the autoinquiry processing function does not require decoding the request packet at the second-type processing device, and
wherein, for the processing of the request packet of the first-type according to the normal processing function, the at least one programmable hardware-implemented chip of the first-type processing device is configured to transmit at least part of the request packet to the second-type processing device for decoding of the request packet.

2. The apparatus according to claim 1, wherein the first-type processing device includes a memory for storing management information data indicative of a plurality of ID sets including at least one of a plurality of prohibited ID sets or a plurality of permitted ID sets.

3. The apparatus according to claim 2, wherein the at least one programmable hardware-implemented chip of the first-type processing device is configured to determine whether the determined client ID and interface ID represent a permitted ID set or a prohibited ID set based on the stored management information data.

4. The apparatus according to claim 1, wherein the at least one programmable hardware-implemented chip of the first-type processing device is configured to process the received request packet and send a corresponding response packet to the first host computer through the first interface if the determined client ID and interface ID are determined to represent a permitted ID set.

5. The apparatus according to claim 4, wherein the at least one programmable hardware-implemented chip of the first-type processing device includes at least one programmable hardware-implemented chip of a network interface portion of the apparatus; and
the at least one programmable hardware-implemented chip of a network interface portion is configured to determine whether the determined client ID and interface ID represent a permitted ID set or a prohibited ID set on the basis of the request packet upon receipt of the request packet; or
the at least one programmable hardware-implemented chip of a network interface portion is configured to determine whether the determined client ID and interface ID represent a permitted ID set or a prohibited ID set based on the corresponding response packet for preparation of sending the corresponding response packet to the first host computer.

6. The apparatus according to claim 1, wherein each host computer is further associated with a communication network having an associated network ID,
wherein, for the request packet which is received from the first host computer via the first interface of the apparatus, the at least one programmable hardware-implemented chip of the first-type processing device is configured to:
determine the network ID being associated with the first host computer, and
determine whether the determined client ID, network ID and interface ID represent a permitted ID set or a prohibited ID set.

7. The apparatus according to claim 6, wherein the at least one programmable hardware-implemented chip of the first-type processing device is further configured to determine a virtual server ID being associated with the ID set comprising the determined client ID, network ID and interface ID.

8. The apparatus according to claim 7, wherein the at least one programmable hardware-implemented chip of the first-type processing device is further configured to map the determined virtual server ID to a file system ID indicating a file system portion of the one or more file systems allowed to be accessed by the first host computer.

9. The apparatus according to claim 8, wherein the at least one programmable hardware-implemented chip of the first-type processing device is configured to create an internal file system inquiry based on the file system ID.

10. The apparatus according to claim 6, wherein the at least one programmable hardware-implemented chip of the first-type processing device is configured to determine the network ID or the client ID being associated with the first host computer based on header information of the received request packet.

11. The apparatus according to claim 1, wherein, when the predetermined client ID and interface ID are determined to represent a prohibited ID set, the apparatus is configured to send a failure response to the host computer, to generate an alert notification or to create a log entry in log data.

12. The apparatus according to claim 1, wherein the second-type processing device is configured to determine whether a determined ID set including a client ID, a network ID, an interface ID and a virtual server ID represents a permitted ID set or a prohibited ID set, and to refrain from processing a respective request packet when an ID set associated with the request packet is determined to represent a prohibited ID set.

13. A non-transitory computer readable storage medium storing thereon computer-readable program instructions which, when running on or loaded into an apparatus, causing the apparatus to execute steps of a method for managing one or more file systems, the apparatus being connectable to a storage apparatus and to a plurality of host computers, each host computer being associated with a client ID, the apparatus comprising:

a plurality of interfaces, each interface having an associated interface ID;

a first-type processing device including at least one programmable hardware-implemented chip configured to process request packets, which are received from host computers and relate to access requests to the one or more file systems managed by the apparatus, and to generate response packets for the processed request packets; and a second-type processing device including at least one processor configured to execute decoding of at least one portion of request packets sent from host computers based on a computer program stored in a memory of the second-type processing device;

the computer-readable program instructions being loadable to the at least one programmable hardware-implemented chip of the first-type processing device which cause the programmable hardware-implemented chip of the first-type processing device to execute:

determining the client ID being associated with the first host computer, determining the interface ID being associated with the first interface, determining whether the determined client ID and interface ID represent a permitted ID set or a prohibited ID set, refraining from processing the received request packet if the determined client ID and interface ID are determined to represent a prohibited ID set, and if the determined client ID and interface ID are determined to represent a permitted ID set and if the request packet is of a first-type, processing the request packet of the first-type according to a normal processing function, and if the determined client ID and interface ID are determined to represent a permitted ID set and if the request packet is of a second-type, processing the request packet of the second-type according to an autoinquiry processing function, wherein processing the request packet of the first-type according to the normal processing function includes decoding the request packet at the second-type processing device, and processing the request packet of a second-type according to the autoinquiry processing function does not require decoding the request packet at the second-type processing device, and wherein for the processing of the request packet of the first-type according to the normal processing function, the at least one programmable hardware-implemented chip of the first-type processing device is configured to transmit at least part of the request packet to the second-type processing device for decoding of the request packet.

* * * * *